United States Patent [19]

Gabriel

[11] Patent Number: 4,908,874
[45] Date of Patent: Mar. 13, 1990

[54] SYSTEM FOR SPATIALLY TRANSFORMING IMAGES

[75] Inventor: Steven A. Gabriel, Arvada, Colo.

[73] Assignee: Ampex Corporation, Redwood City, Calif.

[21] Appl. No.: 816,176

[22] Filed: Jan. 6, 1986

Related U.S. Application Data

[60] Division of Ser. No. 634,177, Jul. 24, 1984, Pat. No. 4,631,750, which is a continuation of Ser. No. 310,907, Sep. 28, 1981, abandoned which is a continuation of PCT US81/00471 filed Apr. 10, 1981, which is a continuation-in-part of Ser. No. 139,589, Apr. 11, 1980, abandoned.

[51] Int. Cl.$^4$ .............................................. G06K 9/32
[52] U.S. Cl. ......................................... 382/41; 358/22; 358/166; 364/724.05; 364/724.1; 382/46; 382/54
[58] Field of Search ................................ 382/41–47, 382/49, 54; 358/166, 167, 22, 282, 283; 364/572, 724

[56] References Cited

U.S. PATENT DOCUMENTS

| | | | |
|---|---|---|---|
| 4,052,699 | 10/1977 | Micka et al. | 382/46 |
| 4,168,488 | 9/1979 | Evans | 382/46 |
| 4,281,347 | 7/1981 | Tschannen | 358/166 |
| 4,363,104 | 12/1982 | Nussmeier | 358/166 |
| 4,550,437 | 10/1985 | Kobayashi et al. | 358/166 |

Primary Examiner—Leo H. Boudreau
Attorney, Agent, or Firm—Robert K. Schumacher; Ralph L. Mossino; Richard P. Lange

[57] ABSTRACT

A system for spatially transforming images by separate transformation of each dimension of the image is exemplified by a raster scan television system which includes for each color component a transposing memory providing a change of scan direction from horizontal to vertical, a vertical transformation system transforming in the vertical direction the vertically scanned video information, a second transposing memory coupled to receive vertically transformed video information and provide a change of scan direction from vertical back to horizontal, and a horizontal transformation system coupled to horizontally transform the horizontally scanned video signal to produce a color component output signal. The transformation system is controlled by a transform composer and factorizor which receives input commands designating X and Y pretranslations, X and Y size control, Z axis rotation angles, and X and Y post translations to produce a commanded composite transformation which is then factored into horizontal and vertical components.

12 Claims, 19 Drawing Sheets

ORIGINAL SCAN

NEW SCAN

TRANSPOSING FRAME STORE 18

| COL ADD | 0 | 1 | 2----95----127 | 0 | 1----95----127 | 0 | 1----95----127 | 0 |
|---|---|---|---|---|---|---|---|---|
| CHIP ADD | 0 | 1 | 2----95----127 | 128 | 129----191----255 | 256 | | |

| MODULE | ROW 0 | | ROW 1 | | ROW 2 | |
|---|---|---|---|---|---|---|
| 0 | 0,0 | 0,8 | 0,760 | 1,7 | 1,767 | 2,6 |
| 1 | 0,1 | 0,9 | 0,761 | 1,0 | 1,760 | 2,7 |
| 2 | 0,2 | 0,10 | 0,762 | 1,1 | 1,761 | 2,0 |
| 3 | 0,3 | 0,11 | 0,763 | 1,2 | 1,762 | 2,1 |
| 4 | 0,4 | 0,12 | 0,764 | 1,3 | 1,763 | 2,2 |
| 5 | 0,5 | 0,13 | 0,765 | 1,4 | 1,764 | 2,3 |
| 6 | 0,6 | 0,14 | 0,766 | 1,5 | 1,765 | 2,4 |
| 7 | 0,7 | 0,15 | 0,767 | 1,6 | 1,766 | 2,5 |

FIG. 5

DEINTERLACE FILTER 600

PREDECIMATOR 700

INTERPOLATION DECIMATION FILTER 800

CONTROL PANEL 1310

H TO V TRANSPOSING MEMORY 1330

SYSTEM FOR SPATIALLY TRANSFORMING IMAGES

CROSS REFERENCES TO RELATED APPLICATIONS

This application is a division of U.S. application Ser. No. 634,177, filed July 24, 1984, copending herewith, now U.S. Pat. No. 4,631,750, which in turn continuation of U.S. application Ser. No. 310,907, filed Sept. 28, 1981, copending therewith and now abandoned, which was in turn the United States National Application based upon and entitled to the benefit of the effective filing date of Patent Cooperation Treaty Application PCT/US 81/00471, filed April 10, 1981, which was in turn a continuation-in-part of U.S. application Ser. No. 139,589, filed April 11, 1980, copending therewith and now abandoned.

BACKGROUND OF THE INVENTION

1. Field of the Invention

This invention relates to methods and systems for transforming data arrays defining input data values from source locations to target locations defined by a multidimensional coordinate system. The invention relates to methods and systems for spatially transforming images particularly in respect to data samples corresponding to picture elements of images for display on visual display devices such as cathode ray tubes. The invention further relates to methods and systems for providing spatial transformations in a multidimensional coordinate system using separate transformations for each coordinate direction of the system and more particularly to a method and system providing spatial transformations of a two-dimensional video image in a raster scan television system.

2. Discussion of the Prior Art

Methods of producing multidimensional spatial transformations have been developed and are discussed in references such as *Principles of Interactive Computer Graphics* by William M. Newman and Robert F. Sproull, McGraw-Hill Book Company, second edition 1979, *Transmission And Display of Pictorial Information,* by D. E. Pearson, A Halstead Press Book, 1975 and "A Digital Signal Processing Approach to Interpolation", by Ronald W. Schaefer and Lawrence R. Rabiner, Proc. IEEE, Vol. 61, pp. 692–702, June 1973. However, for transformations which involve rotation, perspective representations, or other transformations which involve more than simple unidirectional translations, or scaling, the transformation process involved simultaneous multidimensional spatial filtering and interpolation operations. Consequently, a video image transformation process required complex and time consuming processing for each picture element of the transformed video image. Transformations have been thus rendered impractical in terms of cost of data processing time for complex images such as raster scan television displays. The long processing times required further made the real time processing of a continuous stream of television frames virtually impossible with present day technology.

Nevertheless, a practical system for transforming multidimensional visual images has an important demand for such diverse purposes as producing special effects in television programming or transforming a satellite picture of the earth which is distorted by the curvature of the earth into a flat pictorial representation.

SUMMARY OF THE INVENTION

A system for spatially transforming images in accordance with the invention greatly reduces conventional processing time and demands by separately and sequentially transforming the image for each direction of the coordinate system in which it exists. The multidimensional filtering required by the composite operation for the case of a video image can be accomplished on a real time basis one direction at a time concurrently with the separate and sequential transformation operations. In an example represented by an image transformation system for real time television applications, each color component of the raster scan video signal is passed through a serial sequence of processing elements including a horizontal to vertical transposing memory, a vertical transformation system, a vertical to horizontal transposing memory, and a horizontal transformation system to generate as an output the transformed component of the video signal. Each video component of the video signal is operated upon separately and all in parallel, and the operations may be substantially identical except that in some cases it may be possible to utilize slower, less expensive circuitry in the case of a color component having a narrow bandwidth compared to other video components. The general principles of separating the image into unidimensional serial transformations is the same for all color components.

In the case of the video television signal, a transform composer receives commands identifying subtransformations such as X, Y and Z pretranslations, X, Y and Z size control, X, Y and Z axis rotation angles, and X, Y and Z post translations to generate a composite affine, three dimensional transformation. The three dimensional composite affine transformation is converted to a two dimensional projective transformation by division by the Z coordinate. The factorizor then factors this projective transformation into two one dimensional projective transformations which control the main elements of the data processing path through a vertical address generator and a horizontal address generator. The factorizor develops the unidimensional vertical transformation characteristics required for each vertical column of a display in response to the input commands and communicates this information to the vertical address generator which in turn controls the horizontal to vertical transposing memory and vertical transformation system to produce the commanded image transformation for the vertical direction. Similarly, the factorizor also generates the required horizontal transformation information which is communicated to a horizontal address generator to control the vertical to horizontal transposing memory and horizontal transformation system to produce the commanded horizontal transformations upon data which have already been vertically transformed.

BRIEF DESCRIPTION OF THE DRAWINGS

A better understanding of the invention may be had from a consideration of the following detailed description taken in conjunction with the accompanying drawings, in which:

FIG. 5 is a memory map for the transposing frame store shown in FIG. 4;

DETAILED DESCRIPTION

Figure 1:
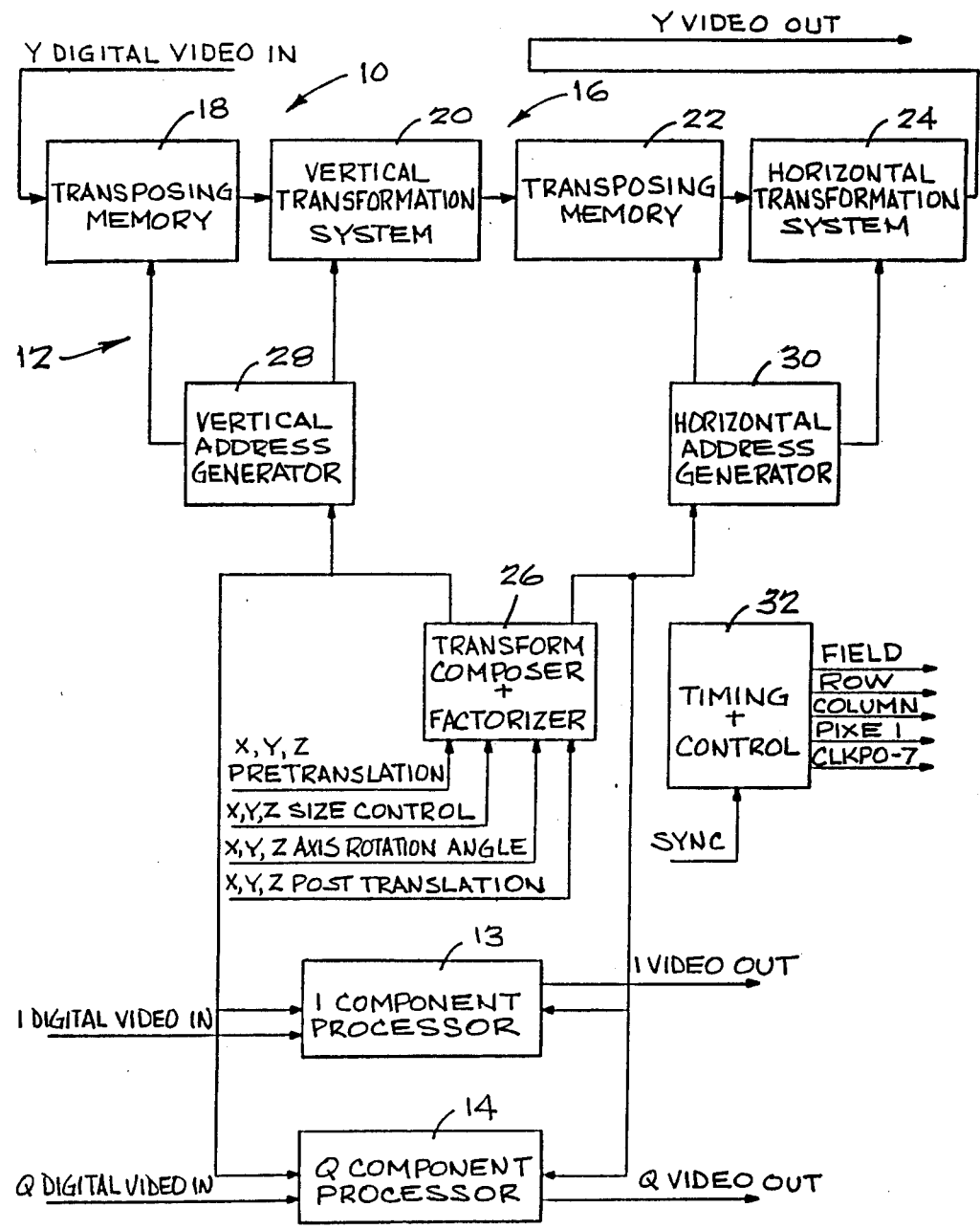
FIG. 1 is a block diagram representation of a spatial transformation system in accordance with the invention.

Referring now to FIG. 1, a spatial transformation system 10 in accordance with the invention which operates separately in respect to each coordinate direction in a dimensionally interdependent spatial transformation is shown in the specific embodiment of a transformation system for a standard raster scan television video signal. The transformation system 10 includes three color component processors 12–14, one for each of the Y, I and Q components of a color television video signal. It will be appreciated that other representations for the television signal such as red, green, blue or Y, U, V could be used alternatively. Each of the component processors 13 and 14 may be implemented as duplicates of the component processor 12 which is shown in greater detail in FIG. 1 and which will be described in greater detail herein.

The Y component processor 12 receives as an input a Y digital video component of a video image in raster scan television order. The Y component is passed serially through a signal processing path 16 which includes a horizontal to vertical transposing memory 18, a vertical transformation system 20, a vertical to horizontal transposing memory 22, and a horizontal transformation system 24 to produce a digital Y video output component which has been fully transformed in two directions, one direction at a time. A transform composer and factorizor 26 receives operator input commands and in response thereto generates transformation information for the separate vertical and horizontal directions which is communicated to a vertical address generator 28 and a horizontal address generator 30, respectively. Because the image transformations for each of the color components are substantially identical, the vertical and horizontal transformation information may also be communicated to I component processor 13 and Q component processor 14 without need for duplication of the transform composer 26 for each color component. A timing and control circuit 32 develops basic timing and control signals for use throughout the spatial transformation system 10 in response to an incoming synchronization signal.

Theory of Spatial Transformation

We describe a procedure for spatially transforming a two dimensional sampled image according to a dimensionally interdependent spatial transformation. Common examples of spatial transformations are translation, contraction and expansion, rotation and perspective projection. The concept however is quite general and includes any odd warping of an image such as that produced by a fish-eye lens or a fun house mirror.

Mathematically an image is determined by three functions of position that give the intensities of the three color components at each point within the boundary of the image. We denote our original or source image as $$s_i(u,v) \text{ for } i=1,2,3 \qquad (2)$$

where u and v are independent coordinates that range over the area of the picture to indicate position in respective coordinate directions and i selects one of the primary color components. The transformed target image will be written as $$t_i(x,y) \qquad (4)$$

where x and y are independent coordinates that range over the area of the target. A spatial transformation is a relation that ties x and y to u and v such that the following is true $$t_i(x,y) = s_i(u,v) \qquad (6)$$

The primary intensities at each point (x,y) in the target are determined by those at some point (u,v) in the source. For each (x,y) there should be only one (u,v) to avoid the possibility of specifying two intensities for the same primary at the same point; thus the relation between them is a function of (x,y):

$$(u,v) = f(x,y)$$

or $$u = f_u(x,y) \qquad (8)$$
$$v = f_v(x,y)$$

in component form. Any spatial transformation can be completely specified by giving its u and v components $f_u$ and $f_v$. These functions simply tell where to look in the source to find the primary intensities at a point in the target. Many spatial transformations are invertible and are given by $$(x,y) = f^{-1}(u,v)$$

$$x = f_x^{-1}(u,v) \quad (10)$$

$$y = f_y^{-1}(u,v)$$

These functions tell where in the target to move each source intensity. Since a transformation is the same for each primary we will drop the subscripts and write one representative equation for what is actually a group of three. We then have $$t(x,y) = s(u,v) = s(f_u(x,y), f_v(x,y)) \quad (12)$$

If we are given a transformation in the form of eq. (10) we must first invert $f^{-1}$ to get a relation of the form in eq. (8) to be able to compute target points with eq. (12).

The problem of two dimensional spatial transformation is considerably simplified by the discovery that many transformations can be factored into a product of two one dimensional transformations. The factorization is derived as follows. What we seek is an intermediate image r such that $$t(x,y) = r(u,y) = s(u,v) \quad (13)$$

Computation of t could then proceed by a two stage process $$r(u,y) = s(u, g(u,y)) \quad (14)$$

then $$t(x,y) = r(f_u(x,y), y) \quad (15)$$

with $$g(u,y) = v$$

The image is produced from s by motion (repositioning) only in the second coordinate direction, since the first parameter in the equation relating the two is the same. Similarly r transforms into t by motion (repositioning) only in the first coordinate direction. To find g we have $$r(u,y) = s(u,v) = s(u, f_v(x,y))$$

and $$f_u(x,y) = u$$

For every y we can define a one dimensional function $$f_{uy}(x) = f_u(x,y) = u \quad (16)$$

If this function is invertible we may write $$x = F_y^{-1}(u)$$

and substitute this into $f_v$ to get $$g(u,y) = v = f_v(x,y) = f_v(f_{uy}^{-1}(u), y) \quad (18)$$

Two important examples of spatial transformations are affine and projective. An affine transformation in two dimensions is given by $$f_u(x,y) = a_{11}x + a_{12}y + a_{13}$$

$$f_v(x,y) = a_{21}x + a_{22}y + a_{23} \quad (20)$$

in three dimensions by $$f_u(x,y,z) = a_{11}x + a_{12}y + a_{13}z + a_{14}$$

$$f_v(x,y,z) = a_{21}x + a_{22}y + a_{23}z + a_{24}$$

$$f_w(x,y,z) = a_{31}x + a_{32}y + a_{33}z + a_{34} \quad (22)$$

and in general by $$f_i(x) = \left[ \sum_{j=1}^{N} a_{ij} x_j \right] + a_{i,j+1} \quad x \in R^N \quad (24)$$

It is known that affine transformations of dimension N are isomorphic to $N+1$ dimensional matrices of the form $$\begin{bmatrix} a_{11} & a_{12} & \cdots & a_{1,N} & a_{1,N+1} \\ \cdot & \cdot & & \cdot & \cdot \\ \cdot & \cdot & & \cdot & \cdot \\ \cdot & \cdot & & \cdot & \cdot \\ a_{N,1} & a_{N,2} & \cdots & a_{N,N} & a_{N,N+1} \\ 0 & 0 & \cdots & 0 & 1 \end{bmatrix} \quad (26)$$

therefore the composite of two affine transformations can be calculated by taking the product of their respective matrices. Thus a general affine transformation can be built out of a product of simpler ones. Also the inverse of a transformation is found by inverting its matrix.

To use the matrix on an N-vector x, the vector is first mapped to an $N+1$-vector (x,1) by appending a 1 as its the coordinate. The matrix M is then applied to this new vector forming an $N+1^{the}$ dimensional result. This is projected back to N space by dropping the $N+1^{the}$ coordinate which was undisturbed by M. As a two dimensional example we have the transformation in eq. (20). In matrix form this is the $3 \times 3$ array $$M = \begin{bmatrix} a_{11} & a_{12} & a_{13} \\ a_{21} & a_{22} & a_{23} \\ 0 & 0 & 1 \end{bmatrix}$$

We map (x,y) to the three vector (x,y,1) and apply M $$\begin{bmatrix} u \\ v \\ 1 \end{bmatrix} = \begin{bmatrix} a_{11} & a_{12} & a_{13} \\ a_{21} & a_{22} & a_{23} \\ 0 & 0 & 1 \end{bmatrix} \begin{bmatrix} x \\ y \\ 1 \end{bmatrix} \quad \begin{array}{l} u = a_{11}x + a_{12}y + a_{13} \\ v = a_{21}x + a_{22}y + a_{23} \\ 1 = 1 \end{array}$$

Dropping the third equation, which is an identity, we are left with (u,v).

If M is invertible we may express (x,y) as a function of (u,v)

$$\begin{bmatrix} x \\ y \\ 1 \end{bmatrix} = M^{-1} \begin{bmatrix} u \\ v \\ 1 \end{bmatrix}$$

This is normally how transformations are specified. For calculation purposes though, we are given individual target coordinates (x,y) and must find what (u,v) in the source contributes intensity to that location.

Translation, scaling, rotation and shearing are all special cases of affine transformation. These four taken together can produce all possible affine mappings. The matrices and formulas for these are shown below for the two dimensional case. The transformations are described verbally in the source to target direction and we first show the $M^{-1}$ that corresponds to that description.

Translation of each source point (u,v) by a vector $(T_x, T_y)$ to a matrix for source as a function of target:

$$M^{-1} = \begin{bmatrix} 1 & 0 & T_x \\ 0 & 1 & T_y \\ 0 & 0 & 1 \end{bmatrix} \begin{matrix} f_x^{-1}(u,v) = u + T_x \\ f_y^{-1}(u,v) = v + T_y \end{matrix}$$

$$M = \begin{bmatrix} 1 & 0 & -T_x \\ 0 & 1 & -T_y \\ 0 & 0 & 1 \end{bmatrix} \begin{matrix} f_u(x,y) = x - T_x \\ f_v(x,y) = y - T_y \end{matrix}$$

Expansion by factors $S_x$ and $S_y$:

$$M^{-1} = \begin{bmatrix} S_x & 0 & 0 \\ 0 & S_y & 0 \\ 0 & 0 & 1 \end{bmatrix} \begin{matrix} f_x^{-1}(u,v) = u \cdot S_x \\ f_y^{-1}(u,v) = v \cdot S_y \end{matrix}$$

$$M = \begin{bmatrix} \frac{1}{S_x} & 0 & 0 \\ 0 & \frac{1}{S_y} & 0 \\ 0 & 0 & 1 \end{bmatrix} \begin{matrix} f_u(x,y) = x/S_x \\ f_v(x,y) = y/S_y \end{matrix}$$

Clockwise rotation by an angle $\theta$:

$$M^{-1} = \begin{bmatrix} \cos\theta & \sin\theta & 0 \\ -\sin\theta & \cos\theta & 0 \\ 0 & 0 & 1 \end{bmatrix} \begin{matrix} f_x^{-1}(u,v) = u\cos\theta - v\sin\theta \\ f_y^{-1}(u,v) = u\sin\theta + v\cos\theta \end{matrix}$$

$$M = \begin{bmatrix} \cos\theta & -\sin\theta & 0 \\ \sin\theta & \cos\theta & 0 \\ 0 & 0 & 1 \end{bmatrix} \begin{matrix} f_u(x,y) = x\cos\theta - y\sin\theta \\ f_v(x,y) = x\sin\theta + y\cos\theta \end{matrix}$$

Right shear of x coordinate by an angle;

$$M^{-1} = \begin{bmatrix} 1 & \tan\psi & 0 \\ 0 & 1 & 0 \\ 0 & 0 & 1 \end{bmatrix} \begin{matrix} f_x^{-1}(u,v) = u + v\tan\psi \\ f_y^{-1}(u,v) = v \end{matrix}$$

$$M = \begin{bmatrix} 1 & -\tan\psi & 0 \\ 0 & 1 & 0 \\ 0 & 0 & 1 \end{bmatrix} \begin{matrix} f_u(x,y) = x - y\tan\psi \\ f_v(x,y) = y \end{matrix}$$

Note the simple relationship between each of these matrices and its inverse. If we are given a sequence of operations specified in the source to target direction and need the M corresponding to the composite target to source transform, we may find this M by inverting each matrix in the sequence and concatenating in the reverse order according to the formula $$(AB)^{-1} = B^{-1}A^{-1}$$

instead of inverting the composite directly.

As an example, suppose we wish to rotate our source, then translate it. The $M^{-1}$ for this is the product $$M^{-1} = \begin{bmatrix} 1 & 0 & T_x \\ 0 & 1 & T_y \\ 0 & 0 & 1 \end{bmatrix} \begin{bmatrix} \cos\theta & \sin\theta & 0 \\ -\sin\theta & \cos\theta & 0 \\ 0 & 0 & 1 \end{bmatrix}$$

or $$M^{-1} = \begin{bmatrix} \cos\theta & \sin\theta & T_x \\ -\sin\theta & \cos\theta & T_y \\ 0 & 0 & 1 \end{bmatrix}$$

Then $$M = \begin{bmatrix} \cos\theta & -\sin\theta & -T_x\cos\theta + T_y\sin\theta \\ \sin\theta & \cos\theta & -T_x\sin\theta - T_y\cos\theta \\ 0 & 0 & 1 \end{bmatrix}$$

ps by direct calculation using cofactors, since det $M^{-1} = 1$.

This same result can be had by taking the reversed production of inverse $$M = \begin{bmatrix} \cos\theta & -\sin\theta & 0 \\ \sin\theta & \cos\theta & 0 \\ 0 & 0 & 1 \end{bmatrix} \begin{bmatrix} 1 & 0 & -T_x \\ 0 & 1 & -T_y \\ 0 & 0 & 1 \end{bmatrix}$$

Three dimensional affine transforms behave analogously except that there are three matrices for rotations about X, Y and Z and three for shears along those axes. Projective transformations are given by the general form $$f_i(x) = \frac{\sum_{j=1}^{N} a_{ij}x_j + a_{i,N+1}}{\sum_{j=1}^{N} a_{N+1,j}x_j + a_{N+1,N+1}}$$

These transformations are isomorphic to the set of all N+1 dimensional square matrices. Affine transformations are thus special cases of projective ones.

The distortion of distance produced when a three dimensional scene is projected onto a flat plane by a lens can be modeled by a projective transformation. In fact, analysis of that distortion, called perspective, was the impetus for the creation of projective geometry.

Perspective distortion is quite familiar to anyone involved in art, architecture, photography, drafting, computer graphics, etc. A two dimensional perspective projection of a three dimensional scene is produced by dividing X and Y coordinates of each point in the original by its Z value, where Z points in the direction of view of the lens.

Thus $X = \frac{X'}{Z'}$ $(X', Y', Z')$ = coordinates of point in 3-D scene $Y = \frac{Y'}{Z'}$ $(X, Y)$ = coordinates of image of point in 2-D view plane This mapping collapses all points lying on a line passing through the focal point of the lens onto a single point in the view plane.

We can construct a two-dimensional projective transformation from a three dimensional affine one. The transformation models the image formed by a camera viewing a flat picture that has been rotated, sheared, scaled and translated to locations throughout 3-D-space. We start with an image in the u,v plane and map the points in it to the 3-D-space coordinate (u,v,0) and apply an affine transformation of the form eq. (22) to obtain an (x',y',z'). Dividing by Z' we have $$x = \frac{a_{11}u + a_{12}v + a_{14}}{a_{31}u + a_{32}v + a_{34}} \quad (28)$$

and $$y = \frac{a_{21}u + a_{22}v + a_{24}}{a_{31}u + a_{32}v + a_{34}} \quad (29)$$

The $a_{13}$, $a_{23}$ and $a_{33}$ terms are missing since w is zero in this case. Equations (28) and (29) are specifications for an $f_x^{-1}(u,v)$ and $f_y^{-1}(u,v)$. We want to invert and factor this transformation to obtain the $f_u(x,y)$ and $g(u,y)$ needed in equations (14) and (15). Since we are starting with inverses, the procedure for factorization is somewhat different from that described above. We first solve equation (29) for v to get g(u,y) directly.

$$y = \frac{a_{22}v + (a_{21}u + a_{24})}{a_{32}v + (a_{31}u + a_{34})}$$

$$v = \frac{-(a_{31}u + a_{34})y + (a_{21}u + a_{24})}{a_{32}y - a_{22}} = g(u,y) \quad (30)$$

Substituting for v in eq. (28) solving for u we have after some manipulation $$u = \frac{(a_{22}a_{34} - a_{24}a_{32})x + (a_{14}a_{32} - a_{12}a_{34})y + (a_{12}a_{24} - a_{14}a_{22})}{(a_{21}a_{32} - a_{22}a_{31})x + (a_{12}a_{31} - a_{11}a_{32})y + (a_{11}a_{22} - a_{12}a_{21})}$$

If the terms $a_{31}$ and $a_{32}$ are zero and $a_{34}$ equals one, the projection reduces to an affine transformation within the plane and we have $$x = a_{11}u + a_{12}v + a_{14}$$

$$y = a_{21}u + a_{22}v + a_{24}$$

$$v = g(u,x) = \frac{-y + (a_{21}u + a_{24})}{-a_{22}} \quad (32)$$

$$u = f_u(x,y) = \frac{a_{22}x + -a_{12}y + (a_{12}a_{24} - a_{14}a_{22})}{a_{11}a_{22} - a_{12}a_{21}} \quad (33)$$

A three dimensional affine transformation from a source array having three dimensional variables u, v and w to a target array having dimensional variables x, y and z would be defined by the generalized equation:

$$\begin{bmatrix} x \\ y \\ z \\ 1 \end{bmatrix} = \begin{bmatrix} a_{11} & a_{12} & a_{13} & a_{14} \\ a_{21} & a_{22} & a_{23} & a_{24} \\ a_{31} & a_{32} & a_{33} & a_{34} \\ 0 & 0 & 0 & 1 \end{bmatrix} \begin{bmatrix} u \\ v \\ w \\ 1 \end{bmatrix} \quad (34)$$

$$x = a_{11}u + a_{12}v + a_{13}w + a_{14} \quad (35)$$

$$y = a_{21}u + a_{22}v + a_{23}w + a_{24} \quad (36)$$

$$z = a_{31}u + a_{32}v + a_{33}w + a_{34} \quad (37)$$

Although the actual manipulations become quite extensive and are therefore hereafter omitted, it will be appreciated that equation (37) can be solved for u to produce $$u = g_1(v, w, z) \quad (38)$$

Determining u at each possible combination of values of v, w and z and using u as a source address to obtain data corresponding to each source address, a three dimensional first intermediate array of data is established having the coordinates v, w and z. The target dimension z has now been substituted for the source dimension u.

Next, substituting equation (38) into equations (35) and (36) to eliminate u, the result is $$x = g_2(v, w, z) \quad (39)$$

$$y = g_3(v, w, z) \quad (40)$$

Equation (40) can now be solved for v to obtain $$v = h_1(w, y, z) \quad (41)$$

Determining v for each possible combination of values of w, y and z and using the determined "a" values as array address locations to obtain data from the first intermediate v, w, z array, a second intermediate array of data is established having dimensions w, y and z and values at coordinate points thereof corresponding to the addressed locations in the first intermediate array.

The final target matrix of data having dimensions x, y and z is obtained by substituting equation (41) into equation (39) to eliminate v. The result is $$x = h_2(w, y, z) \quad (42)$$

Solving equation (42) for w we obtain $$w = i_1(x, y, z) \quad (43)$$

The values of w can be determined for all possible combinations of values x, y and z and used as source address locations within the second intermediate w, y, z array to obtain data from the second intermediate array and establish the three dimensional target array T(x, y, z) as the values obtained from the second intermediate array at the locations defined by w, y and z for each possible combination of values x, y and z.

Discussion of Real Time Video Image Transformation Systems

The preferred embodiment of the device accepts separate digitized versions of the Y, I and Q components of a horizontal left to right, vertical top to bottom, scan NTSC color television signal. This signal is 525 line, 2 to 1 interlaced, with a field rate of 60 Hz. For each component there are 8 bits per data sample or pixel. The Y or luminance component is sampled at 4 times the NTSC color subcarrier frequency ($f_{sc}$) of 3.579545 MHz. The I and Q components are sampled at the subcarrier rate. We discuss the transformation of the Y component first. I and Q are handled similarly.

The period between Y data samples (pixels) is $1/(4f_{sc})$ or approx. 70 ns. There are exactly 910 data samples per 63.5 μs horizontal scan line. Only 486 of the 525 lines in a frame contain active picture data, the rest are devoted to retrace blanking.

Figure 2A:
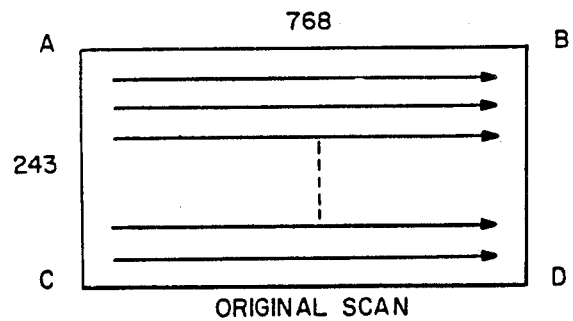
FIGS. 2A, 2B, 2C and 2D are pictorial representations that are useful in understanding transposition.
Figure 2B:
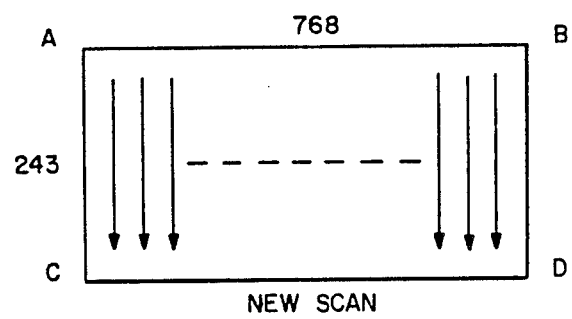
Figure 2C:
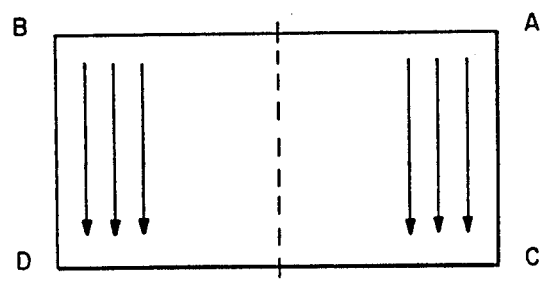
Figure 2D:
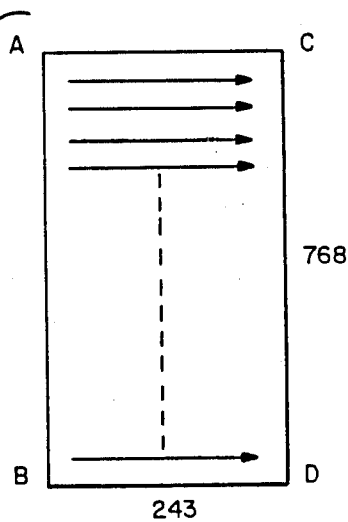

The samples are arranged in an 8 bit parallel, byte serial, data stream and enter and are stored in the first transposing memory 18 as shown in FIG. 1. This memory contains three field memory modules, each large enough to hold one active field of data. Successively received fields of video data are stored sequentially in the three field memory modules, and during each input field time interval, the field memory module containing the oldest data is used as a buffer to store the current field of data being received while the previous two fields are read simultaneously from the other two field memory modules for processing. This arrangement prevents timing conflicts that occur when trying to write new data to a memory that still contains parts of a previously received field not yet processed. Only those data representing visible picture are stored, thus each memory contains 243 lines of 768 data samples. In addition to providing field storage, the main function of the transposing memory 18 is to permit a change in the direction of scan of the fields stored within it. Each field memory is written in horizontal order as shown in FIG. 2A, but can be read in vertical order as 768 columns of 243 pixels as shown in FIG. 2B. The memory, of course, provides addressable discrete memory locations for storing respective data samples. The memory locations can be considered to correspond to an orderly array of data samples arranged in orthogonal rows in which the horizontal rows may be considered lines and the vertical rows columns.

Reading out the data samples in columns that were written in in rows produces a digital, data stream representing a vertically scanned version of the input data. The horizontal and vertical dimensions of the picture are interchanged by this means. What was the left to right direction in the original becomes top to bottom and what was top to bottom becomes left to right. The output data stream can be considered as a horizontal scan of the original image mirrored about its vertical center line and rotated about its Z axis 90° counterclockwise as illustrated in FIGS. 2A-2D. In this manner vertical processing of the input data can be achieved by operating on the output data with a device only capable of transformation along the direction of scan. Vertical processing of the original horizontally scanned signal is difficult because vertically adjacent samples are separated widely in time. After transposition, however, vertically adjacent samples are close together in time while horizontal ones are far apart.

Figure 3:
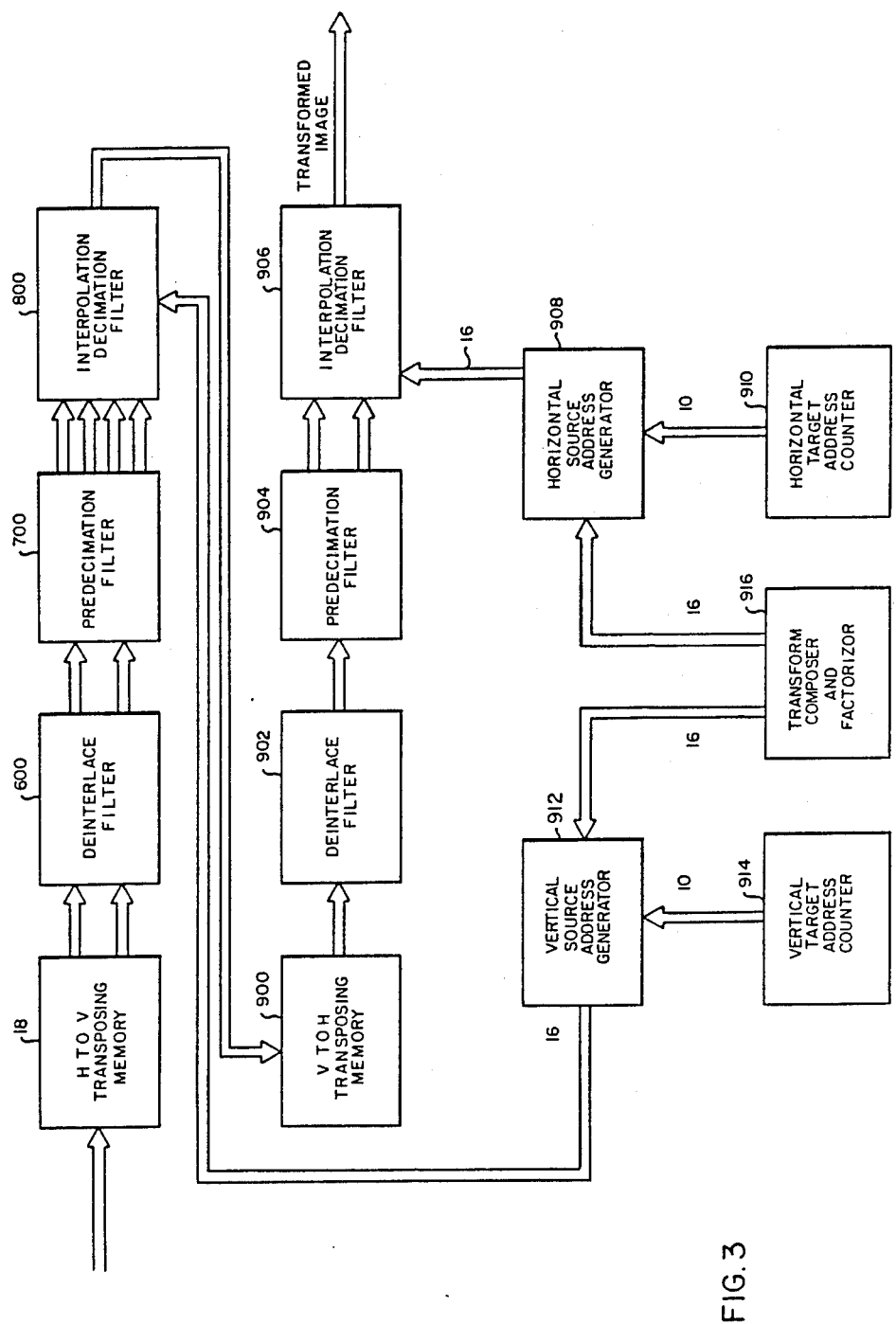
FIG. 3 is a block diagram representation of the spatial transformation system shown in FIG. 1.

Referring now to FIG. 3, two 70 ns luminance data streams representing the two fields previous to the current input field leave the transposing memory 18 to enter a deinterlace filter 600 of the vertical transformations system 20. These two fields together contain information describing the entire spatial area occupied by the image, except that one field was scanned 1/60 second earlier than the other. The deinterlace filter 600 blends the two fields to create a new frame that appears to have been scanned at a time midway between them. The filter effectively operates at twice the original data rate of $4f_{sc}$. The deinterlace filter 600 is implemented as two filters in parallel, and data from these filters are carried in two 70 ns streams.

Throughout the system, paralleling of data paths, memory modules and computational elements is used to prevent the data rate required on any single path from rising above $4f_{sc}$, while still retaining the enormous total rates required for real time processing. The machine is built with commonly available Schottky TTL logic devices which can comfortably respond to a 70 ns clock.

In the vertical transformation system 20, the two 70 ns data streams from the deinterlace filter 600 are coupled to a predecimation filter 700 having a triple line buffer memory organization in which one memory absorbs the current column of data received from the deinterlace filter while the previous column is read from another. The third stores intermediate predecimated results received from the deinterlace filter. The predecimator 700 provides coarse size change by powers of two in the direction of scan. Each column is processed by the filter multiple times. Every pass of the filter reduces the length of the column by a factor of two until it is only one pixel long. Each pass takes half the time of the previous one and produces half as many pixels, therefore the total number of pixels produced including the original is twice the number contained in a column since the sum of $1+\frac{1}{2}+\frac{1}{4}+\frac{1}{8}+\ldots=2$. The predecimator output rate is thus twice its input rate, and four 70 ns streams are required to carry its output to an interpolation-decimation filter 800.

The filter 800 has a double line buffer, each side of which is long enough to contain a column and all of its predecimated copies of data received from the predecimator 700. The filter can interpolate between two pixels to a resolution of 1/64 of a pixel and vary its low pass frequency response on a point by point basis over a range appropriate for the smooth compression of a column to half its normal size. Compressions to less than half size are done by selecting one of the predecimated versions received from the predecimator 700 for interpolation and filtering. For example, if it is desired to compress the picture to 1/15 normal size, the interpolator would select the $\frac{1}{8}$ size decimated coy and interpolate an filter it to shrink it further by a factor of 8/15, a number between 1 and $\frac{1}{2}$.

Figure 4:
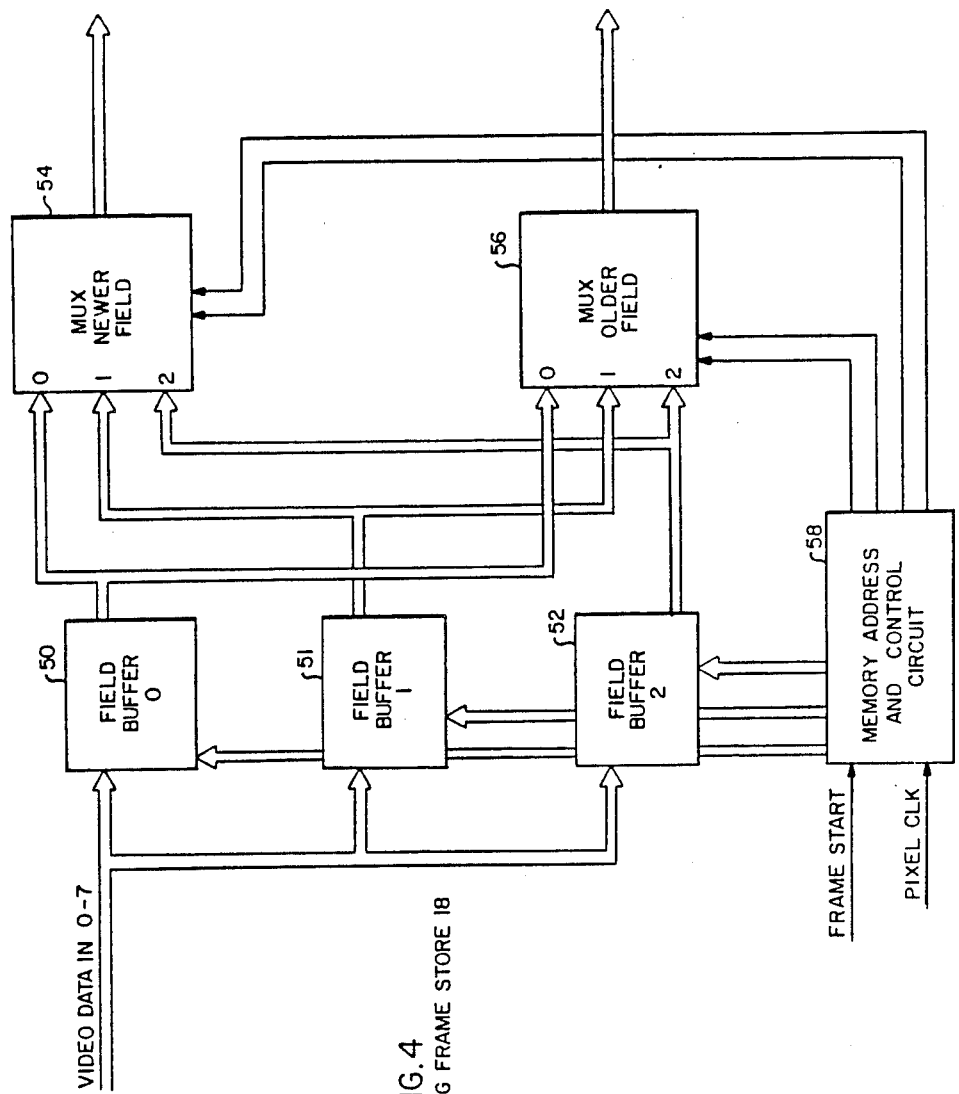
FIG. 4 is a block diagram of a transposing frame store for the spatial transformation system shown in FIG. 1.

Referring now to FIG. 4, the transposing memory or frame store 18 includes three field buffers 50-52 designated respectively field buffer 0, field buffer 1, and field buffer 2. Two multiplexers 54, 56 are coupled to output bytes of video field information from one of the field buffer components 50-52 in response to selection signals from a memory address and control circuit 58. The memory address and control circuit 58 also provides address and control information to each of eight components of each of the field buffers 50-52.

The field buffers 50-52 operate on a continuous revolving basis in which one of the three field buffers receives an incoming field of data while the other two field buffers provide a newest complete field of data and a next older complete field of data to the newer and older field multiplexers 54, 56 respectively. A frame start signal provides the identification of the beginning of a frame interval while the pixel clock signal provides a basic clock signal at the incoming data rate.

The revolving nature of the field buffers 50-52 and the multiplex selection can be better understood by looking at what happens at three successive field time periods beginning with an arbitrarily selected field time N. At field time N field buffer 0 is selected to have incoming bytes of video data written therein while field buffer 1 outputs the oldest field through older field multiplexer 56 and field buffer 2 outputs the newer field through newer field multiplexer 54.

At the next field time, N+1, field buffer 1 becomes the write field buffer while field buffer 2 outputs the older field through older field multiplexer 56 and field buffer 0 outputs the newer field through newer field multiplexer 54.

At the next field time N+2, field buffer 2 becomes the write buffer while field buffer 0 outputs the older field through older field multiplexer 56 and field buffer 51 outputs the newer field through newer field multiplexer 54.

At the next field time, N+3, the cycle repeats itself with field time N+3 being identical to field time N. It will be appreciated that during each cycle of three field times each field buffer is written into once and then read out through newer field multiplexer 54 and then read out through older multiplexer 56. As a result, the older field multiplexer 56 always outputs field N-2 while newer field multiplexer 54 always outputs field N-1 where field N is considered to be the field which is currently being written into one of the field buffers 50-52. The two most recent stored fields are thus continuously output to the next stage and are updated for each new field time.

Read and write accessing of the field buffers 50-52 is complicated somewhat by the fact that practically available memory storage chips cannot read and write at the 70 nanosecond pixel clock rate. In order to accommodate the required bandwidth, each of the field buffers is implemented as 8 modules of 32K×8 memory. By sequentially accessing the 8 modules, each individual module has 8 pixel clock periods to read and write a byte of data corresponding to a sampled pixel location. However, in order to assure proper sequencing of the memory modules for both the horizontal and vertical accessing which are required to obtain a horizontal to vertical transposition, care must be taken in implementing the addressing scheme.

Figure 6:
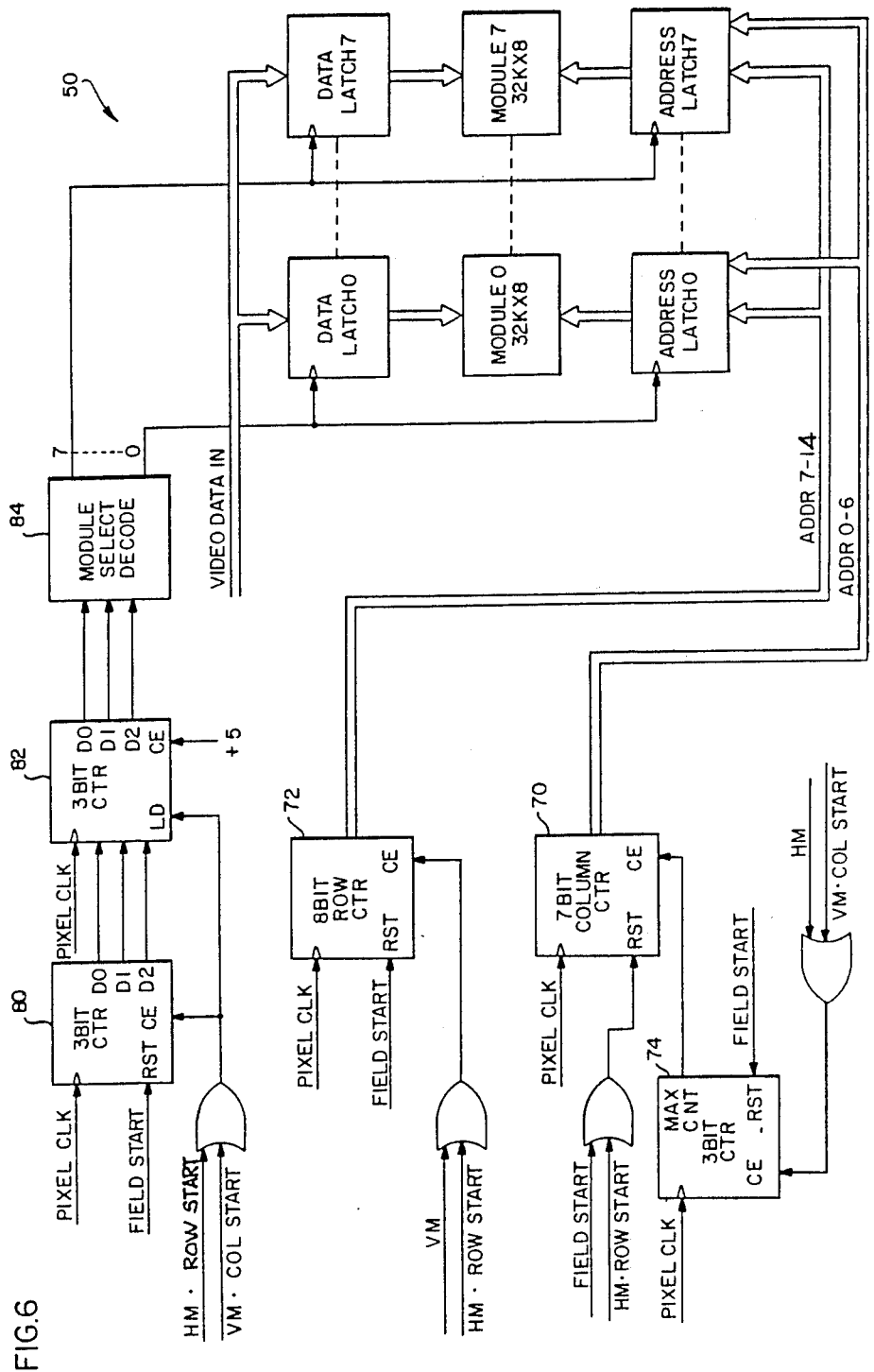
FIG. 6 is a schematic and block diagram representation of addressing circuitry for the transposing frame store shown in FIG. 4.

One advantageous addressing scheme is shown by way of example for field buffer 50 in FIGS. 5 and 6. FIG. 5 illustrates the lower number addressess of an address map for field buffer 50. The 1 byte memory storage cell components or modules 0-7 are represented vertically in ascending order from top to bottom while hardware memory word or chip addresses ascend from left to right as indicated immediately above the map. However, for convenience of address implementation these memory addresses may be further divided into row and column addresses which are indicated above the chip address in FIG. 5.

Horizontal accessing of the first row is the most straightforward. Horizontal accessing begins with address 0 of module 0 and proceeds through the modules in sequence. After address 0 has been written in module 7 the column address is incremented with pixel (row, column) position (0,8) being accessed at word 1 of module 0. The 768 pixels of the first row of a field are written into the first 96 word positions of the memory modules in sequential order.

In the event of a vertical access, it must be remembered that the 2 pixels located at column 0 and rows 1 and 2 will be accessed in sequential order. Care must therefore be taken that these two pixels are stored in sequential memory modules and not in the same memory module. This is accomplished by storing pixel 1,0 in module 1 with the word address being skipped to address 128 which corresponds to a resetting of the column address to 0. The memory modules are then again accessed in sequence with a wraparound to module 0 before the word address is incremented to column address 1 which corresponds to chip address 129. Similarly, for the second row the first pixel of the second row must be stored in module 2 and the modules then continue to be accessed in sequence with a wraparound until the word address is incremented after module 1 has been accessed. The starting module for the first pixel of a row continues to be incremented in similar fashion until all 8 modules have received the first pixel of a row. The process then recycles with module 0 receiving the first pixel of row 8.

When making vertical accesses to the frame buffer, the modules are again accessed in sequence except that the row address is now incremented for each pixel. At the beginning of each new column, the row address is returned to 0 and the column address is incremented to 1. It will be observed that pixel 0,0 occurs at row 0, column 0, module 0, pixel 1,0 occurs at row 1, column 0, module 1 and pixel 2,0 occurs at row 2, column 0, module 2. This addressing arrangement thus meets the requirement that the modules of the field buffer can be accessed sequentially for both vertical and horizontal accessing.

An advantageous implementation of this addressing scheme is shown in FIG. 6 wherein the frame buffer 50 includes eight 32K×8 storage modules designated modules 0-7. Each module has a corresponding data latch and an address latch. The least significant address bits 0-6 are provided by a 7 bit column counter 70 while the most significant 8 address bits 7-14 are presented by an 8 bit row counter 72. The row counter 72 is reset at each field start and incremented for each pixel in a vertical mode and at row start in a horizontal mode. The column counter 70 is reset to 0 at field start and at row start when in a horizontal mode and is incremented in response to the maximum count output of a 3 bit counter 74. The counter 74 is coupled to be reset at field start and is clocked by the pixel clock signal. The count enable input to the counter 74 is continuously enabled in a horizontal access mode and is enabled at column start for a vertical mode. Consequently, the column counter 70 is incremented for every eighth pixel clock in a horizontal mode and for every eighth column in a vertical mode.

Selection for the 32K×8 modules 0-7 is controlled by a 3 bit counter 80, a 3 bit counter 82, and a 3 to 8 module select decoder 84. The three bit counter 82 is incremented at the pixel clock rate to control the sequential accessing of the individual memory modules. The output of counter 82 is decoded by decoder 84 to select one of the eight modules in sequence for the simultaneous loading of the data latch and address latch for the selected module. The three bit counter 80 provides the required staggered module offset at row or column start. The counter 80 is reset at field start and is incremented in a horizontal mode at row start and in a vertical mode at column start. The three bit counter 82 is loaded at column start or row start with the contents of the 3 bit counter 80 immediately prior to incrementing.

It should be noted that the addressing of the field buffers 50-52 is described in terms of vertical mode accessing and horizontal mode accessing. Under most circumstances these field buffers provide a transposition by being accessed in a horizontal mode for writing and in a vertical mode for reading. However, under some circumstances the field buffers may be accessed in a horizontal mode for both reading and writing. The failure, to provide a transposition at frame store 18 coupled with a transposition at the frame store 22 (FIG. 1) effectively imposes a 90° rotation upon the video image. As an image is rotated toward 90° the image effectively becomes mapped into a line of zero width, and resolution is lost. However, the resolution of the video image can be better preserved for large angle rotations by transposing the image at only one of the frame stores 18 and 22 and then imposing a negative rotation of between 0° and 45° to account for the difference between the desired rotation angle and the 90° rotation imposed by failing to provide a transposition at the frame store 18.

The transposing frame store 22 of FIG. 1 is implemented in a manner substantially identical to that of the frame store 18 except that the frame store 22 requires only two field buffers. A field of data is written vertically into one buffer while a previously written field is read horizontally out of the other buffer. The two buffers are then interchanged with the one buffer being read horizontally while the other buffer is written into vertically.

Figures 7A, 7B:
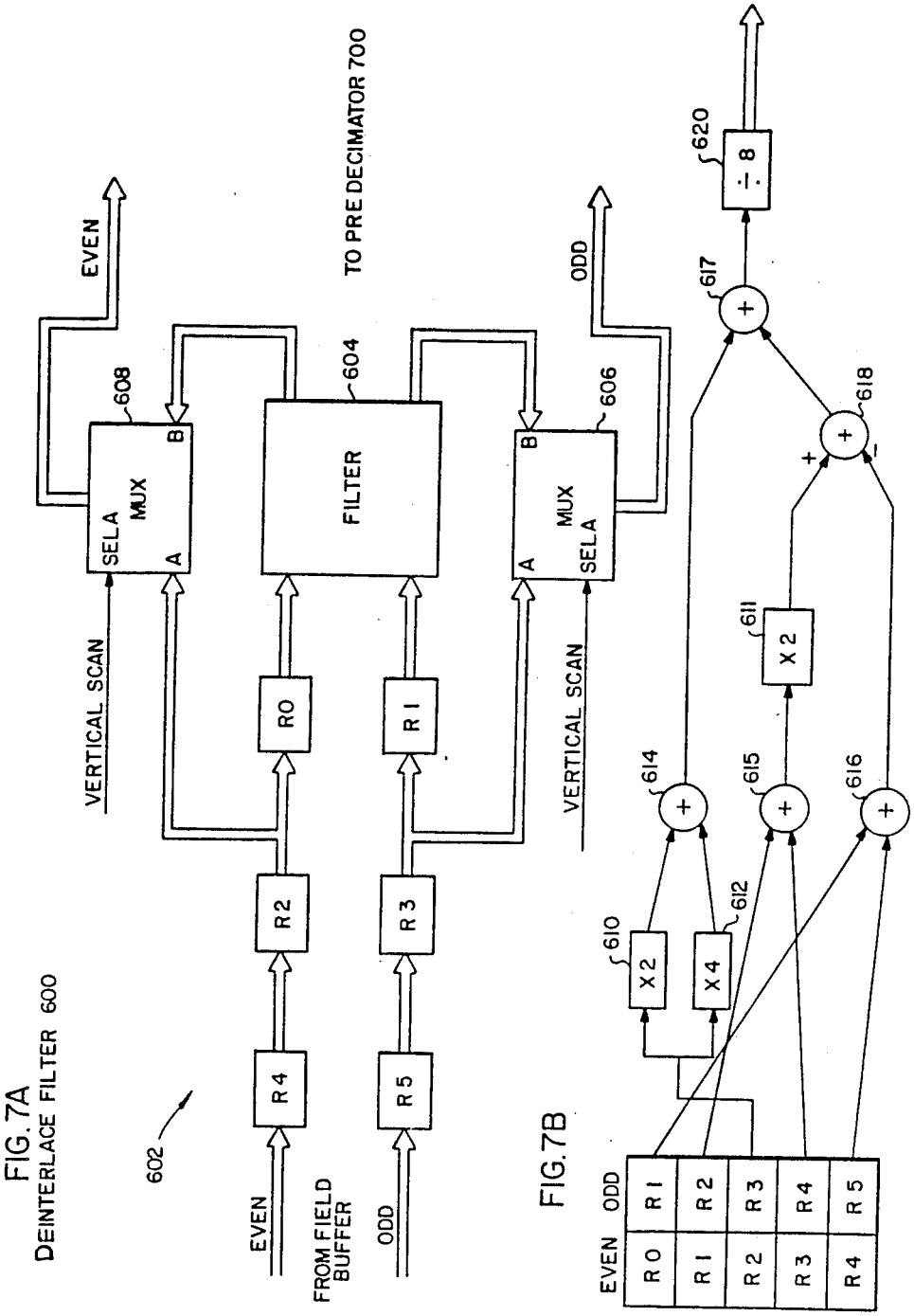
FIGS. 7A and 7B are block diagram representations of a deinterlace filter.

The deinterlace filter 600 of FIG. 3 is illustrated in FIGS. 7A and 7B. The filter 600 includes a 2 byte wide three stage shift register 602, a filter component 604, and multiplexers 606, 608. The even and odd line data from the transposing field buffers 50-52 are clocked at the pixel rate through the shift register 602 having stages R0-R5 which are numbered in scan sequential order for interlaced vertically scanned data from the transposing frame store 18. Although for the sake of simplicity the connections are not explicitly shown, the purpose of the shift register 602 is to make the contents of each stage R0-R5 available to the filter 604. Multiplexers 606, 608 respond to a vertical scan signal to select odd and even outputs, respectively, from the filter 604 when data are being output from the frame store 18 in vertical scan order. When data are being output in horizontal scan order, the multiplexer 608 selects the output of register stage R2 to drive the even byte data stream while the multiplexer 606 selects the output of register stage R3 to drive the odd data byte stream. In the event of horizontal accessing of the frame store 18, a similar deinterlace filter subsequent to the vertical to horizontal transposing frame store provides deinterlace filtering.

The filter 604 contains substantially identical components for the even and odd data streams each of which provide a $-\frac{1}{8}$, 2/8, 6/8, 2/8 and $-\frac{1}{8}$ filtering function. Each of the two odd and even components of the filter 604 is advantageously implemented as shown in FIG. 7B with multiply by two functions 610, 611, a multiply by four function 612, four addition functions 614-617, one subtraction function 618 and a divide by eight function 620. It will be noticed that the multiply and divide functions are implemented as powers of two and that they can therefore be easily accomplished by merely shifting the relative positions of the data bit lines for incoming and outgoing data streams. The inputs to the even and odd data stream filters are indicated by the information shown in the even and odd columns of the table shown in FIG. 7B for the outputs of the shift register 602. Each element in the table refers to a shift register stage within the shift register 602 whose output is connected to a filter input as indicated.

Figure 8:
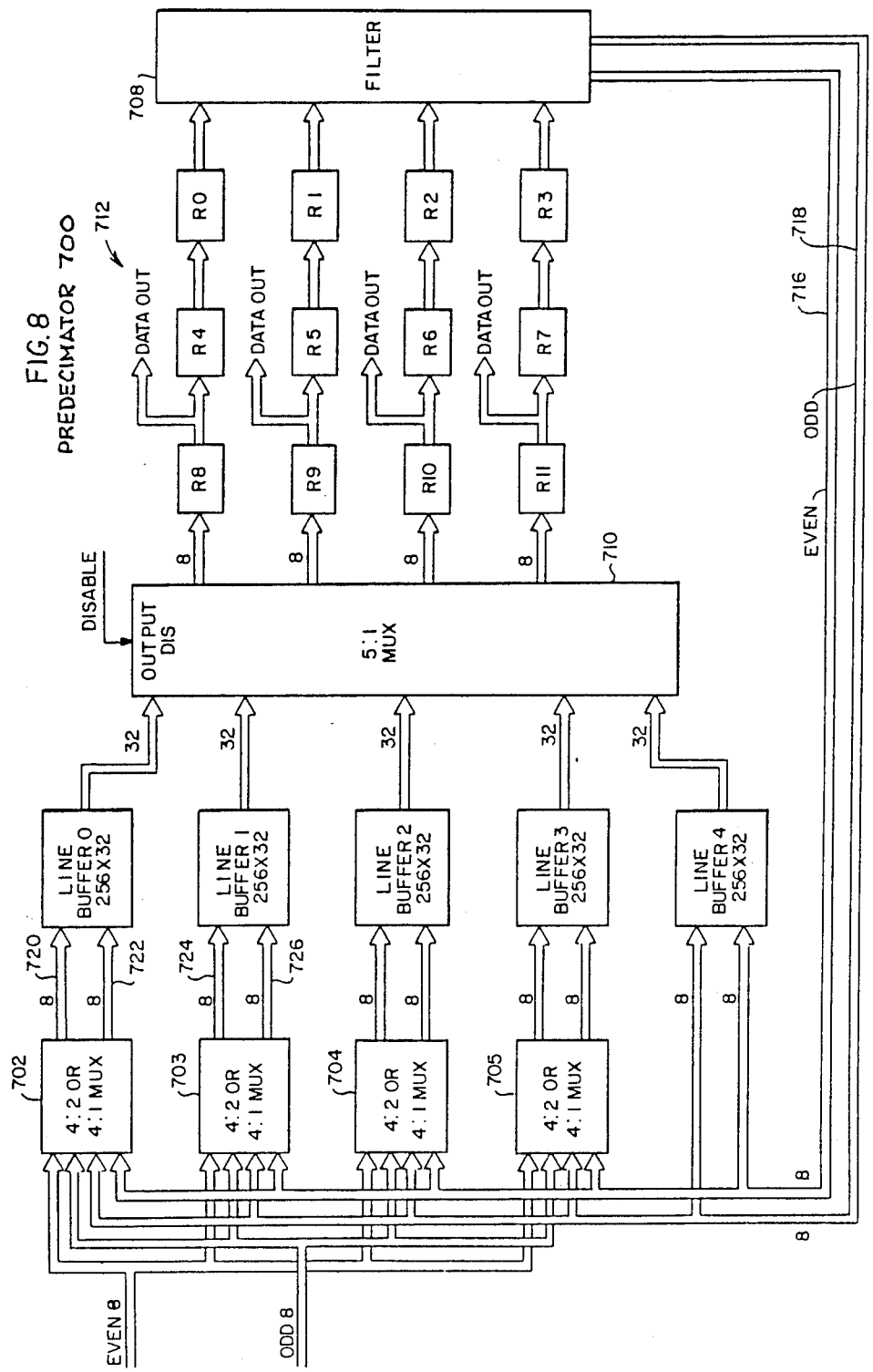
FIG. 8 is a block diagram representation of a predecimator.

Referring now to FIG. 8, the predecimator 700 includes five line buffers designated line buffer 0 through line buffer 4, each of which has a 256 word by 32 bit storage capacity. Line buffers 0-3 each receive two 8 bit data streams from multiplexers 702-705, respectively. Each of the multiplexers 702-705 is capable of selecting one of four input signals and placing the selected input signals on one of the 8 bit buses to its corresponding line buffer. In some modes of operation the two 8 bit bus inputs to the line buffers are driven in parallel. The multiplexers 702-705 must thus be capable of either selecting two of the four input byte streams or one of the four input byte streams depending upon the mode of operation. A line buffer 4 receives two 8 bit data streams as even and odd outputs from a filter 708.

A 32 bit wide 5 to 1 multiplexer 710 provides a 32 bith output which is split into four 8 bit data streams and communicated to a 4 byte wide 3 stage shift register 712. Data are loaded into the line buffers in such an order that they may be read out to fill the 12 bytes of the shift register 712 with a serial sequence of pixel information for a scan line. That is, each register stage of the shift register 712 stores 1 pixel of information, and the pixel information is arranged in raster scan order as designated by the numbering of the registers R0-R11. Registers R8-R11 provide data output to the next stage of the transformation system as well as data output to the second stage of the shift register containing registers R4-R7. The purpose of the shift register 712 is to make available to the filter 708 12 bytes of sequential pixel information in a predetermined order. Although for simplicity not explicitly shown, the outputs of each of the registers R0-R11 are communicated to the filter 708.

The filter 708 actually contains two separate filters operating in parallel. One of the filters generates even numbered pixel data at the pixel rate while the other generates odd numbered pixel data at the pixel rate. The even and odd outputs 716, 718 thus in combination provide feedback data at twice the pixel rate. A disable signal may be utilized to drive an output disable input to the multiplexer 710 at the end of the processing for a scan line to cause zeros to be loaded into the shift register 712. This loading of zeros creates an aesthetic blending by the filter 708 at the end of a scan line and prevents information from the end of a scan line from affecting information at the beginning of the next scan line. Six extra clock signals are provided at the end of each scan line pass through the filter 708 before data are input through the multiplexer 710 for the next scan line to clear the pipeline of the predecimator system, and particularly the shift register 712.

While the wide distribution of the four scan line signals stored by the line buffers 0-4 in order to accommodate different operating modes makes the predecimator 700 appear complex, its operation is actually quite straightforward. In the normal mode of operation vertical scan line information from corresponding vertical scan lines of a pair of sequential fields is received over the even and odd input lines and gated into the line buffer 0. Because these even and odd input lines represent data from consecutive fields, they each carry alternate pixels for a frame. That is, for a given scan line column, the pixel information for rows 0 and 1 appear on the even and odd buses, respectively, followed by pixel information for rows 2 and 3 on the even and odd buses, respectively, followed by the pixel information for rows 4 and 5 on the even and odd buses, and so forth. The multiplexer 702 connects the upper output stream 720 to the even input bus and simultaneously connects the output stream 722 to the odd input bus. Gating at the input latches to the line buffer 0 directs the first or row 0 pixel information to byte position 0 of the input data latch while the row 1 pixel information on the bus 722 is gated to byte position 1 of the input data latch. At the next pixel clock period the pixel, information for frame row 2 appearing on the bus 720 is gated to the position 2 input data latch and the frame row 3 pixel information appearing on the bus 722 is gated to the position 3 input data latch. The first four pixel bytes are thus stored in the input data latch in sequential scan order at the end of 2 pixel clock times with the data being written into address word location 0 and the input data buffer being reloaded with pixel information for row positions 4–7 during the third and fourth pixel clock times for storage at address word location 1. It is thus seen that a vertical scan column from a pair of sequential fields is deinterlaced and stored in the line buffer 0 in raster scan order during a vertical line scan time period which will be designated scan time N to provide a frame of reference.

During this same vertical scan time and simultaneously with the writing of a frame scan line into the buffer 0, previously written vertical scan line information is read from the line buffer 2 four bytes at a time and output through the 5 to 1 multiplexer 710 to the first stage of the shift register 712 comprising registers R8–R11. Subsequent 4 byte words are read from the line buffer 2 and shifted through the shift register 712 at each pixel clock time. Since the data read out of the line buffer 2 and shifted through the shift register 712 comprise a 4 byte parallel data stream, the effective bandwidth of this data transfer operation is four times the pixel rate. The filter 708 responds to the data content of the individual byte registers R0–R11 in the shift register 712 to output 2 bytes of data designated even and odd on bus lines 716 and 718 at the pixel rate. Because the input scan line information to the line buffer 0 and the even and odd output information from the filter 708 each comprises 2 bytes in parallel while the information being read from line buffer 2 comprises 4 bytes in parallel, the line buffer output information has twice the effective bandwidth of the other two data streams. The line buffer 4 is gated to provide to its input data latch alternate bytes from the even and odd data streams from the filter 708 in a manner similar to the gating of even and odd frame data into the line buffer 0. Consequently, as 4 byte sequences of input pixel information are loaded into the line buffer 0, four byte sequences of filtered information from the filter 708 are loaded into the line buffer 4. At the point in time during a scan line cycle where half of the pixels for the incoming vertical scan line have been loaded into the, line buffer 0, half of a scan line of pixel information from the filter 708 will have been loaded into the line buffer 4 since the bandwidth of the two data stream inputs to the line buffer 0 and the line buffer 4 are the same, i.e. twice the pixel rate. However, while line buffers 0 and 4 are being loaded at twice the pixel rate, the line buffer 2 is being output at four times the pixel rate, so that as half lines of pixel information are loaded into line buffers 0 and 4, a complete line of pixel information is being passed through the shift register 712 and processed by filter 708. The half line of data stored in the line buffer 4 thus represents a 2:1 compression ratio, since the processing of a full line of information has resulted in the storage of a half line of information.

It will be noted that during the first half of the scan line period the full, uncompressed pixel information was transferred through the shift register 712 and presented to down path circuitry for possible use thereby by the outputs of shift register stages R8–R11. Thus, even though a 2:1 data compression has taken place, the original data may be stored and preserved for further use by the down path circuitry. During the next one-fourth of the scan line time period (time one-half to three-fourths), the line buffer 0 continues to receive pixels of video input information in scan line order while line buffers 2 and 4 are interchanged. The 2:1 compressed data are read out of the line buffer 4 at four times the pixel clock rate, passed through the shift register 712 to the filter 708 for compression processing and written into the line buffer 2. As the 2:1 compressed data are read from the line buffer 4 and passed through the shift register 712, they are also made available for storage and later use by down path circuitry through the data outputs from registers R8–R11. At the end of three-quarters of the vertical scan line period, a scan line of 4:1 compressed data has been loaded into the line buffer 2. During the next one-eigth of a line scan period, the 4:1 compressed data are read out of the line buffer 2, and in response 8:1 compressed data are stored in the line buffer 4. This process of sequentially further compression by two with alternate storage in the line buffer 2 and the line buffer 4 is continued to the end of vertical scan line time period at which a complete vertical frame line has been loaded into the buffer 0 and the scan line being circulated through the filter 708 has been compressed to a single pixel or byte.

This predecimating thus provides down path circuitry with a selection of scan line information which has been processed in a high quality filtering process and has compression ratios in powers of two. This predecimating performs much of the burden which would otherwise be incurred by the vertical transformation circuitry to provide an improved final fully transformed video image for a given data resolution of the data transformation system. For example, if a compression ratio of 17:1 is required, the transformation system may select from the predecimated data having a compaction ratio of 16:1 and provide only a very small additional compaction required to increase the ratio to 17:1.

At the end of vertical scan line time period N, a new vertical scan line time period N+1 begins with the multiplexer 704 gating a next vertical scan line pair of even and odd field data into line buffer 2 in sequential order just as the previous scan line had been written into line buffer 0. At the same time, a flip-flopping data exchange begins between the line buffer 0 and the line buffer 4 with the scan line data being predecimated to provide sequential compressions by factors of two as the scan line data are recirculated through the shift register 712 and the filter 708 as previously done for the data stored in the line buffer 2 during the vertical scan line time N. For the next vertical line time period N+2, the cycle is repeated with the incoming scan line pixel data stream being loaded into the line buffer 0 while the contents of the line buffer 2 are predecimated.

In the mode of operation wherein data are received on the even and odd input buses in horizontal rather than vertical scan line order, the data buffering process must be slightly different because each even and odd input carries a complete sequence of pixel row information by itself rather than information for alternate pixel locations as was the case for the interlaced vertical scan line information. Complete even row data are on the even line, while complete odd row data are on the odd line. For this mode of operation multiplexers 702 and 703 operate to select and gate the even and odd incoming horizontal data streams to the line buffer and the line buffer 1, respectively. The multiplexer 702 causes the even line incoming data stream to be alternately gated onto the upper bus 720 and the lower bus 722 to permit the loading of the incoming pixels into the 4 byte input data buffer for the, line buffer 0 in sequential scan order. Similarly, the multiplexer 703 operates to alternately gate the incoming odd horizontal scan line information onto the upper bus line 724 and the lower bus line 726 to permit the loading of the odd horizontal scan line information into the line buffer 1 in sequential scan order. While each of the line buffers 0 and 1 are now loaded at the pixel rate instead of twice the pixel rate for the vertical scan mode of operation, the total incoming data rate remains at twice the pixel rate because two line buffers are used in parallel instead of one. As the horizontal scan time interval continues, previously loaded data are read out of the line buffer 2 at four times the pixel rate, passed through the shift register 712 and the filter 708 to be stored by the line buffer 4 with a 2:1 compaction ratio. Since the data are read out of the line buffer 2 at four times the rate that data are being written into each of the line buffers 0 and 1, a full scan line of data will have been read out of the line buffer 2 and passed through the filter 708 by the time one-fourth of a line of data has been stored in each of the line buffers 0 and 1. The original contents of the line buffer 2 will have been fully predecimated by the time line buffers 0 and 1 are each loaded with one-half of a line of information. During the second half of the horizontal line time interval, the previously written contents of the line buffer 3 are predecimated. During the next horizontal scan line time period interval, horizontal scan line information is written sequentially into the line buffer 2 and the line buffer 3 for even and odd scan line row information, respectively, while the previously stored contents of the line buffer 0 are predecimated during a first half of the scan line time period interval and the previously stored contents of the line buffer 1 are predecimated during the second half of the scan line time period interval. It is thus apparent that the predecimation process is substantially the same for both vertical and horizontal scanning, although the buffering of the incoming data must be somewhat different to account for the differences in the interlaced and non-interlaced incoming video data streams.

The filter 708 contains two parallel filters providing a $-1/16, 0, 5/16, \frac{1}{2}, 5/16, 0, -1/16$ filtering function and are identical except for their input connections within the shift register 712.

Figure 9:
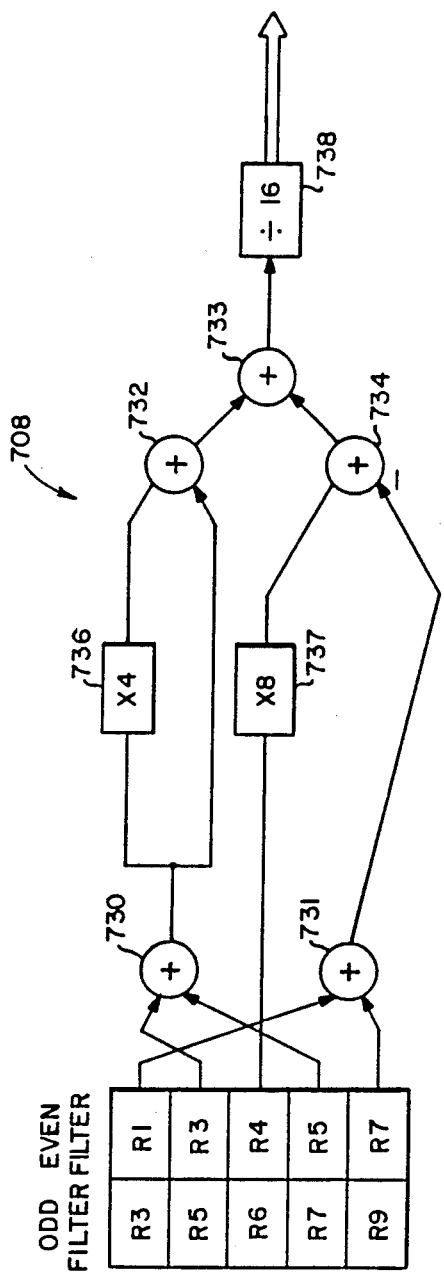
FIG. 9 is a block diagram representation of a filter for the predecimator shown in FIG. 8.

A highly advantageous implementation for the filter 708 is illustrated in FIG. 9, to which reference is now made. While only one filter 708 is shown, it will be appreciated that duplicate even and odd filters are employed with their inputs connected to the respective even and odd registers indicated by the table at the inputs to the filter. It will be seen that the filter is very conveniently implemented with four adders 730-733 and a single subtractor 734. No actual multiplication or addition is required because the multiply blocks 736 and 737 and the divide block 738 are implemented in powers of two to permit the operations to be accomplished by merely shifting the relative bit positions of the incoming and outgoing data information. Because of the elimination of actual multiply and divide operations, the filter 708 can be implemented at far less expense than conventional seven point filters and can operate at the 70 nanosecond pixel clock rate.

Figure 10:
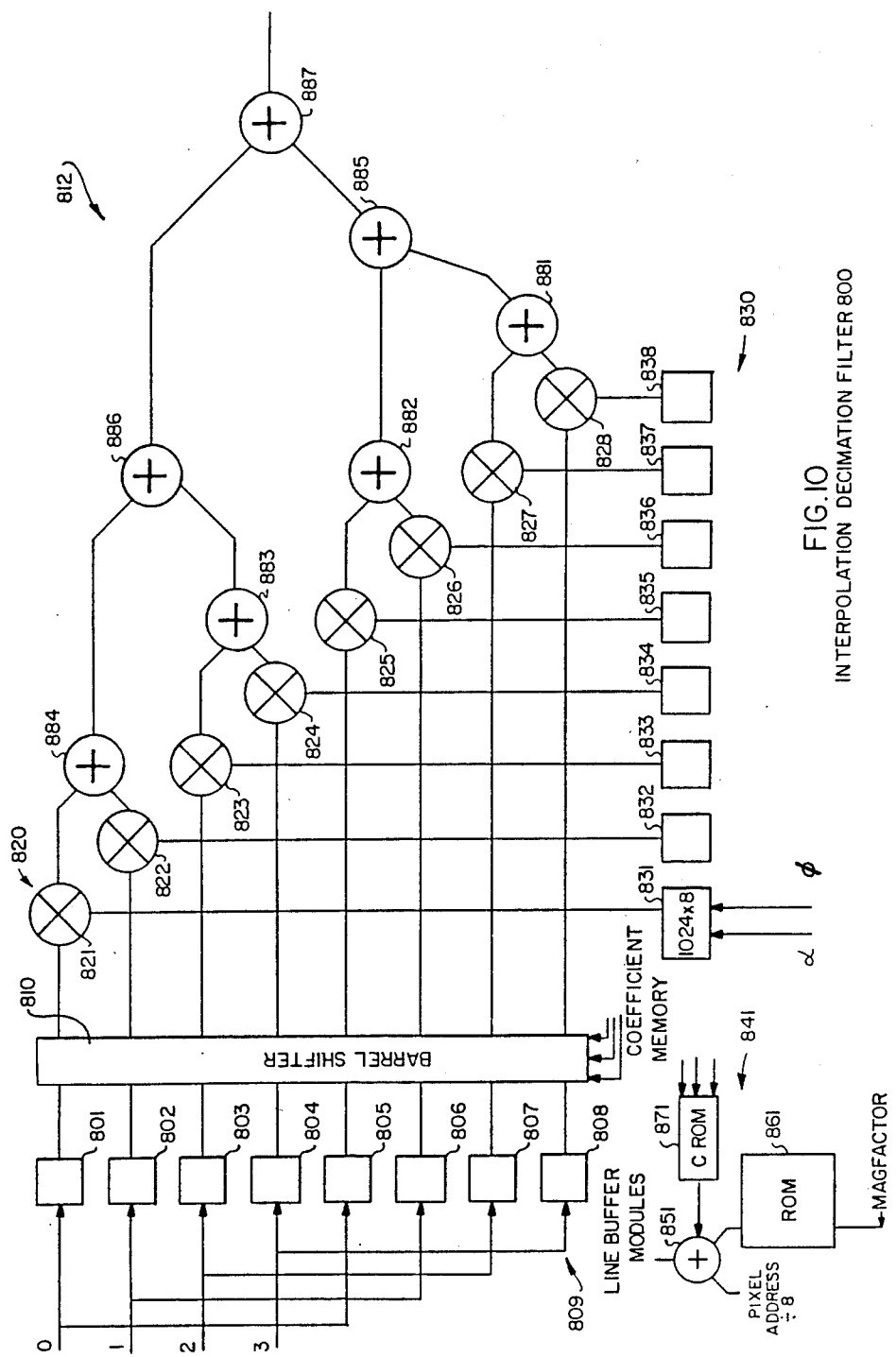
FIG. 10 is a schematic and block diagram representation of an interpolation decimation filter.

Interpolation decimation filters 800 and 906 shown in FIG. 3 are essentially the same and are representatively illustrated by the interpolation decimation filter 800 as shown in FIG. 10 to which reference is now made. The filter 800 provides the ultimate functional relationship between the source or input video data and the target data in the vertical dimension.

A vertical source address generator 912 (FIG. 3) calculates and supplies to the interpolation decimation filter 800 a sequence of vertical pixel source addresses corresponding to a sequence of output target video data points in response to the vertical target address counter 914 and the transform composer and factorizor 916. The addresses supplied by the vertical source address generator 912 have a resolution of 1/64 pixel and include a 4 bit magnification factor parameter of between 0 (for a 1/1.99 sized image or larger) and 15 (for predecimated data compressed by $2^{15}$ or more). The interpolation decimation filter 800 supplies a video data value calculated from four pixel locations appearing on each side of the source address. Sixteen filter functions are available for calculating the output video data value. One is selected in response to a four bit parameter alpha in accordance with the desired compaction ratio provided by the interpolation decimation filter 800 in addition to a selected predecimation compaction.

A two line double buffer 809 is implemented in 8 segments 801-808 and receives video data 4 bytes parallel from the R8-R11 data outputs of the predecimator 700 (FIGS. 3 and 8). For each vertical scan, line of a frame, the received data include a full line of video data plus all of the predecimated copies of the full line, which copies occupy a second full line of data. Hence, there is a need for storing two lines of data in each half of the double buffer 809. The double buffering permits a new two lines of video data to be received while the immediately preceding two lines of data are operated upon to provide one line of target image video data.

As video data are received by the double buffer 809, the first four bytes are stored respectively in the four segments 801-804, the second four bytes are stored respectively in the four segments 805-808, the third four bytes are stored respectively in the four segments 801-804, and so forth. The eight part segmentation of the double input buffer 801-808 thus assures that the pixel data for the four adjacent pixel locations of each side of an address point (8 total) can be read in parallel from the double input buffer.

A barrel shifter 810 receives the 8 bytes of pixel data from the double input buffer 809, circulates the data to a desired position in response to the three least significant bits of the nonfractional portion of the source address and presents the circulated video data to an eight segment multiplier 820 having segments 821-828. The data are circulated such that the pixel data corresponding to the nonfractional portion of the source address are presented to a central multiplier segment 824. The pixel data for the three pixels sequentially to the left thereof are presented to segments 823, 822 and 821 while the pixel data for the four pixels to the right are presented to segments 825-828, respectively. The eight multiplier segments 821-828 thus receive as first inputs 8 bits of video data for each of 8 sequential pixel locations centered about the source address point.

Multiplier segments 821-828 each receive as a second input an eight bit coefficient or weighting function from an 8 segment coefficient memory 830 having segments 831-838. Each segment is configured as 1024 words of eight bits each. The coefficient memory 830 receives as a partial address the six bit fractional part of the source pixel address. These six bits provide a phase factor $\phi$ which defines the one of 64 subpixel points for the 1/64 pixel resolution of the source address. A filter function may thus be centered about the subpixel source address with the pixel data being weighted in accordance with its position on a filter function curve relative to the subpixel address.

The coefficient memory 830 further receives four bits of address in accordance with the parameter alpha which is related to the magnification produced by the interpolation decimation filter 800. The coefficient memory 830 may thus contain 16 different filter functions for each of the 64 subpixel source addresses. The filter function may thus be tailored to the degree of magnification (compaction), the magfactor, provided by the interpolation decimation filter 800. For example, if the output target image is to be at least as large as the selected original or predecimated copy of the source image, it may be desirable to use a filter function which heavily weights video data for pixel locations very close to the source address. On the other hand, if compaction approaching $\frac{1}{2}$ is desired, a filter function giving at least some weight to all eight pixel locations near the source address may be desirable. It will be recalled that the predecimator 700 provides compaction by all practical powers of $\frac{1}{2}$ so that the further compaction provided by the interpolation decimation filter 800 can always be by a magnification factor greater than $\frac{1}{2}$.

An addressing circuit is illustratively represented by a segment 841, which is one of eight segments providing address inputs to the eight double buffer memory segments 801-808 respectively. The address segment 841 includes an adder 851, a magnification factor ROM 861 and a carry ROM 871. The adder 851 receives as a first input the nonfractional part of the source address divided by eight. Division by eight is of course accomplished by merely shifting off the three least significant bits of the integer portion of the source address. The four bit magfactor parameter is presented as an address input to the ROM 861, which generates an address shift in accordance with the magnification factor. If the target image is to be larger than half the size of the source image, magfactor is zero, and the full size copy of the source image is output to the barrel shifter 810. For a target image compressed to between $\frac{1}{4}$ and $\frac{1}{2}$ the size of the source image, the ROM 861 translates the source address to the half size predecimated copy of the source image and so forth.

The carry ROM 871 receives the three least significant bits of the integer part of the source address and selectively provides a carry output to increment the translated buffer memory 809 word address when the three least significant bits designate a number between 4 and 7, inclusive. This selective incrementing accommodates situations where the desired eight pixels cross a word boundary for the buffer memory 809. It will be noted that the addresses for segments 806-808 must be selectively decremented rather than incremented.

As an example, assume that the source address is 25 5/64 (binary 00011001.000101) for a full size target image. The divide by 8 pixel address input to the adder 851 thus becomes 3 (binary 00011). Magfactor=0 will designate a full size image, and the output of the ROM 861 to the adder 851 will be zero. For the given address, it is desired to read from the buffer memory 809 video data for pixel location 22-29. The data for pixels 24-29 are stored at word location 3, buffer segments 801-806, while data for pixel locations 22 and 23 are stored at word location 2 in buffer segments 807 and 808, respectively. The carry ROM 871 thus outputs a zero in response to a 1 (binary 001) input, and buffer address word 3 is presented to the segment 801 by the adder 851. Similarly segments 802-806 will receive address word 3 from their respective address circuit segments 841, and segments 807 and 808 will receive a decremented addresses word 2.

Data for the pixel defined by the integral portion of the source address (pixel 25) is output from the segment 802 and is circulated downward (as shown) two places by the barrel shifter 810 in response to the three least significant address bits (001) so that data for the designated sources pixel are presented to the multiplier segment 824. The coefficient memory 830 can thus be programmed with the assumption that the video data for the eight pixels about a source point will always be presented in ascending order to multiplier segments 821-828. The same effect could be accomplished by eliminating the barrel shifter 810 and adding three addresses inputs to the coefficient memory 830, with each of the segments receiving additional programming to accommodate the eight possible location where the data for the designated source pixel might occur.

The multipliers 821-828 of the arithmetic network 812 thus receive the 8 pixels of video data from the barrel shifter 810, multiply the pixels by their appropriate coefficient factor from the coefficient memory 830 segments 831-838 and output the results to a summing network 881-887 which sums the eight products to generate the pixel of video data corresponding of to the input source address. The resulting steam of pixel data from the interpolation decimation filter 800 is fully processed in the vertical dimension and is then presented to the vertical to horizontal transposing memory 900 (FIG. 3) for the initiation of processing in the horizontal dimension separately from the processing in the vertical dimension.

Referring now to FIG. 3, the interpolation decimation filter 800 receives vertical lines of the source image. Even if the video data are read out horizontally from the horizontal to vertical transposing memory 18, the video data are still treated as a vertical scan. The net effect is a 90° rotation and mirror imaging which is compensated by the transform composer and factorizor 916.

It will be recalled that x and y are used to identify pixel locations within the target or output image while u and v are used to identify pixel locations within the source image. At the interpolation decimation filter 800, each vertical scan line corresponds to a constant u value with the u value being incremented for each sequential vertical scan line starting with zero and moving from left to right. For each vertical scan line the interpolation decimation filter 800 receives a sequence of v address inputs from the vertical source address generator 912 specifying a sequence of pixel addresses within a scan line for a sequence of video data pixels. The interpolation decimation filter 800 responds to each v address received by outputting a pixel of video data as a function of the pixels positioned about the v point in the vertical scan line.

Equation (30) defines v as a function of u and y and a number of constants from an "a" matrix (Table I below) which defines the desired relationship between the target and source images. During each vertical retrace time between fields the transform composer and factorizor 916 calculates the required matrix constants in response to operator input commands and supplies them to the vertical address generator 912. The vertical address generator 912 itself generates the u and y terms by in effect starting at zero for the first pixel of the first scan line and incrementing y for each successive pixel and incrementing u for each successive vertical scan line.

Similarly, for the horizontal dimension the horizontal address generator 908 receives the appropriate "a" matrix constants from the transform composer and factorizor 916 and calculates the, horizontal source addresses u for each horizontal scan line in accordance with equation (31) as a function of x and y. x and y are, in effect, established by starting at 0,0 for the first pixel of each field and incrementing x for each pixel and incrementing y for each horizontal scan line.

While the vertical and horizontal addresses v and u could of course be generated from the equations therefor by microprocessors, it would be very difficult to accomplish this at the 70 ns pixel rate. The vertical source address generator 912 and the horizontal source address generator 908 are special purpose circuits for calculating the v and u equations (30), (31) at the pixel rate. It is of interest to note that video data enter the interpolation decimation filter 800 at twice the pixel rate because of deinterlacing but pass through the remainder of the system at the pixel rate. The vertical and horizontal source addresses need therefore be generated at only the pixel rate and not twice the pixel rate.

Figure 11:
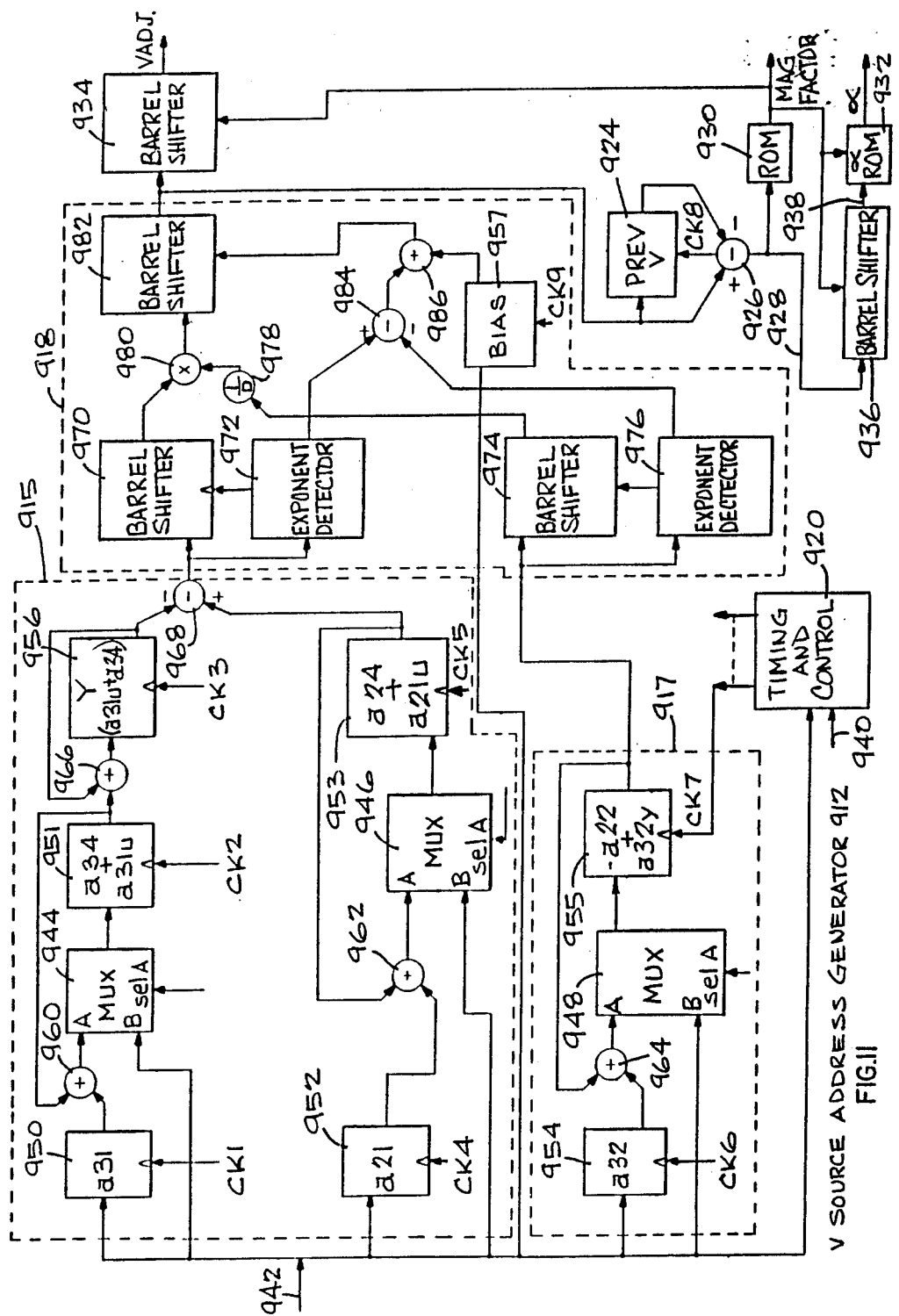
FIG. 11 is a schematic and block diagram representation of a vertical source address generator.

Referring now to FIG. 11, the vertical source address generator 912 includes a numerator calculation circuit 915, a denominator calculation circuit 917, a divider circuit 918 to divide the numerator by the denominator and a timing and control circuit 920 for generating the various timing and control signals used throughout the vertical source address generator 912.

A previous v register 924 receives and temporarily stores each vertical address v. A subtractor 926 subtracts the stored previous v address from the current v address to generate an 18 bit difference parameter on a signal path 928. The most significant bit of the 18 bit difference parameter is a sign bit, while the six least significant bits represent a fractional part. The difference parameter is used as an estimate of the derivative of v with respect to time from which the terms magfactor and alpha are derived.

A magfactor ROM 930 receives the integer portion of the difference parameter and outputs the term magfactor as the integer part of the log base 2 of the absolute value of the difference parameter. Magfactor equals 0 for difference parameters of 0-1.99, 1 for difference parameters 2.00-3.99, 2 for difference parameters of 4.00-7.99, and so forth. Only absolute values are considered. Magfactor commands the interpolation decimation filter 800 to use a particular predecimated copy and is communicated to a barrel shifter 934 which shifts (divides), the vertical source address by a number of bit positions equal to magfactor to produce an adjusted source address. When a predecimated copy of a line of data is selected having compaction by a given power of 2, the source address must be divided by the same power of 2 for compatibility, and the barrel shifter 934 performs this function.

The difference parameter is the reciprocal of the magnification of the target image relative to the source image. For example, a double size target image will produce difference parameters of 0.5, while a half size target image will produce difference parameters of 2.0, and so forth. The difference parameter is thus a measure of the magnification (including compaction) of the target image relative to the source image. A barrel shifter 936 receives the difference parameter and shifts it toward less significant bit positions by a number of bit positions indicated by the parameter magfactor to generate an interpolator difference signal in a signal path 938 which represents the magnification (compaction) which must be performed by the interpolation decimation filter 800 over and above that performed by a predecimated copy selected by the parameter magfactor.

A parameter interpolator difference is used as an address input to an alpha ROM 932 which responds by generating a 4 bit parameter, alpha, which selects one of 16 filter functions for use by the interpolation decimation filter 800. To improve target image quality, it is desirable to use different filter functions for different degrees of magnification (compaction) of the target image by the interpolation decimation filter. Filtering of the predecimated copies is handled by the predecimation filter 700 so that only the additional filtering by the interpolation decimation filter 800 is of interest at this point.

For example, if the target image is to be full size or larger, a high peak, narrow filter function should be used which places great weight on the source pixels nearest to the vertical source address point. As the target image is compacted by greater and greater amounts, the filter function should become flatter and broader, thus putting less weight on pixels immediately adjacent the source address point and more weight on pixels farther from the source address point.

The interpolation decimation filter 800 provides all degrees of image enlargement but a maximum compaction by a factor of 1.99. Any additional compaction would be accomplished by selecting a smaller predecimated copy. For example, compaction of the target image by a factor of 16 would be accomplished by selecting the fourth predecimated copy (magfactor equal 4) and by introducing a compaction factor of 1 in the interpolation decimation filter 800 (no futher compaction). The term magfactor would be 4, the difference parameter would be 16 and the interpolator difference parameter would be 1. For compaction of the original image by 32 the fifth predecimated copy would be selected, magfactor would be 5, the difference parameter would be 32 and the interpolator difference parameter would be 1. For compaction of the original image by the factor of 15.4, the third predecimated copy would be selected, magfactor would be 3, the difference parameter would be 15.4 (binary 1111.011001), and the interpolator difference parameter would be 1.92 (binary 1.111011).

The integer part of the interpolator difference parameter on the signal path 938 has a maximum value of 1, and its fractional part has 6 bits of accuracy. The interpolation difference parameter thus has 7 bits, and the alpha ROM 932 can have a size of 128 by 4. Since a single filter function is adequate for all degrees of image enlargement, full size and slight compaction, it is desirable to divide the range of the interpolation difference parameter between 1.00 and 1.99 into 16 equal parts along a logarithmic scale with each part being assigned a different alpha parameter and a corresponding filter function.

The alpha ROM 932 is thus loaded to output 0 for addresses 0–1.04 (binary 1.000011), 1 for input addresses 1.05–1.09 (binary 1.000100 to 1.000110), 2 for input addresses 1.10 to 1.14 (binary 1.000111 to 1.011001), and so forth up to 15 for input addresses 1.91 to 1.99 (binary 1.111010 to 1.111111). A different filter function can thus be provided for each of the 16 values of alpha ranging from narrow and steep for alpha equal 0 to broad and flat for alpha equal 15. The same filter function is thus used for full size images, enlarged images and the largest sized group of compacted images.

The vertical source address generator 912 includes the numerator circuit 915, the denominator circuit 917, and the divider circuit 918 which divides the output of the numerator circuit 915 by the output of the denominator circuit 917 and then denormalizes the quotient before outputting the vertical address, v, to the barrel shifter 934. The timing and control circuit 920 responds to commands received from vertical target address counters 914 (FIG. 3) on signal paths 940 which indicate the end of a frame interval as well as information from the transform composer and factorizor 916 received on a communication bus 942 to generate the various timing and control signals used throughout the vertical source address generator 912. It will be appreciated that the actual circuitry of the source address generator has been represented in a simplified form for clarity of explanation. For example, multiplexers 944, 946 and 948 can be implemented through selective gating of tristate logic circuits rather than as separate integrated circuits called multiplexers, and data can be sequentially loaded one byte at a time into 32 bit (4 byte) data registers 950, 951, 952, 953, 954, and 955, where the communication bus 942 includes, for example, an 8 bit data bus from an 8 bit microprocessor. A data register 956 is also a 32 bit register, while a bias data register 957 may be implemented as an 8 bit register.

It will be recalled that the vertical source address generator 912 solves equation (30) to generate vertical source addresses at the pixel rate. During each vertical retrace time interval, the transform composer and factorizor 916 loads the constants for equation (30) into corresponding registers of the vertical source address generator 912 over the communication bus 942. For example, the numerator constants $a_{31}$, $a_{34}$, $a_{21}$, and $a_{24}$ are loaded respectively into 32 bit registers 950, 951, 952 and 953. The timing and con-trol circuit 920 renders the select A inputs of multiplexers 944 and 946 at logic zero during this interval to permit the data to be communicated to the inputs of registers 951 and 953. Thereafter the select A inputs are set to logic 1 so that the register 951 receives data from a 32 bit adder 960 through the A input of the multiplexer 944, while the register 953 receives data from a 32 bit adder 962 through the A input of the multiplexer 946.

Similarly, during the vertical retrace interval, constant $-a_{22}$ is loaded into the 32 bit register 954 and constant $-a_{22}$ is loaded into the 32 bit register 955 through the B input to the multiplexer 948. Thereafter, the select A input to the multiplexer 948 is set to logic 1 so that data may be communicated from the 32 bit adder 964 through the A input of the multiplexer 948 to the input of the data register 955.

It will be appreciated that the adder 960 receives inputs from the output of the $a_{31}$ register 950 as well as the register 951 to present the sum of these inputs to the main input of the multiplexer 944. Similarly, the adder 962 adds the output of the $a_{21}$ register 952 to the output of the register 953. The numerator circuit 915 further includes an adder 966 which adds the output of the register 951 to the output of the register 956 and presents the sum back to the input of the register 956. A subtractor circuit 968 subtracts the output of the register 956 from the output of the register 953 to generate a difference signal which is the solution to the numerator portion of equation (30) and which is presented to the divider circuit 918. The adder circuit 964 adds the output of the $a_{32}$ register 954 to the output of the register 955. The output of the register 955 becomes the solution to the denominator portion of equation (30) and is also presented to the divider circuit 918.

As a frame of reference, pixel time intervals will be defined as a function of u and y corresponding to the vertical addresses, $v(u,y)$, such that at the output of the numerator circuit 915 and the output of the denominator circuit 917, data for a given pixel address shall be valid at the occurrence of a corresponding pixel clock transition. For example, at pixel clock time $t_{0,0}$ data shall be valid for the pixel corresponding to vertical source address $v_{0,0}$, and at pixel clock time 2,2 data shall be valid for pixel source address $v_{2,2}$ and so forth. It will be appreciated that at the vertical source address generator 912 vertical addresses are measured in terms of the target image pixel locations y while horizontal addresses are measured in terms of the first image pixel locations u.

During the vertical retrace interval, the register 956 is cleared while constants are loaded into the other registers. Looking at equation (30), it will be observed that for the first pixel clock time $t_{0,0}$ the variables u and y will both be 0, so that the solution to v is $a_{24}$ divided by $-a_{22}$. Because the register 953 has been preloaded with the constant $a_{24}$ and the register 956 has been cleared during the vertical retrace interval, at time $t_{0,0}$, the subtractor 968 generates the appropriate numerator term $a_{24}$ as the output of the numerator circuit 915. Similarly, the register 955 has been preloaded with the constant $-a_{22}$ and outputs this term as the proper denominator term for equation (30).

Clock signal CK3 loads the register 956 with the output of the adder 966 at each pixel clock time. Thus, at pixel clock time $t_{0,0}$, the register 956 is loaded with the sum of $0+(1)(a_{34})$. The output of the register 956 thus represents the proper value of $u=0$ and $y=1$ for the first portion of the numerator of equation (30) at the second clock time $t_{0,1}$. Clock signal CK3 is active at this time and at each additional pixel clock time so that the constant $a_{34}$ stored in the register 951 is added to the contents of the register 956 at each pixel clock time. Since y is incremented at each pixel clock time, the next result is multiplication of $a_{34}$ by y by means for successive additions. That is, the output of the first portion of the numerator of equation (30) for y=0, 1, 2, 3, 4 etc. is generated at the output of the register 956 by adding to the register 956 the value ($a_{31}u+a_{34}$), 0 times, 1 time, 2 times, 3 times, 4 times, and so forth, respectively. In a similar manner, the register 951 is clocked with clock signal CK2 during an interval between successive line scans so that the register 951 stores the constant $a_{34}$ during the first line scan for line 0, the value $a_{34}+(1-)(a_{31})$ during the second line scan for vertical line 1, $a_{34}+(21)(a_{31})$ for the third line, vertical line 2, and so forth. The output of the register 951 thus continually represents the term $a_{31}u+a_{34}$. This value is added to the contents of the register 956 at each pixel clock time so that the effect is the same as multiplying the output of register 951 by y as y is incrementally stepped through successive pixel locations within a vertical line scan. Between each successive line scan the register 956 must be cleared or reset to reflect the new vertical line scan starting position of y=0.

This general concept of repeatedly adding or accumulating a term at the pixel clock rate to accomplish multiplication by y and repeatedly adding a term at a line clock rate to accomplish multiplication by u is used throughout the vertical source address generator 912. In the horizontal source address generator 908, a similar technique is used with successive additions at the pixel clock rate being utilized to accomplish multiplication by x and successive additions at the horizontal line clock rate being utilized to accomplish multiplication by y.

It will be observed that the second term of the numerator is generated at the output of the register 953 which is initially loaded with a constant $a_{24}$ before the beginning of each field time and then clocked with signal CK5 at the vertical line clock rate between successive vertical line scans so that the output of the register 953 represents $a_{24}+a_{21}u$. Similarly, the clock signal input to the register 955, CK7, is activated to initially load the constant $-a_{22}$ into the register 955 and then to add the term $a_{32}$ to the contents of the register 955 at the pixel clock rate so that the output of the register 955 represents the value $a_{32}y-a_{22}$. This is the denominator of equation (30). A barrel shifter 970 receives the successive 32 bit words of video data for successive pixel addresses and operates in conjunction with an exponent detector 972 to convert the numerator into a floating point form with the output of the barrel shifter 970 providing 16 bits of data representing the mantissa of the numerator and the exponent detector 972 outputting 8 bits representing the exponent of the numerator term. Conversion to the floating point representation eliminates the need to carry leading 0's and permits the 16 bit output of the barrel shifter 970 to carry the most significant 16 bits of actual numerical data. In a similar manner, the barrel shifter 974 and the exponent detector 976 convert the denominator term to a floating point representation. A reciprocal circuit 978 receives the 16 bit mantissa of the denominator term and outputs the reciprocal thereof. One suggested approach for accomplishing this reciprocation at the 70 ns pixel clock rate is to utilize the most significant 8 bits of the denominator term to address a conversion table storing reciprocal values and to utilize the least significant 8 bits of the denominator term to generate a linear interpolation between adjacent values in the reciprocal table. The reciprocated mantissa of the denominator is multiplied by the mantissa of the numerator in a hardware multiplier 980, and the product is presented to a barrel shifter 982. A subtractor 984 subtracts the exponent of the denominator from the exponent of the numerator to accomplish the division function, and an adder 986 adds the difference to a bias term which is stored in the bias register 957 before the beginning of each field scan time. The "a" constants are selectively shifted for optimum utilization of the 32 bit capacity of the numerator circuit 915 and the denominator circuit 917 prior to loading into the corresponding registers 950-955 before the start of each field scan time. A constant corresponding to the number of shift places of these constants is loaded into the bias register 957 for addition to the output of the subtractor 984 to denormalize the exponent term to correctly represent the actual value of the vertical address. This denormalized exponent term is output by the adder 986 to the barrel shifter 982 for a proper shifting operation to provide a conversion back to a 16 bit fixed point number representation at the output of barrel shifter 982. This output of the barrel shifter 982 is the actual fixed point representation of the actual vertical address without adjustment for predecimation. As explained above, the barrel shifter 934 receives this vertical address and adjusts it by division by a selected power of 2 to provide an adjustment to accommodate a particular selected predecimated copy of the video data. It will be appreciated that the bias term stored in the bias register 957 can be either positive or negative, depending upon the values of the terms from the "a" matrix. These values will vary with the particular manipulation of the video image which is being commanded.

Figure 12:
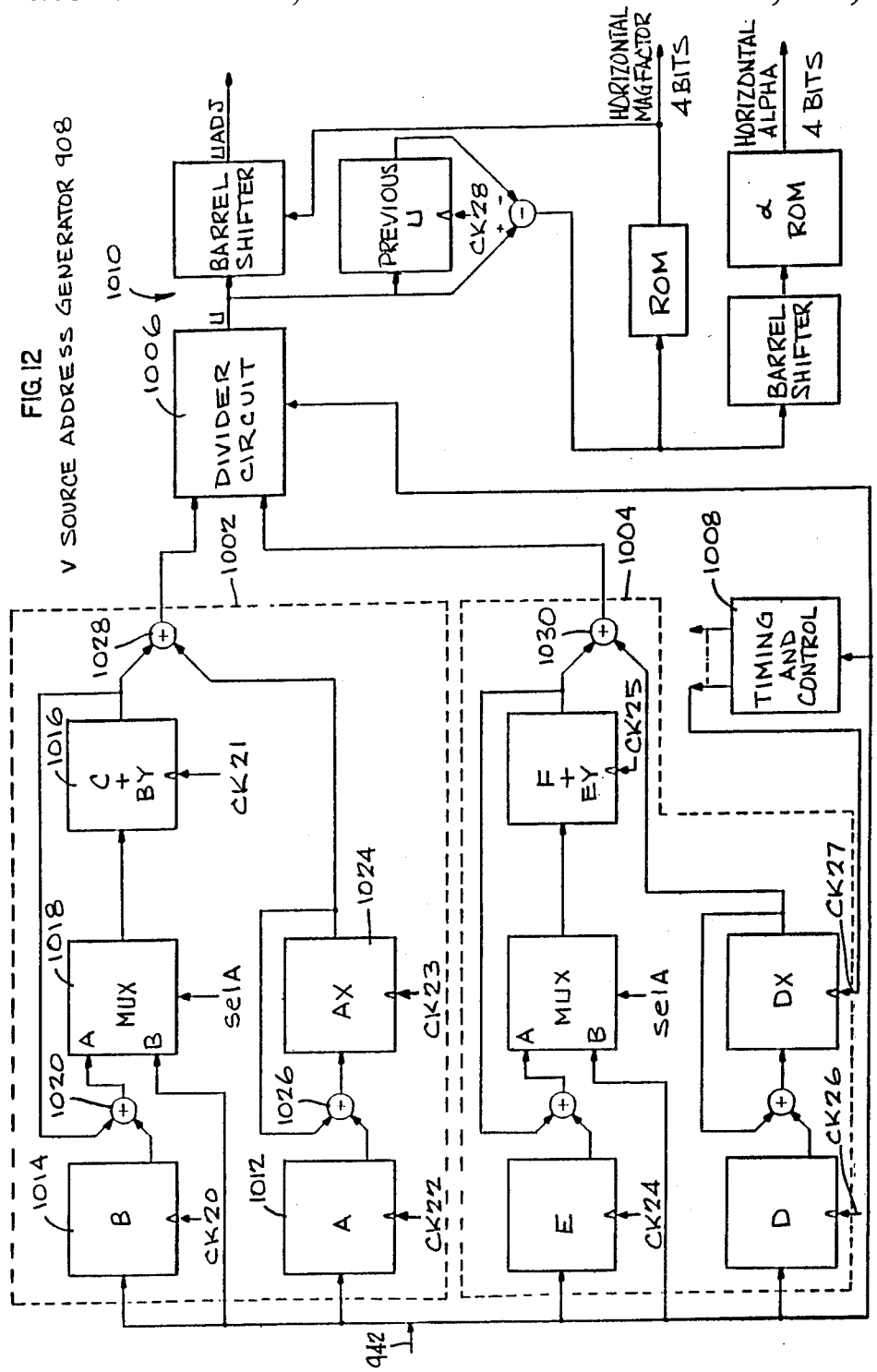
FIG. 12 is a schematic and block diagram representation of a horizontal source address generator.

An advantageous arrangement of the horizontal source address generator 908 for solving equation (31) is shown in FIG. 12. The horizontal source address generator 908 includes a numerator circuit 1002, a denominator circuit 1004, a divider circuit 1006 which may be identical to the divider circuit 918 of the vertical source address generator 912 illustrated in FIG. 11, and a timing and control circuit 1008. The horizontal source address generator 908 also includes an adjustment circuit 1010 which is substantially identical to the adjustment circuit for the vertical source address generator 912 and converts the horizontal source address, u, output from the divider circuit 1006 into an adjusted horizontal source address, uadj. The adjustment circuit 1010 also generates the parameters magfactor and alpha for the horizontal interpolation decimation filter 906. The numerator circuit 1002 includes registers 1012, 1014, and 1016 which are preloaded with data from the transform composer and factorizor 916 prior to a field scan time. The data are received over the communication bus line 942. A multiplexer 1018 permits the register 1016 to be loaded alternatively from an adder 1020 or from the communication bus 942. A register 1024 is selectively loaded with the output of an adder 1026. The numerator of equation (31) has the general form $Ax+By+C$ where $A=a_{22}a_{34}-a_{24}a_{32}$, $B=a_{14}a_{32}-a_{12}a_{34}$ and $C=a_{12}a_{24}-a_{14}a_{22}$. During prefield scan time initiation the parameter C is loaded into the register 1016 while B is loaded into register 1014. Clock signal CK21 is generated by the timing and control circuit 1008 at the horizontal line clock rate so that the output of the register 1016 continually presents the value of $C+By$, which are the last two terms of the numerator of equation (31). The register 1024 is clocked by clock signal CK23 from the timing and control circuit 1008 at the pixel clock rate so as to be continually updated to generate the quantity Ax, which is added to the quantity C+By by an adder 1028 to output the numerator portion of equation (31) to the divider circuit 1006.

The denominator circuit 1004 has exactly the same form as numerator circuit 1002 except that the constants A, B and C are replaced by the constants D, E and F where $D=a_{21}a_{32}-a_{22}a_{31}$, $E=a_{12}a_{31}-a_{11}a_{32}$ and $F=a_{11}a_{22}-a_{12}a_{21}$. An adder 1030 outputs the denominator value to the divider circuit 1006. Because the denominator circuit 1004 is essentially identical to the numerator circuit 1002 it will not be further described. It is thus apparent that the divider circuit 1006 outputs the denormalized horizontal source address u to the adjustment circuit 1010. The adjustment circuit 1010 in turn generates the signal uadj, the horizontal magfactor parameter, and the horizontal alpha parameter in a manner analogous to the operation of the vertical source address generator 912 which has been described above with reference to FIG. 11.

Returning to FIG. 3, a vertical to horizontal transposing memory 900 is substantially the same as the transposing memory 18. It requires only two field buffers and always writes vertically and reads horizontally.

A horizontal deinterlace filter 902 is normally inactive as deinterlacing is performed by the filter 600. However in the event of horizontal reading from the transposing memory 18, the deinterlace filter 902 must perform the deinterlace function. It requires only one filter component, which may be the same as either of the two filter components of the deinterlace filter 600.

A predecimation filter 904 receives an 8 bit stream of video data from the deinterlace filter 902 and performs a predecimation operation in substantially the same manner as that performed by the predecimation filter 700. The predecimation filter 904 requires only 3 line buffers.

The interpolation decimation filter 906 receives a two byte stream of information from the predecimation filter 904. It is substantially the same as the vertical interpolation decimation filter except for adjustments that result from receiving data at one-half the data rate of the filter 800.

The data rate through the system is reduced by one-half at the interpolation decimation filter 800. Up to this point the system is processing two fields at once to maintain a composite frame available for interpolation. The interpolation decimation filter 800 need only produce a single field each 1/60 of a second.

The horizontal source address generator 908 implements a function defining the source address along a horizontal scan line as a function of the target pixel row 910 and column location. A horizontal target address counter provides target position information in horizontal raster scan order. This enables processing of an intermediate image stored in the transposing memory 900.

The vertical address generator 912 defines source addresses along a vertical scan line. A vertical target address counter 914 provides target position information for the vertical scan into the intermediate transposing memory 900.

The transform composer and factorizor 916 receives transformation commands and implements the equation shown in Table I below to produce transform parameters to control the horizontal and vertical source address generators 908, 912. These parameters are calculated by a data processor within the transform composer and factorizor 916 once every field.

The horizontal interpolator decimator filter 906 implements the function:

$$s(i + 0) = \sum_{k=-4}^{3} s(i - k) h(\alpha, 0, k)$$

where
s is a source data value at discrete sample points,
i is the integral part of the source address of the point to be interpolated,
$\phi$ is the fractional part of the source address of the point to be interpolated, and
h is the impulse response of the interpolating function. h is determined according to the equation $$h(\alpha, 0, k) = \frac{8 \sin \alpha \pi (k - 0) \sin \frac{\pi(k - 0)}{8}}{\pi^2 (k - 0)^2}$$

where $\alpha$ is a number between $\frac{1}{2}$ and 1 representing the cutoff of this lowpass response.

The horizontal source address generator 908 calculates the function of equation (31), where x is the target pixel number and y is the scan line address. The vertical source address generator 912 calculates the function of equation (30).

TABLE I $$\begin{bmatrix} S_x & 0 & 0 & A_x \\ 0 & S_y & 0 & A_y \\ 0 & 0 & S_z & A_z \\ 0 & 0 & 0 & 1 \end{bmatrix} \begin{bmatrix} \cos\theta_z & \sin\theta_z & 0 & 0 \\ -\sin\theta_z & \cos\theta_z & 0 & 0 \\ 0 & 0 & 1 & 0 \\ 0 & 0 & 0 & 1 \end{bmatrix} \begin{bmatrix} \cos\theta_y & 0 & \sin\theta_y & 0 \\ 0 & 1 & 0 & 0 \\ -\sin\theta_y & 0 & \cos\theta_y & 0 \\ 0 & 0 & 0 & 1 \end{bmatrix} \begin{bmatrix} 1 & 0 & 0 & 0 \\ 0 & \cos\theta_x & \sin\theta_x & 0 \\ 0 & -\sin\theta_x & \cos\theta_x & 0 \\ 0 & 0 & 0 & 1 \end{bmatrix} \begin{bmatrix} 1 & 0 & 0 & P_x \\ 0 & 1 & 0 & P_y \\ 0 & 0 & 1 & P_z \\ 0 & 0 & 0 & 1 \end{bmatrix} = \begin{bmatrix} a_{11} & a_{12} & a_{13} & a_{14} \\ a_{21} & a_{22} & a_{23} & a_{24} \\ a_{31} & a_{32} & a_{33} & a_{34} \\ 0 & 0 & 0 & 1 \end{bmatrix}$$

Figure 13:
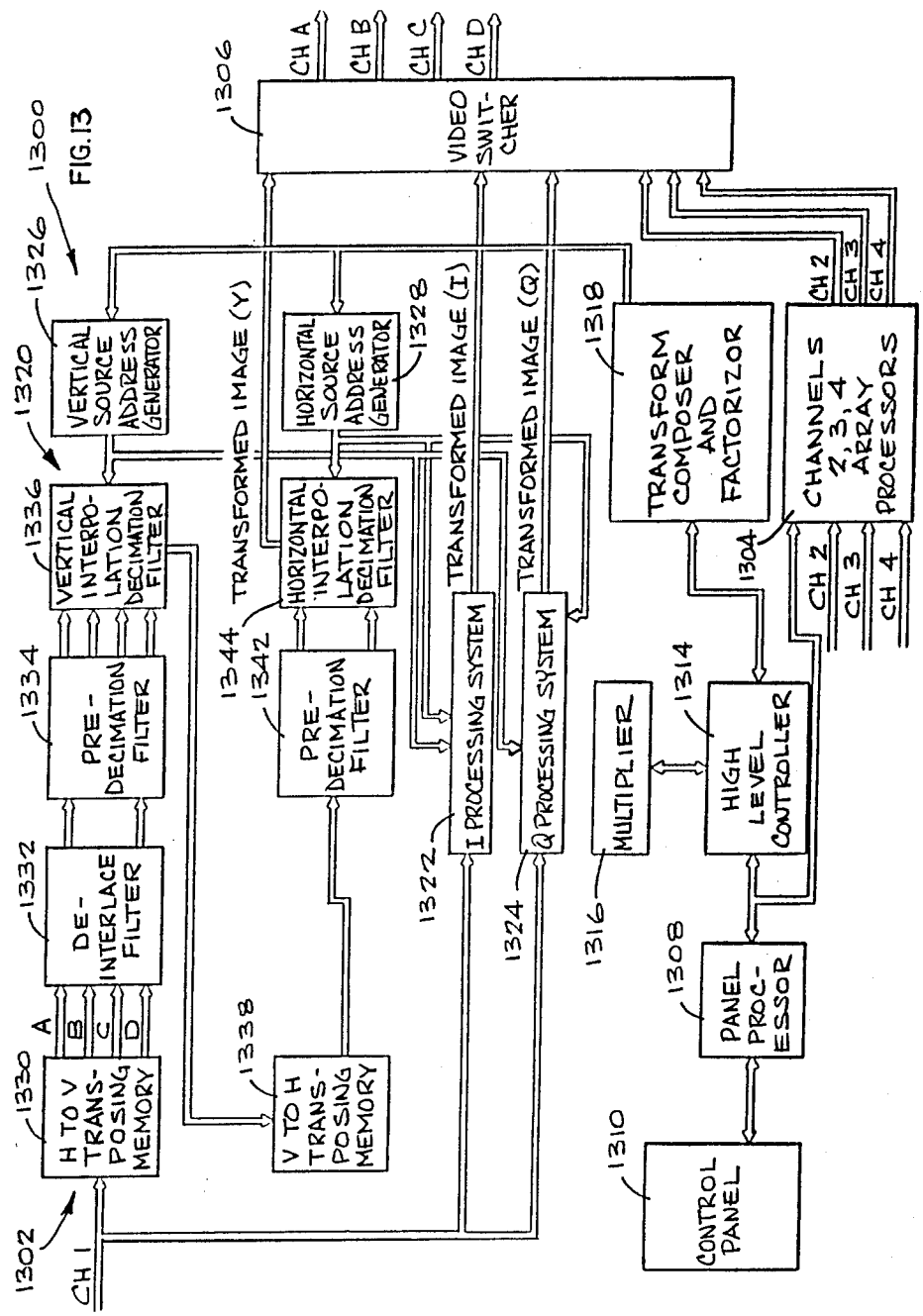
FIG. 13 is a block diagram representation of a digital special effects system in accordance with the invention.

$S_x, S_y, S_z$ = scale factors
$A_x, A_y, A_z$ = pretranslations
$\theta_x, \theta_y, \theta_z$ = rotation angles
$P_x, P_y, P_z$ = post translations Referring now to FIG. 13, a digital special effects system 1300 for color television video signals includes an array processor 1302 for channel 1, as well as array processors 1304 for channels 2, 3 and 4 coupled to receive an input video signals for each channel. A video switcher 1306 receives the transformed video signals for each of the four channels and outputs them in a commanded combination. For example, all four channels might be combined to form a single output channel A, channels 1 and 2 might be combined to form output channel C while channels 3 and 4 are combined to form output channel D, or each transformed channel input to switcher 1306 might be output as separate channels.

A panel processor 1308 is implemented as a Z8000 microcomputer based microprocessor system and operates in conjunction with a control panel 1310 to receive operator commands. These commands are communicated to a high level controller 1314 which is also a Z8000 microprocessor based processor and which has multiplier 1316 coupled thereto to enhance its arithmetic capabilities. The high level controller 1314 receives and stores sequences of transformation states from the panel processor 1308. During operation, the high level controller 1314 provides transformation commands to the respective transform composer and factorizor 1318 at the field rate. The high level controller 1314 outputs the stored command states at the appropriate set times corresponding thereto and between the set times interpolates between the immediately preceding and succeeding states for each control parameter.

The high level controller 1314 thus permits the digital special effects system 1300 to provide a smooth, controlled and repeatable special effect that could not be obtained by operator manipulation on a real time basis. By defining special effect stats at the set points, and interpolating between the set points, a smooth image manipulation effect can be realized while defining only a relatively few set points and without the need for separately defining the special effect parameters at each field.

The high level controller 1314 receives from the panel processor 1308 and stores, data for a plurality of set points. Twenty-five or more set points are available, and they will be referred to herein as knots. At each knot there is stored a parameter specifying the state at that knot for each image manipulation variable. There is also stored at each knot a number indicating the relative time between a current knot and a next knot. Initially, this number represents a number of field times. However, an overall effect run time can be modified. The interpolation equation for each parameter is a function of a single independent variable. When an effect is run, the value of this single variable is passed to the high level controller 1314 from the panel processor 1308. The value of this variable is modified in each field. It is by adjusting the amount of this modification that the overall run time of an effect is controlled.

The high level controller 1314 provides to the transform composer and factorizor 1318 for each field time, data commanding each variable for each access of the variable for the given field time. At the knots, the stored parameter conditions are commanded. Between knots, each parameter is interpolated between its state at the preceding and succeeding knots with a third degree polynomial equation, the coefficients of which are computed in terms of the value of the parameter at the current and succeeding knots and the value of the slope or first derivative of the parameter with respect to time at the current and succeeding knots.

The slopes at each knot for each parameter are determined by first testing to see if the value is changed relative to the immediately succeeding knot. If not, the slope is set to zero, and the parameter is assumed to be constant between the current and succeeding knots. In the event that the parameter changes, the cubic spline interpolation technique is utilized to obtain the slope. A discussion of cubic splien interpolation is provided by Carl deBoor, *A Practical Guide To Splines*, pp. 49–57, Springer-Verlag (New York, 1978). In addition, the slope for each parameter is set to zero at the first and last knots of an effect.

The use of knots with interknot interpolation permits a user to specify a highly complex and continuously changing video effect merly by specifying desired video transformation states at a relatively few key knot points and without need to specify each field transformation condition. Furthermore, pre-establishment of exact states and times provides a precision far superior to that which could be obtained through real time operator control, while the specification of the overall run time permits the effect to exactly match a given time slot such as a 15, 30 or 60 second commercial. This preprogramming also permits a plurality of video channels to be precisely synchronized. Unless otherwise specified, a parameter at a given knot assumes the value of the corresponding parameter at the preceding knot unless the current knot is the first knot, in which case the value of the parameter is set to its nominal value, and the time between knots is assumed to be zero. In practical applications, it may be desirable to implement two adjacent knots with zero time between them. For example, it may be desirable to implement an image rotation over a given time interval and then to implement a sudden and stepwise change of the axis of rotation without a corresponding sudden change in the video image. This could be implemented, for example, by specifying first and second knots with a given gradual rotation function between them. A third knot could then be established at the same time as the second knot by specifying zero time for the second knot with a translated axis of rotation. A smooth transition could then occur about the new axis of rotation between the third knot and a fourth knot establishing a terminal or intermediate condition of rotation.

The channel 1 array processor is generally similar to that shown in FIG. 3 with certain modifications being implemented which have been found to reduce cost without seriously degrading transformation quality. In particular, the I and Q chroma components of the video signal are sampled at ¼ the approximately 70 nanosecond sampling rate of the Y or luminance component. This enables certain economies, such as less expensive, lower speed integrated circuits, to be utilized as well as less data storage capacity, so long as care is exercised to assure consistency of the processing of the different video components.

The channel 1 array processor includes a luminance or Y processing system 1320, a first chrominance or I processing system 1322, and a second chrominance or Q processing system 1324. A vertical source address generator 1326 and a horizontal source address generator 1328 provide common addresses to the Y, I and Q processing systems 1320, 1322 and 1324, respectively. The address generators 1326 and 1328 may be substantially identical to the corresponding vertical and horizontal source address generators 912 and 908 as shown in FIG. 3.

A horizontal to vertical transposing memory 1330 includes five field stores which operate on a cyclical rotating basis with one of the stores receiving and storing incoming video luminance data while the other four stores output the four most recently received fields of video data on output paths A, B, C and D, with the most recent field appearing on path A and the fourth most recent field appearing on path D. The individual field buffers of the memory 1330 are written into as data are received in a normal horizontal raster scan order and may be read in either the same order or alternatively in an order providing a vertical raster scan of the data from top to bottom and from left to right. During normal operation, data are written into the memory 1330 horizontally and read out vertically, and this mode will be assumed unless otherwise specified.

A deinterlace filter 1332 receives the four streams of data from the transposing memory 1330 and continuously converts the most recent field to a deinterlaced complete frame of data by outputting a second field of data which completes the alternate missing lines of the most recent field of data. The deinterlace filter 1332 includes a motion detector which causes the second most recent field of data to be output as the intermediate lines of the most recent field in the absence of detected motion. If motion is detected, the average of the pixel locations in the most recent field immediately above and below a given intermediate line of the most recent field is used to define the intermediate line. This interpolation or averaging of data between lines of the most recent field has the effect of decreasing the spatial resolution of the output frame of video data but eliminates a double image effect which occurs when two successive fields of data are combined to form a single frame of data which is deemed to occur or have occurred at a single instant in time. In contrast to the arrangement of FIG. 3, the deinterlace filter 1332 operates whether or not the horizontal to vertical transposing memory 1330 is operated in a transposing mode. It will be recalled that the nontransposing mode is utilized for rotations about the Z axis of 45° to 135° and 225° to 335°.

A predecimation filter 1334 receives the video data from the deinterlace filter 1332 and makes available to a vertical interpolation decimation filter 1336 a full size copy thereof as well as ½, ¼ and ⅛ sized copies thereof. The vertical interpoltion decimation filter 1336 receives an appropriate size copy, of each field of video data from the predecimation filter 1334 and responds to vertical source addresses from the vertical source address generator 1326 to either select vertical data points or interpolate between data points in the vertical direction to output a video image which has been transformed in the vertical direction. The vertical interpolation decimation filter 1336 utilizes the full size copy of each field when specified magnification in the vertical direction results in an output image greater than the incoming image, the same size as the incoming image, or greater than ½ the size of the incoming image. The half size copy is used for ¼ to ½ size images, the ¼ size copy is used for ⅛ to ¼ size images and the ⅛ size copy is used for images less than ⅛ normal size. In the event that the transposing memory 1330 is operating in a nontransposing mode, the vertical interpolation decimation filter 1336 treats the image as though it had been vertically scanned even though it in fact was horizontally scanned. Operation is thus substantially the same for both modes of operation except that an image which has been truly vertically scanned will have only 425 pixels per line while the horizontally scanned image will have 768 pixels per line in the NTSC format. The filter 1336 may be implemented substantially like the filter 800 (FIG. 3), although an economically advantageous arrangement for the lower bandwidth chroma components is described below in conjunction with FIG. 19.

A vertical to horizontal transposing memory 1338 receives the partially transformed image array data from the vertical interpolation decimation filter 1336 and imposes a vertical to horizontal transposition. Data are read into the transposing memory 1338 in a vertical raster scan order and read out in a horizontal raster scan order at a single field rate of about ζns per pixel.

A predecimation filter 1342 may be implemented substantially identically to the filter 1334. It receives data from the vertical to horizontal transposing memory 1338 and outputs both a full size copy and ½, ¼ and ⅛ size copies to a horizontal interpolation decimation filter 1344.

The horizontal interpolation decimation filter 1344 responds to horizontal source addresses from the horizontal source address generator 1328 to complete interpolation decimation filtering in the horizontal direction to output the luminance component of the transformed video image. The horizontal interpolation decimation filter 1344 may be implemented substantially identically to the vertical interpolation decimation filter 1336.

Figure 14:
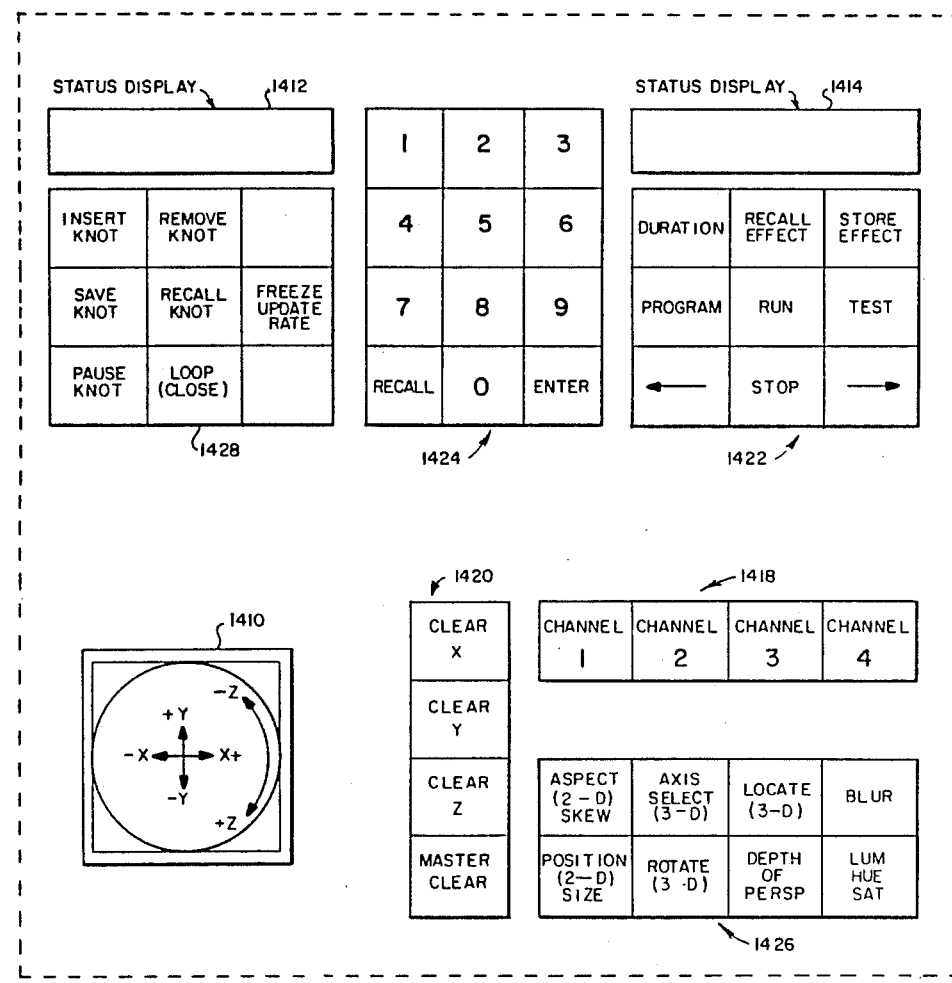
FIG. 14 is a block diagram representation of the control panel for the system shown in FIG. 13.

An advantageous arrangement of the control panel 1310 is illustrated in FIG. 14 and includes a three axes rate-control joystick 1410, two status displays 1412, 1414 providing feedback to a panel operator, and several groups of pushbutton or key switch controls. By utilizing the key switch groups to specify modes, channels, and functions, a relatively complex set of controls can be implemented with a single three axes rate-control joystick 1410. With the joystick in the return or neutral position, no change of status occurs. With the joystick pushed to the right the selected X parameter is increased and continues to increase so long as the joystick is held to the right. The farther to the right the joystick is moved, the faster the parameter increases. Similarly, the parameter decreases as the joystick is pushed to the left. The Y and Z axes operate in a similar manner. Motion of the joystick upward towards the top as shown in FIG. 14 represents an increase in the Y axis parameter, while motion downward commands a decrease. For the Z axis control, counterclockwise rotation commands an increase in the parameter, while clockwise rotation commands a decrease. While electrical connections have been omitted for clarity, it will be appreciated that the joystick as well as each of the key switches and the status displays is connected for communication with the panel processor 1308.

A channel select group of switches 1418 permits selection of one of four available channels for control of the associated video image. The last channel key selection determines the channel to which the transformation commands pertain. A clear group of switches 1420 permit the clearing of selected axes or alternatively a master clear for all axes back to the normal or input video state for a currently selected parameter. For example, if positioning (translation) has been selected and the joystick is moved to the right to cause the video image to move to the right, actuation of the clear X key will cause the image to return to its normal location. A mode select group of keys 1422 determines the overall operating mode of the transformation system and also facilitates the implementation of special features. Selection of the program key places the system in the program mode to permit the entry of transformation commands at each of the available knots starting with the first knot. Actuation of the rightward pointing arrow causes the selected knot number to be incremented while selection of the leftward pointing arrow causes the current knot number to be decremented.

Actuation of the run key places the system in a run mode with a stored sequence of knots being executed.

Actuation of the test key places the system in a test mode of operation in which diagnostic programs within the various microprocessor subsystems test for and indicate error conditions. Actuation of the duration key followed by one or more keys from a number key group 1424 specifies a total time in fields for an operating sequence. In the program mode, the duration function specifies the transition time in fields from the current to the succeeding knot. A pair of keys labeled "store effect" and "recall effect" permit an entire effect or sequence of knots to be stored on a floppy disk and then recalled. The number group 1424 also includes enter and recall keys. This enter key permits a selected number to be entered in storage and terminates number entry. The recall key zeros the number being entered to allow erasure of errors.

A parameter selection group 1426 determines the meaning of the various axes of the joystick. An aspect/skew key causes the video image to be selectively enlarged or decreased in size in the horizontal and vertical directions in response to motion of the joystick in the X and Y directions, respectively. At the same time, the Z axis control of the joystick 1410 may be utilized to introduce a skewing of the video image. That is, the top of the image is translated relative to the bottom of the image so as to turn squares into parallelograms.

The axis select key positions in three dimensions the point about which image rotations occur. When this function is selected, a cursor is displayed to assist the user in positioning the point of rotation. All rotations occur about one of three mutually perpendicular axes passing through this center of rotation.

The locate key permits positioning in three dimensions of the incoming image.

A blur key permits the video image to be selectively defocused. Only the Z or φ axis control of joystick 1410 is effective upon actuation of this key.

A position/size key permits horizontal and vertical translation of the output video image relative to the input video image using the X and Y axes, while the Z axis control of the joystick controls, the size of the output video image relative to the size of the input video image.

A rotate key permits control of three dimensional rotations of the image about the center point. Each of the joystick axes controls a corresponding axis of rotation. Vertical movement controls rotation about the X axis, horizontal movement controls rotation about the Y axis and rotation of the joystick causes rotation of the image about the Z axis. Any reasonable number of rotations may be specified. For example, zero rotations may be specified at one given knot with ten rotations being specified at the next knot. The interpolating capability of the high level controller 1314 will then cause ten rotations to occur between the given and the next knot. Multiple rotations are accomplished by actuating the joystick to cause rotation about a desired axis and maintaining the joystick actuated until the desired number of rotations have been counted.

A depth of perspective key is effective only with the Z axis of the joystick to control the rate at which objects become smaller as they move rearward of the plane of the initial video image or larger as they move forward of this plane, as by rotation about the X axis. This can be visualized by imagining the video image rotating about an X axis at the bottom of the image. As the image rotates away from the viewer, the top portion of the image becomes farther from the initial plane and hence appears smaller. The depth of perspective key permits control over the rate at which the image becomes smaller relative to the angle of rotation.

A LUM HUE SAT key permits specification of the background color of the output video image in regions not occupied by the initial image. For example, in the above perspective rotation example, as the top of the image rotates away from the plane of the viewing screen, the top of the image becomes smaller and the upper right and upper left hand corners of the viewing screen are no longer occupied by the initial image. The LUM HUE SAT key permits the Y, Z and X axes respectively of the joystick 1410 to control the corresponding components of the background video image. This control over the background image can be especially useful when used in conjunction with a switcher 1306 (FIG. 13) programmed to respond to color or luminance keys to substitute video data of one channel for video data of another channel and form a composite image for a single channel.

A programming group of keys 1428 facilitates the programming of the various knots for a given video effect. Actuation of an insert knot key permits a new knot to be inserted between the current and previous knots while the remove knot key similarly permits a preprogrammed knot to be deleted from a sequence of knots. Actuation of a save knot key causes all of the parameters at a given knot with exception of the rotations to be stored for later recall by actuation of the recall knot key. This save and recall feature is useful where the parameter state at a given knot is to be duplicated at a subsequent knot. Some or all of the parameters can of course be changed after duplication. Actuation of the pause knot key causes execution of the effect to halt at the current knot during run mode and await further user commands. A loop key actuation followed by selection of a duration number through the number key group 1424 causes a loop back from the last knot to the first knot of an effect. The duration of the transition from last to first knot is taken to be the number entered by the user after selecting the loop key. The loop back causes the intermediate sequence of knot states to be continuously and sequentially executed until the actuation of the stop key terminates the continuous loop sequence.

A freeze update rate key permits the specification through the number key group 1424 of the number of fields that a frozen video image will be held before being updated. That is, if the freeze update key is followed by the number 8 key, on every 8th field two new video fields will be sampled and held until the next update time. In effect, the horizontal to vertical transposing memory 1330 is inhibited from receiving a new input video field until the specified number of input video fields have occurred.

As an example of entering an effect for a given channel, assume an example in which the full size picture is to shrink to one-half size at midscreen, rotate 360° about the Y axis with perspective and then return to full size. After selecting the desired channel with the switch group 1418, for example channel 1, the program switch in the group 1422 is actuated to set all conditions to an initialized state yielding a full size picture, without any manipulation supplied. This initial picture condition is now the first knot point of the effect. The save knot key in group 1428 is now actuated to preserve the initial condition for later use at the end of the effect where the effect is to be returned to the initial condition.

A duration time is now specified through the number keyboard 1424 to define the time to the next or second knot. For example, the number 600 will cause the first knot time to be 600 field times or ten seconds. During this first 10 second interval the "zoom" from full size to half size will occur. The knot number is displayed on the status display 1412, and, as the knot time duration number is entered, it appears on status display 1414. In general, the status display reflects the present knot as well as the state of a selected parameter. The forward or rightward pointing arrow in the group 1422 is now actuated to cause incrementing to the next or second knot state. Actuation of this key closes the programming for the events of the first knot and opens the second knot for programming.

The 2D position size key is now actuated from group 1426 and the joystick can now be used to position the picture on the screen according to the XY movements of the joystick or can change picture size according to movement of the rotating knob atop the joystick in the Z or $\phi$ axis. For the present example, the XY position is to remain constant while the joystick knob is rotated until the picture reaches one-half size. A duration time is now specified for the time to the next or third knot, which in this case will specify the time of the size reduction. The duration button is actuated and a time such as 300 field times or 5 seconds is entered. With the programming of the second knot complete, the forward key is again actuated to close the second knot and open the third knot. The third knot is to define a 360° rotation of the half-size picture about its Y axis with some three dimensional perspective effects added. The rotate key in the group 1426 is now actuated to make the joystick active in rotating the picture about any of its three axes. In the present example the joystick is moved in a horizontal direction to the right to rotate the picture about its Y axis. Moving the joystick in a vertical direction would cause rotation about the X axis while rotation of the joystick knob in the Z or $\phi$ axis would rotate the picture about its Z axis. In the present example, the joystick is moved to the right and held until the image has rotated through a sufficient angle to permit observation of the perspective effect, for example 30°-45°. It should be appreciated that the rotation is required because the perspective effect is not observable until the image is rotated out of the plane of the viewing screen. With the depth of perspective key is actuated, in group 1426. The joystick $\phi$ control is now active in controlling the amount of perspective desired, and the desired amount of perspective is added to the picture. The rotate button is now again actuated and the picture rotation through the desired full 360° is completed by holding the joystick to the right until the rotation has occurred as viewed on the screen. A duration time is now specified for knot 3 by actuating the duration key and a set of number keys within the group 1424. In this example let us assume that the time is entered as 600 field times, corresponding to 10 seconds. In this case the 10 seconds will specify the time to knot 4, which is the unity or unaltered picture state. Thus during the final 10 second interval the picture will zoom back to full size.

The advance arrow key is now selected to close knot 3 and open the final knot 4. The recall knot button is actuated from the programming group 1428 to store the previously stored initial full size or unity parameters in the current knot point 4. The effect is now complete and can be stored on a disk by selecting the store effect button from the mode control 1422. Further editing of the effects in terms of durations and manipulation changes or additions can also be made by returning to other knots, inserting additional knots at selected locations, or deleting knots.

Alternatively, the total run time of the total effect can be modified without changing the relative time durations between each knot point. For example, the commanded run time of the effect is 25 seconds. However, the total run time can be easily increased to 30 seconds, as for a 30 second commercial by actuating the duration key in the group 1422 and then entering 1800 through the keyboard 1424 Effectively each of the individual knot times is consequently increased by 30/25. That is, the first knot time will be effectively increased from 600 field times to 720 field times, the second knot time will be effectively increased from 300 field times to 360 field times and the third knot time will be effectively increased from 600 field times to 720 field times. This will result in a total run time for the effect of 30 seconds, as commanded.

Figure 15:
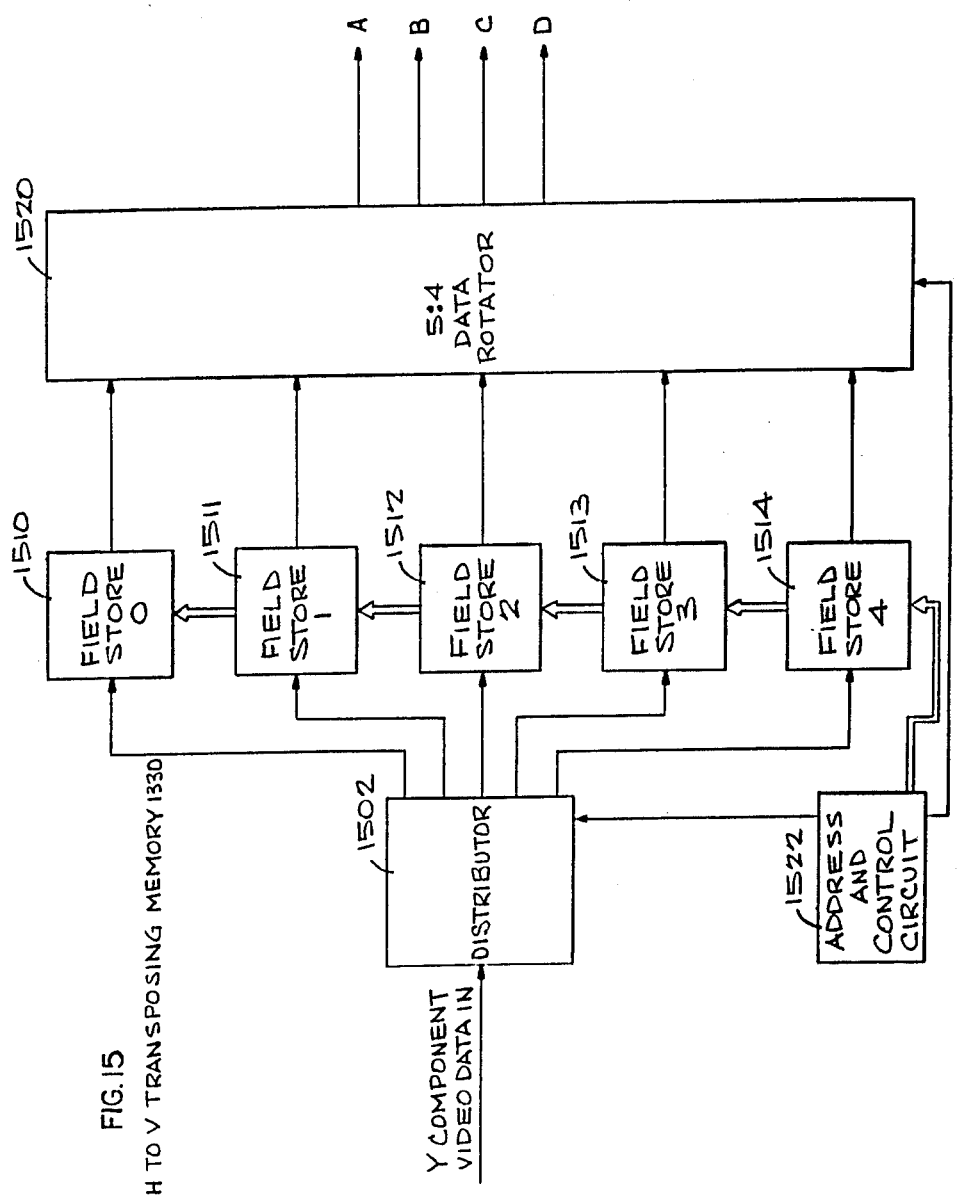
FIG. 15 is a block diagram representation of a horizontal to vertical transposing memory shown in FIG. 13.

Referring now to FIG. 15, the horizontal to vertical transposing memory 1330 includes a distributor 1502, five field stores 1510-1514 labeled 0-4, a 5:4 multiplexer 1520, and an address and control circuit 1522 connected to provide address and control signals to the other components of transposing memory 1330. Although the field stores 1510-1514 are shown separately for the luminance component, they advantageously function synchronously and with addressing common with the I and Q chrominance component field stores as explained hereinafter.

The distributor 1502 receives a component of standard color television video data such as the Y or luminance component as an input, and stores successive fields of the input data in successive ones of the field stores 1510-1514 on a cyclic basis. After all five field stores have been filled, the distributor 1502 continues to direct the incoming field of data to the field store storing the oldest field of data. As a result, the five field stores 1510-1514 always store the most recent four fields of data while the fifth most recent field of data is overwritten by incoming new data.

The multiplexer 1520 receives the outputs of the five field stores and in turn outputs the data from the four most recently stored complete fields on four output lines on a cyclic basis such that the most recent field is output on path A, the second most recent field is output on path B, the third most recent field is output on path C, and the fourth most recent field is output on path D. The four most recent fields of video data are thus made available on a continuous basis to the deinterlace filter 1332.

As with the horizontal to vertical transposing memory 18, the transposing memory 1330 always receives data for storage in a horizontal scan direction. In a normal mode of operation the stored fields of data are transposed and output in a vertical scan direction, and in a special mode of operation the memory 1330 may operate in a nontransposing mode to output the video data in a horizontal scan direction, just as it has been read in.

Figure 16:
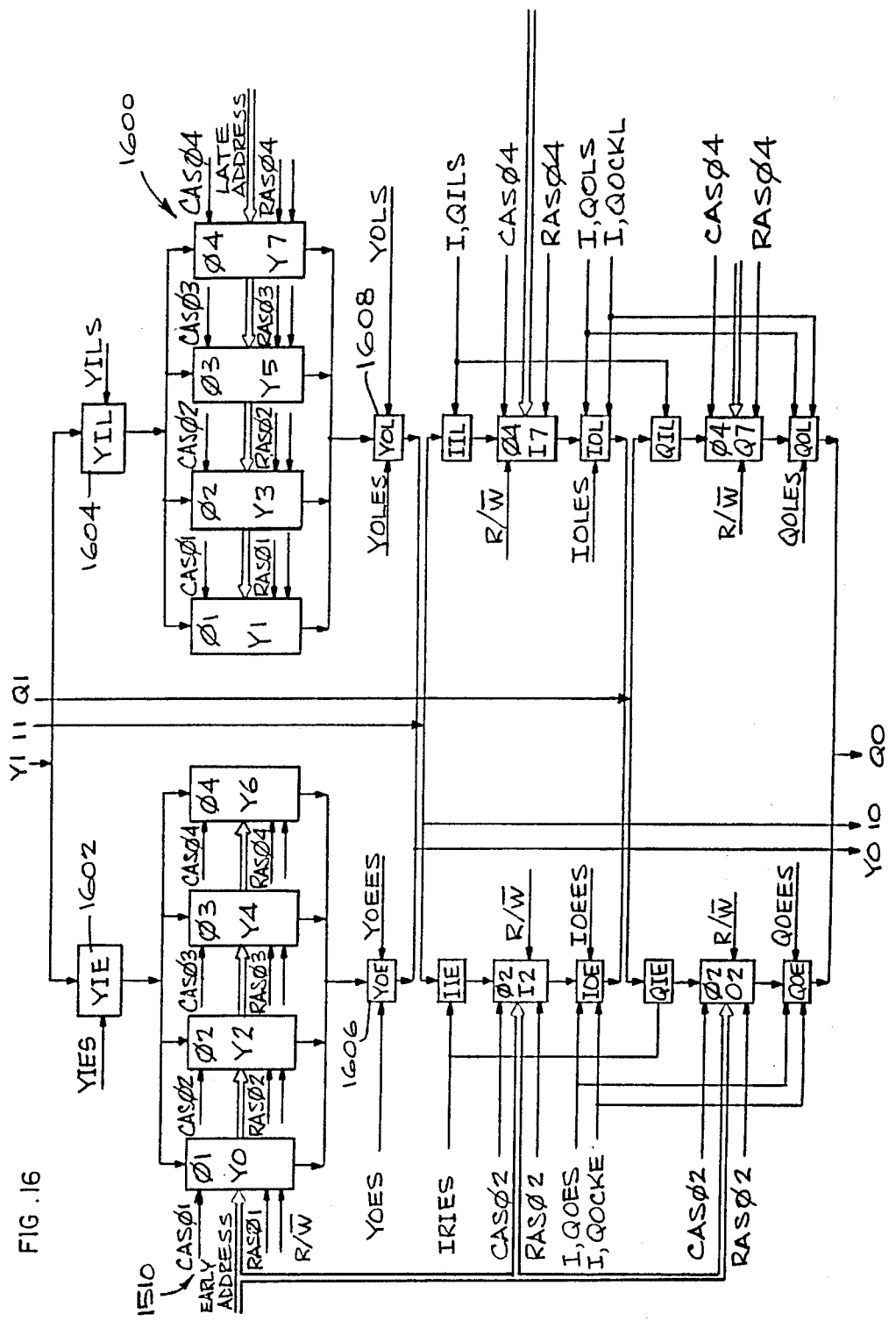
FIG. 16 is a block diagram representation of a field store memory for the memory shown in FIG. 15.
Figure 17:
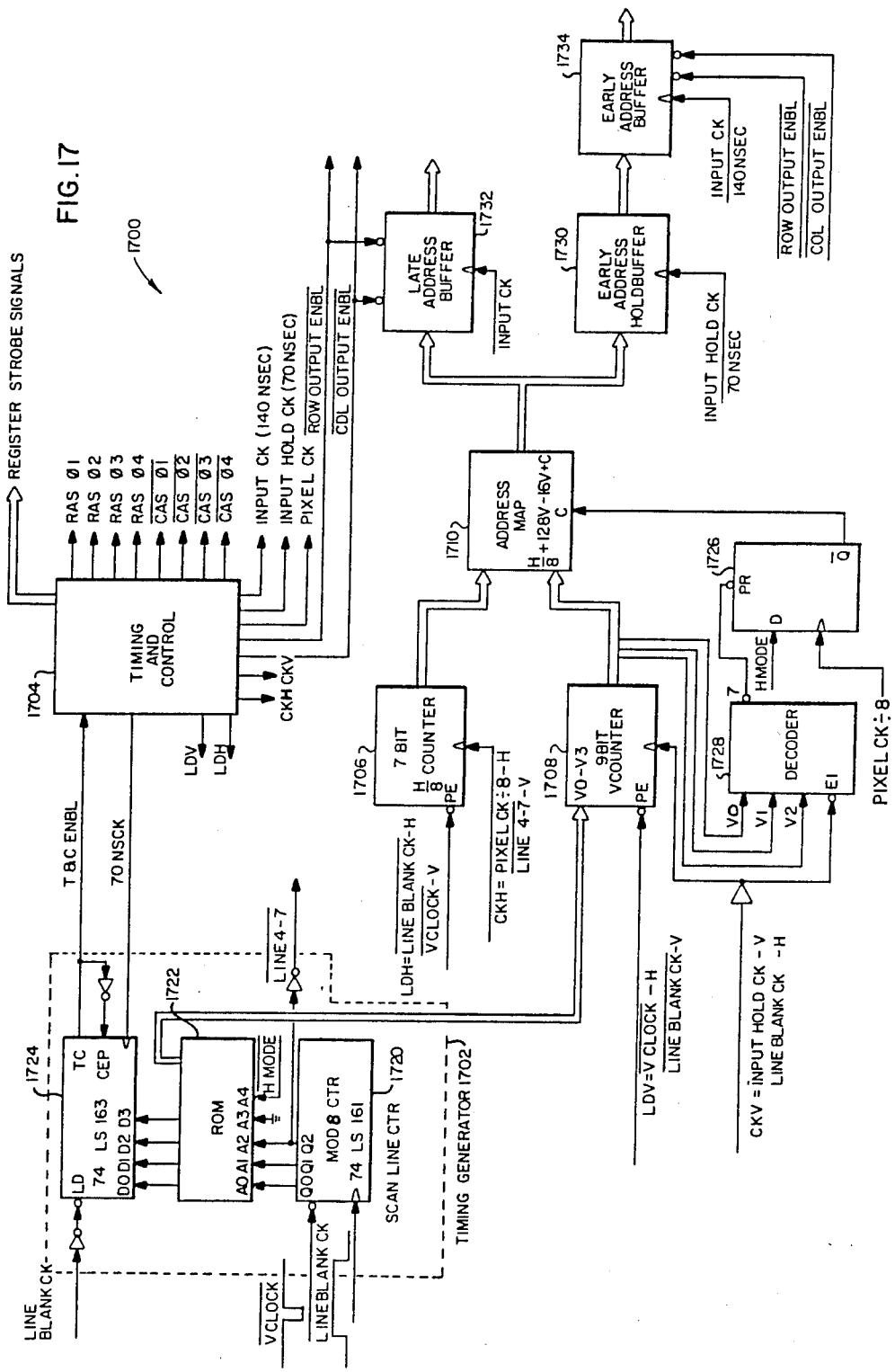
FIG. 17 is a block diagram representation of an address and timing circuit for the field store memory shown in FIG. 16.

An example of an advantageous arrangement of the memory 1600 for field store 0, corresponding to the store 1510 of FIG. 15 and corresponding stores for the I and Q processing systems 1322, 1324, is illustrated in FIGS. 16 and 17. The memory for the luminance signal component contains eight memory modules designated Y0-Y7. Each of these modules is 32 words deep by 1 pixel or 8 bits wide. The memory 1600 operates on a 140 nanosecond cycle to store two luminance pixels during each cycle. During each memory cycle an early pixel is stored in one of memory modules Y0, Y2, Y4, or Y6 while a next subsequent or late pixel is stored in one of four late modules, Y1, Y3, Y5 or Y7. Prior to writing into memory, a first luminance pixel of data is stored in a Y input early register 1602 in response to the Y input early strobe signal YIES. The following pixel is stored in a Y input late register 1604 in response to the Y input late strobe signal YILS. During this same two pixel time period, the row and column addresses are strobed into the memory modules Y0-Y7 to prepare the memory for immediate writing of the two pixels of data upon receipt of the late pixel by the Y input late register 1604.

Because the cycle time for economically available memory modules is longer than 140 nanoseconds, the memory modules are utilized in a four phase rotating configuration. During a first 140 nanosecond memory cycle phase 1 signals cause the storage of data in memory modules Y0 and Y1. During a second phase data are stored in memory modules Y2 and Y3, during a third phase data are stored in memory modules Y4 and Y5, and during a fourth phase data are stored in memory modules Y6 and Y7. For the fifth cycle the address inputs are incremented and the rotating cycle repeats itself beginning with modules Y0 and Y1 storing information during phase 1. It is thus seen that for each of the memory modules a time period of $4 \times 140$ nanoseconds or 560 nanoseconds is available for each data access cycle, and this is well within the capabilities of economically available memory chips.

During readout, the memory modules are operated in substantially the same way except that during a 140 nanosecond memory cycle, data from one of the early memory modules Y0, Y2, Y4 or Y6 are stored in a Y output early register 1606 in response to Y output early strobe signal YOES, and data from one of the late memory modules Y1, Y3, Y5 or Y7 are stored in a Y output late register 1608 in response to Y output late strobe signal, YOLS. Subsequently, the two pixels of data are serialized to make them available sequentially on a Y output signal line YO by first enabling the output of the Y output early register 1606 with a Y output early enable strobe signal, YOEES, and then 70 nanoseconds later, enabling the output of the Y output late register 1608 with a Y output late enable signal YOLES. During readout the memory modules Y0-Y7 continue to operate on the same four phase rotating basis. If readout is to be in a row scan direction, operation is substantially identical to writing except that the memory modules receive a read command rather than a write command.

The memory arrangement shown, in FIG. 16 further includes two memory modules I2 and I7 for the I chrominance video signal component and two memory modules Q2 and Q7 for the Q chrominance video signal component. Since the chrominance signal components are sampled at one-fourth the rate of the luminance components, only two memory modules are required for each of the chrominance signal components compared to eight memory modules for the luminance signal components. The I and Q chrominance modules operate exactly in parallel except for the data which are received or read out and further, the I2 and Q2 modules operate in parallel with the Y2 luminance memory module while the I7 and Q7 modules operate synchronously in parallel with the Y7 luminance memory module. This synchronous parallel manner of operation permits the chrominance memory modules to share the address and timing signals which are generated for the luminance modules. Because the I2 and Q2 modules are synchronized with the phase two Y2 module while the I7 and Q7 modules are synchronized with the phase four Y7 memory module, the effect is that each of the chrominance field stores appears to operate as two 1120 nanosecond memories phased 180 degrees apart. In any event, the net result is that one pixel of I and one pixel of Q chrominance data are stored for each fourth pixel of luminance data. It is essential for proper operation of the field store 0 that the chrominance memory modules be synchronized with the proper luminance memory modules so that in both the horizontal scan and vertical scan readout modes, chrominance data will be output at a uniform rate at one-fourth the luminance 70 nanosecond rate. That this goal is accomplished can be seen by looking at Table II below.

Table II is an address table illustrating the manner in which data are stored in the Y memory modules. Although not separately indicated for each chrominance module, it will be appreciated that for each pixel of luminance data stored in Y memory modules Y2 and Y7, corresponding pixels of chrominance data will be stored in chrominance memory modules I2, Q2 and I7, Q7 as indicated collectively for the two components by the chrominance pixels C0,0, C0,1, etc. at the two right-hand columns of the table.

For synchronizing and timing purposes it is convenient sometimes to start operations prior to the initial address storage location. Therefore, in order to avoid the recognition of negative addresses, data are stored beginning with address location $16 \times 112 = 1,792$. As data are written into the field store 0 in a horizontal row scan mode, data for pixels P0,0 and P0,1 arrive sequentially on the Y input line Y1 and are stored in the Y input early register 1602 and the Y input late register 1604, respectively. As these first two pixels of data are written into registers 1602 and 1604, the row and column addresses are strobed into phase 1 memory modules Y0 and Y1. As the first phase 1 memory cycle continues, pixels P0,2 and P0,3 are sequentially strobed into the Y input early register 1602 and Y input late register 1604 respectively. A phase 2 memory cycle then begins with the two pixels being stored respectively in modules Y2 and Y3. The process continues through the first raster scan line, with the memory phases being recycled back to phase 1 to store pixels P0,8 and P0,9 in memory address location $17 \times 112 = 2016$ after pixels P0,6 and P0,7 are stored in modules Y6 and Y7 at address 1792 during phase 4. An address map allocates $112 \times 8 = 896$ pixels for each horizontal scan row in memory module address space. This is sufficient to accommodate the 768 pixels in an NTSC horizontal scan line as well as the greater number of pixels in a PAL scan line without changing the memory design. It will be appreciated that I and Q chrominance pixels are simultaneously stored along with luminance pixels P0,2, P0,7, P0,10 and so forth. After all pixels for the first raster scan row have been stored, preparations are made during the horizontal retrace interval for storage of the second raster scan row. Phasing is returned to phase 1 regardless of which phase stored the last pixel of the first row. However, field store sequencing begins one pixel time early for row 2. As a result, the Y input early register 1602 is strobed one pixel time before actual video data are available and is loaded with don't care information designated X in Table II. 70 nanoseconds later the Y input late register 1604 is strobed to receive data for pixel P1,0. Data storage thereafter continues in a normal manner with the chrominance portions of the field store storing data at phase 2 and phase 4 operating times.

As data for the third raster scan row are received, the timing cycle begins two pixel times early so that don't care data are written into memory modules Y0 and Y1 during phase time 1. During phase time 2 pixels P2,0 and P2,1 are written into memory modules Y2 and Y3. During the same phase 2 chrominance pixel P2,0 is written into chrominance memory modules I2 and Q2. This same manner of operation continues with the memory starting time being advanced by one pixel time for each additional row until the eighth raster scan row has been stored. As the ninth raster scan row (row 8) is received, the address inputs are incremented to 2,688 and the starting times are returned to the initial timing relationship so that only valid picture data are stored, with pixels P8,0 and P8,1 being stored in modules Y0 and Y1 during time phase 1. The time staggering process then repeats itself with one pixel of don't care data being written at the beginning of row 9, two pixels of don't care data being written at the beginning of the tenth row, and so forth.

The staggering of the starting times on a modulo 8 basis for sequential raster scan rows during reading assures that pixels of video data for different rows of a single column are stored in the eight memory modules on a modulo 8 staggered basis so that they can be sequentially available during readout in a vertical column scan mode. For example, during the first vertical scan memory cycle time, address 1792 is provided to the Y input early module Y0 while address 1904 is provided to the Y output late module Y1. During the phase 2 memory cycle time, addresses 2016 and 2128 are provided, respectively, to the early and late modules with pixel P2,0 being read from module Y2 and pixel P3,0 being read from module Y3. During the next phase time, pixels P4,0 and P5,0 are read, and so forth. Upon reading of the seventh and eighth vertical column pixels, the cycle repeats itself as there is a return to phase 1 to read pixel P8,0 from module Y0 and pixel P9,0 from module Y1. For the second column, memory operation begins one pixel time early just as for the second row. As a result, during the first phase 1 cycle time, don't care information is read from module Y0 while pixel P0,1 is read from module Y1. During the following phase 2 time interval pixel P1,1 is read from module Y2 while pixel P2,1 is read from module Y3. This process continues in a module 8 recycle manner until all data for column 1 have been read.

Reading of the third column, which is designated column 2, then begins two pixel times early, with don't care data being read from modules Y0 and Y1 during phase time 1, with pixels P2,0 and P2,1 being read from modules Y2 and Y3 during phase time 2. It will be appreciated that the proper synchronous phasing of the chrominance memory modules at phase times 2 and 4 will cause a chrominance pixel to be read for every fourth luminance pixel to maintain the proper chrominance one-fourth sampling rate, during both horizontal row scan and vertical column scan memory operations.

At the same time, the selected field store configuration makes hardware implementation of the address and control circuitry relatively easy. The phase times are merely reset to one at the beginning of each row or column scan readout and then recirculated on a modulo 4 basis (modulo 8 basis for the memory components since they are operated two in parallel). By starting memory operations for each successive row or column one pixel time earlier on a modulo 8 basis, the staggering of the pixel storage locations is automatically accomplished to permit proper sequential access of the memory modules for stored pixel data on either a row scan or a column scan basis.

One slight complication which must be accounted for is the crossing over of an address boundary at staggered phase intervals during readout in a column scan mode. When reading column 0, each successive pixel occurs in a successive module location in a corresponding memory address location for a row group of addresses. That is, each successive address is incremented by 112 to provide addresses 1792, 1904, 2016, 2128, 2240 and so forth. As column 1 is read out, however, this successive incrementing of the addresses by 112 is proper only until pixel P1,7 must be read from module Y0 at address location 1905 instead of location 1904. This is a departure from the straightforward addressing scheme which requires an incrementing of the otherwise normal address for reading the 7th, 15th, 23rd, and so forth pixels. Similarly, for column 2, the address must be incremented for reading the 6th and 7th, 14th and 15th, 22nd and 23rd etc. pixels. For column 3, the address must be incremented for the 5th, 6th, and 7th pixels, the 13th, 14th, and 15th pixels, the 21st, 22nd and 23rd pixels and so forth It is thus seen that for each progressive column the incrementing of the address must begin one pixel time earlier on a modulo 8 basis and continue until an eighth, sixteenth, twenty-fourth, etc. pixel has been read. No incrementing is required for columns 0, 8, 16, etc. As described below, this staggered incrementing is accomplished with the address and control circuit 1522 by establishing an increment signal during vertical scan memory operations which is set progressively one pixel time earlier on a modulo 8 basis for successive columns and always terminated at a modulo 8 address boundary.

Referring now to FIG. 17, there is shown the address and timing circuitry 1700 for, field store 0. It will be appreciated that field stores 1–4 are substantially identical to field store 0. The address and timing circuitry 1700 includes a timing generator 1702, timing and control circuit 1704, a 7 bit horizontal address counter 1706, a 9 bit vertical address country 1708, and an address map circuit 1710. Synchronization of the field store with incoming data is provided by a line blank clock signal, which goes high shortly after the last pixel of each vertical or horizontal scan line and goes low again shortly before the first pixel time of the next scan line, and a vertical clock signal, $\overline{\text{V CLOCK}}$, which produces a one pixel wide pulse immediately after the last pixel of a field.

Consequently, at the end of a field, signal $\overline{\text{V CLOCK}}$ asynchronously resets a 3bit modulo 8 counter 1720 during the vertical retrace interval following each field The 0 output is communicated to a read only memory (ROM) 1722 which responds by outputting a 4 bit count to the 4 load inputs of a presettable counter 1724, which responds to a 70 ns pixel rate clock signal 70 NSCK.

The counter 1724 is loaded with count 5 in response to signal Line Blank CK until this signal terminates shortly before the beginning of each scan line. The counter 1720 then immediately begins counting toward 15. At count 15 the terminal count output generates a timing and control enable signal T&C ENBL which disables further counting until the counter 1724 is reloaded during the next line blank interval.

The termination of the line blank signal is synchronized with the incoming video data such that the 10 pixel clock times required to count from 5 to terminal count 15 equals the system pipe line delay time required by the timing and control circuit 1704 before activating the field store 1600 with register strobe signals and phase 1 row and column address strobe signals. The memory 1600 is thus properly synchronized to receive and store the first and subsequent pixels of data for the first scan line.

After the end of the first scan line signal, the line blank clock signal goes high to increment the counter 1720 to count 1 and load the counter 1724 with count 6, which is now output by the ROM 1722 in response to count 1 from the counter 1720. Because the counter 1724 starts 1 count higher, its terminal count output is generated one pixel time sooner, and the memory 1600 begins operation one pixel time prior to valid data. If data are being stored, don't care data are written into module Y0 of the memory 1600. If data are being retrieved, from storage, the output data are simply ignored because they arrive prior to the time at which valid video data are recognized.

Following the second scan, the line counter 1720 is again incremented, and the ROM 1722 causes a count of 7 to be loaded into the counter 1724 so that two pixels of don't care data are written into or read from the memory 1600 prior to the valid data time. This manner of operation continues until the counter 1720 is incremented to count 7 prior to the 8th scan line (scan line 7 when starting at 0) to cause count 12 to be loaded into counter 1724. This causes 7 pixels of don't care data to be written into or read from the memory 1600, with the first valid pixel then occurring in association with module 7 during phase 4. After the 8th scan line and before the 9th scan line, the counter 1720 is clocked, causing it to overflow to count zero and repeat the above cycle.

This process of starting one pixel time earlier for each scan line on a repeatable modulo 8 basis automatically accounts for the stepping or staggering of memory locations required for transposition on a high speed basis whether reading or writing, in a vertical scan mode or a horizontal scan mode. The operation of the address counting and timing circuitry remains essentially the same, as the timing generator 1702 provides the accounting for the required stepping of starting address locations.

Because the 8 modules of the field store memory 1600 store 8 pixels for each address location, the horizontal address counter 1706 is incremented in a horizontal direction once every eighth column position. It is clocked by a signal CKH which in the horizontal mode occurs every 560 ns at ⅛ the pixel rate. In the vertical mode the signal CKH is derived as the $\overline{\text{Line 4-7}}$ output of the counter 1720 which means the counter 1706 is incremented after every eighth vertical scan line. This is the equivalent of every eighth pixel in a horizontal scan mode. The horizontal address counter 1706 has its D inputs connected to logic 0 and its load input connected to provide reset to 0 in response to signal LDH which is $\overline{\text{V CLOCK}}$ in the vertical mode and $\overline{\text{Line Blank CK}}$ in the horizontal mode. Hence, in the vertical mode, horizontal counter 1706 is reset at the end of each field, and in the horizontal mode it is reset after each line.

The vertical address counter 1708 is a 9 bit counter having its clock input connected to signal CKV, which is derived from the 70 ns Input Hold CK signal in the vertical mode and from the Line Blank CK signal in the horizontal mode. It is thus incremented for each new horizontal line (vertical position) regardless of the mode.

A signal LDV causes the counter 1708 to be periodically reset with the four least significant bits being derived from the ROM 1722 and the more significant bits being reset to 0. At the beginning of a field the vertical counter 1708 is preset to 16 to provide a small offset which avoids the use of negative numbers under some circumstances. In the horizontal mode the ROM 1722 responds to an address input signal H Mode to always preset the counter 1708 to count 16.

However, in the vertical mode the preset state of counter 1708 depends upon the column count stored by the counter 1720. For the first column vertical address counter 1708 is preset to 16. For the second column it is preset to count 15. It will be recalled that for the second column in the vertical mode the first pixel represents don't care data. Because the counter 1708 is clocked at the pixel rate, by the time the second pixel arrives (representing the first pixel of video data), the vertical address counter 1708 has been incremented to starting address count 16.

This manner of operation continues in the vertical mode with the counter 1708 being preset to incrementally smaller counts for each new vertical scan line until count 9 is loaded before the start of the eighth scan line. By the start of the 9th scan line, the counter 1720 recycles to 0 and the process repeats.

An address map 1710 receives the counts from the counters 1706, 1708 and corrects for the failure of the number of pixels in a line to fall on a modulo 2 boundary in order to reduce wasted address space. The address map is readily implemented with adders to produce the function address $= H/8 + 128V - 16V + C = H/8 + 112V + C$. The multiplications fall on modulo 2 boundaries and can therefore be accomplished with binary shifts. The C or carry input is connected to occasionally increment the least significant address bit to accommodate a special situation in the vertical mode. The spacing of 112 in the vertical direction allows $8 \times 112$ or 896 pixels per horizontal scan line. This is sufficient for the PAL standard as well as NTSC.

The carry input is generated by the Q output of a flip-flop 1726 which has its D input connected to signal H Mode, its preset input connected to the output of a decoder 1728, its clock input connected to a 560 ns (8 pixel time) clock signal which is synchronized with the starting address for each scan line memory operation, whether don't care or actual video data. The flip-flop 1726 is active only in the vertical mode and remains inactive in the horizontal mode.

In the vertical mode the flip-flop 1726 is loaded with logic 0 to generate a carry every eighth pixel starting with the beginning of storage. It is preset to terminate the carry input every eighth pixel as the vertical counter 1708 crosses a modulo 8 boundary. A decoder 1728 is enabled for every pixel time in the vertical mode by CKV which is driven by the 70 ns Input Hold CK signal. In the horizontal mode the encoder 1728 is enabled by the Line Blank CK signal during each blanking time.

As column 0 is scanned in the vertical mode, the 560 ns signal Pixel CK/8 clocks the flip-flop 1726, but the counter 1708 is at count 16, a modulo 8 boundary, and the decoder 1728 immediately presets the flip-flop 1726 before its output is effective to cause an address increment. This is repeated for every eighth pixel. For column 1 the flip-flop 1726 is clocked at cycle start while counter 1708 is set to 15. The carry input is thus active while the don't care pixel data are read during the blanking interval. At the next pixel time the counter 1708 is incremented to 16, and the flip-flop 1726 is preset to terminate the carry command. However, after pixel P7,1 (8 pixel times after start or 560 ns) is read, the flip-flop 1726 is clocked to reset it and cause an address increment for pixel P7,1. From Table II it will be seen that this address increment properly addresses the data for this pixel. Thereafter, the input address from counters 1706, 1708 is incremented every 8th pixel.

For column 2, the memory 1600 operation begins 2 pixels early and the last two pixels of each block of 8 receive an incremental address. For column 3 the last three pixels in each block of 8 receive an incremented address until for column 7 (the eighth column) the last 7 pixels in each group of eight receive an incremented address. The cycle then repeats itself with no increments being commanded for column 8.

While the memory 1600 operates at a 2 pixel parallel 140 ns clock rate, the addresses for each of the two active memory modules during a, memory cycle can be different. The address map 1710 must therefore provide alternate early and late addresses at the pixel rate. During each 140 ns cycle the early address is loaded into an early address hold buffer 1730. Seventy nanoseconds later the late address is loaded into the early address hold buffer 1730 and a late address buffer register 1732. At the same time, the early address previously loaded into the hold buffer 1730 is loaded into an early address buffer 1734 for presentation to the memory 1600. During the next 70 ns clock period the late address loaded into the hold buffer 1730 is simply lost as the next early address is loaded into the buffer 1730. In this way the correct address is presented to memory 1600 for each of the two modules which are active during a 140 ns phase time.

In the horizontal mode there are relatively few scan lines with a large number of pixels per line. In the vertical mode there are more scan lines but with fewer pixels per line. Consequently there are also more blanking intervals, but with a shorter duration for each interval. As a result, it has been found to be advantageous when implementing the memory 1600 with dynamic memory chips to perform 1 refresh cycle during each blanking interval in the vertical mode but 2 refresh cycles in the horizontal mode.

Figure 18:
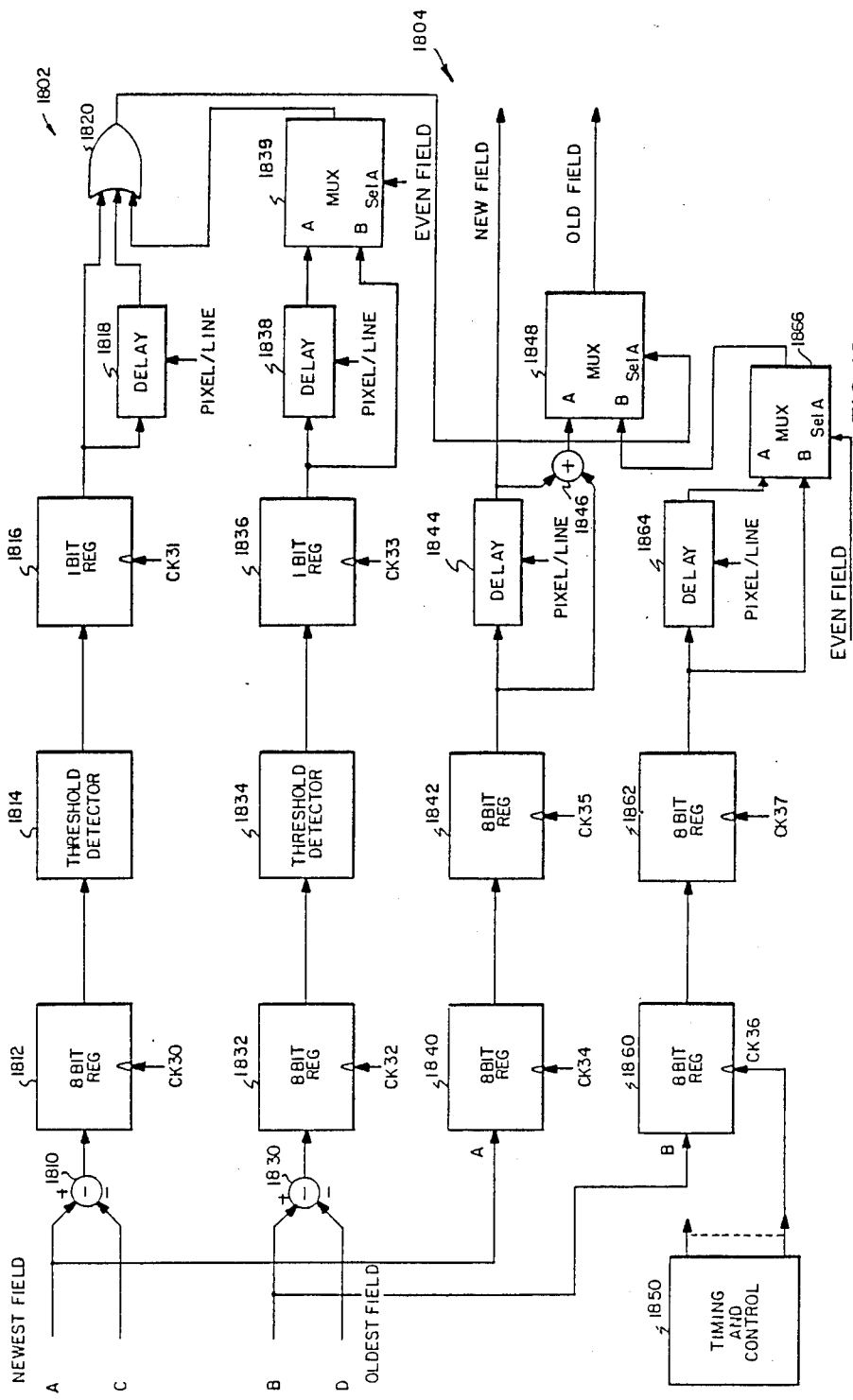
FIG. 18 is a block diagram representation of motion sensitive de-interlace filter for the system shown in FIG. 13.

Referring now to FIG. 18, the deinterlace filter 1332 includes a motion detector 1802 and a deinterlacing or frame generating circuit 1804 which outputs a complete frame of data at the field rate. For each field time, the newest stored field is always output as half of the video data for a frame and the intermediate lines of the frame are supplied from the second most recent field if no motion is detected by the motion detector 1802.

The occurrence of motion tends to create a double image of the moving object when two different fields sampled 1/60 of a second apart are merged into a frame representing a single instant in time. Hence, in response to the detection of motion by motion detector 1802, the intermediate lines of the frame, which are output on the data path designated old field, are taken as the average of the pixels above and below each successive pixel in an intermediate line. This averaging of upper and lower pixels to generate an intermediate line of pixels has the effect of reducing bandwidth by approximately $\frac{1}{2}$ in the vertical direction, but presents a more pleasing image than the double image effect which occurs when two successive fields are combined during the occurrence of motion.

A subtractor 1810 receives, the newest field on input A and the third newest field on input C and subtracts the data of the third newest field from the data representing the newest field on a sequential pixel by pixel basis with the difference being stored in 8 bit register 1812. A threshold detector 1814 responds to the difference outputs of the register 1812 and outputs a logic 1 signal whenever the difference exceeds a selected threshold, such as 8 out of 256 possible estates. A 1 bit register 1816 stores the motion indication output from the threshold detector 1814 for presentation to an OR gate 1820 and for further presentation to a 1 pixel delay circuit 1818 the output of which is also presented to the OR gate 1820. Similarly, a subtractor 1830 subtracts the pixel data for the fourth newest field on input D from the pixel data for the comparable second newest field on input B and presents the difference to an 8 bit register 1832. A threshold detector 1834 responds to the difference output stored by register 1832 and outputs a logic 1 signal whenever this difference exceeds a given threshold, such as 8 out of 256 states. This threshold output represents an indication of motion which is stored by a 1 bit register 1836, the output of which is passed through a 1 pixel delay circuit 1838 to the OR gate 1820. The 12 pixel time delays through registers 1812, 1816 and 1832, 1836 plus the extra time delays through delay circuits 1818 and 1838 are synchronized with delays inserted in the video data path such that the detection of motion at a pixel location in the newest field causes the pixels thereabove and therebelow to be generated as the average of the two pixels in the newest field vertically above and below the pixel being generated. If motion is detected at a pixel location in the second newest field, only that single pixel location is generated as the average of the pixels immediately above and below the generated pixel. Delay circuits 1818 and 1838 respond to a pixel signal during a vertical scan to provide a 1 pixel delay and to a line signal during a horizontal scan to provide a 1 line delay, because vertically adjacent pixels will be separated by a line scan time in the horizontal scan mode.

The pixel data for the newest field on input A is passed through two 8 bit registers 1840, 1842 which compensate for the delays of registers 1812 and 1816 in the motion detector, to a delay circuit 1844. The delay circuit 1844 responds to a pixel/line delay input from a timing and control circuit 1850 to provide a 1 pixel delay during a vertical scan normal mode of operation. The output of delay circuit 1844 represents the video data for the new field portion of the frames of data which are output at the field rate. An adder circuit 1846 adds the input and output of the delay circuit 1844, deletes the least significant bit of the sum to effectively divide it by 2 and provide an average, and communicates the average to the A input of a multiplexer 1848.

The B input is coupled to the output of a multiplexer 1866. The select A input of the multiplexer 1848 is coupled to the output of the OR gate 1820 to receive the motion detection signal. Hence, in the presence of the motion signal the alternate lines of the output frame of data are output by the multiplexer 1848 as the average of the video data above and below the pixel of data which is being synthesized. This output of multiplexer 1848 is designated old field.

The second newest field of data appearing on input B is shifted by two 8 bit registers 1860 and 1862 which compensate for the delays occurring in corresponding 8 bit registers 1832 and 1836 of the motion detector circuit 1802 and applied to the input of a delay circuit 1864. During a normal vertical scan mode of operation the delay circuit 1864 provides a 1 pixel delay in response to the pixel/line signal from the timing and control circuit 1850. The output of the delay circuit 1864 is communicated to the A input of a multiplexer 1866. Consequently, in the absence of a motion signal from the OR gate 1820, the old field video data which interlaces the lines of the new field video data to form a complete frame of data is taken from the second newest field of data coming in on input B.

During a special mode of operation in which the transposing memory 1330 outputs data in a horizontal scan rather than a vertical scan direction, the pixel/line signals must command the delay circuits 1818, 1838, 1844, and 1864 to store or delay a complete line of data in order that an incoming pixel of data may be matched with the pixel immediately above it in the incoming field (the incoming pixel will be matched with a pixel two lines above it in a frame). The proper corresponding vertically juxtaposed pixel data may thus be averaged in the adder 1846 for presentation to the A input of the multiplexer 1848. The delay line 1864 provides a one line delay during the horizontal scan mode of operation to provide compatibility with the one line delay which must occur in the delay circuit 1844.

The deinterlace filter 1332 thus outputs complete frames of data at the field rate with the newest field of data being continuously output on the new field path and with the intermediate horizontal lines of data appearing on the old field output path as either the second oldest field of data when motion is not detected or the average of the two vertically adjacent pixels in the new field of data when motion is detected. It will be appreciated that in a vertical scan mode the time sequential new field and old field outputs will represent vertically adjacent pairs of pixel data. That is, when an even line field is the newest field being received, the new field and old field lines will carry respectively data for pixels P0,0 and P1,0, followed by P2,0 and P3,0, followed by P4,0 and P5,0, and so forth. In a horizontal scan mode of operation the new field and old field will carry data for vertically adjacent complete lines of data. That is, when the newest input field is an even field, the sequence of data will be for pixel locations P0,0 and P1,0 for the newest and second newest field data, followed by P0,1 and P1,1, followed by P0,2 and P1,2, and so forth, until the first two lines of a frame of data have been output. After the 0 and first lines have been output, the second and third lines will be output, and so forth.

When the newest field is an even field representing lines 0, 2, 4, etc., the old field contains lines 1, 3, 5, etc. with the old field pixel representing data one line below the corresponding new field pixel. The timing relationship of the adder 1846 is such that when motion is detected, the old field is generated as the average of data in the current line and the subsequent line. For example, in the vertical mode the new field pixel P0,2 is output with pixel P0,3 formed as the average of pixels P0,2 and P0,4.

However, were the new field to be an odd field, this timing relationship would result in a pixel P0,3 being output with pixel P0,2 formed as the average of pixels P0,3 and P0,5 rather than pixels P0,1 and P0,3 as would be desired. This relationship is corrected by bypassing the delay circuits 1838 and 1864 when the newest field is an odd field. This in effect produces output data pairs for row pairs don't care, 0 and 1, 2 and 3, 4, etc., and ensures that the motion detection signal in respect to motion in the second newest field is properly synchronized. As a result the proper timing relationship is restored, such that the old field data are one line below the corresponding new field data, and the old field data, are properly derived by averaging the current pixel and the pixel for the line below it in the new field.

To ensure such proper synchronization, such selective bypassing of the delay circuit 1838 may be effected by a multiplexer 1839 having its A input connected to the output of the delay circuit 1838 and its B input connected to the input of the delay circuit 1838, its Select A input being connected to the signal Even Field to select the A input for an even field and the B input for an odd field.

The multiplexer 1866 is connected to selectively bypass delay 1864 with the A input connected to the output of delay 1864 and the B input connected to the input of delay 1864. The Select A input is connected to the signal Even Field to select the A input for an even field and the B input for an odd field.

Figure 19:
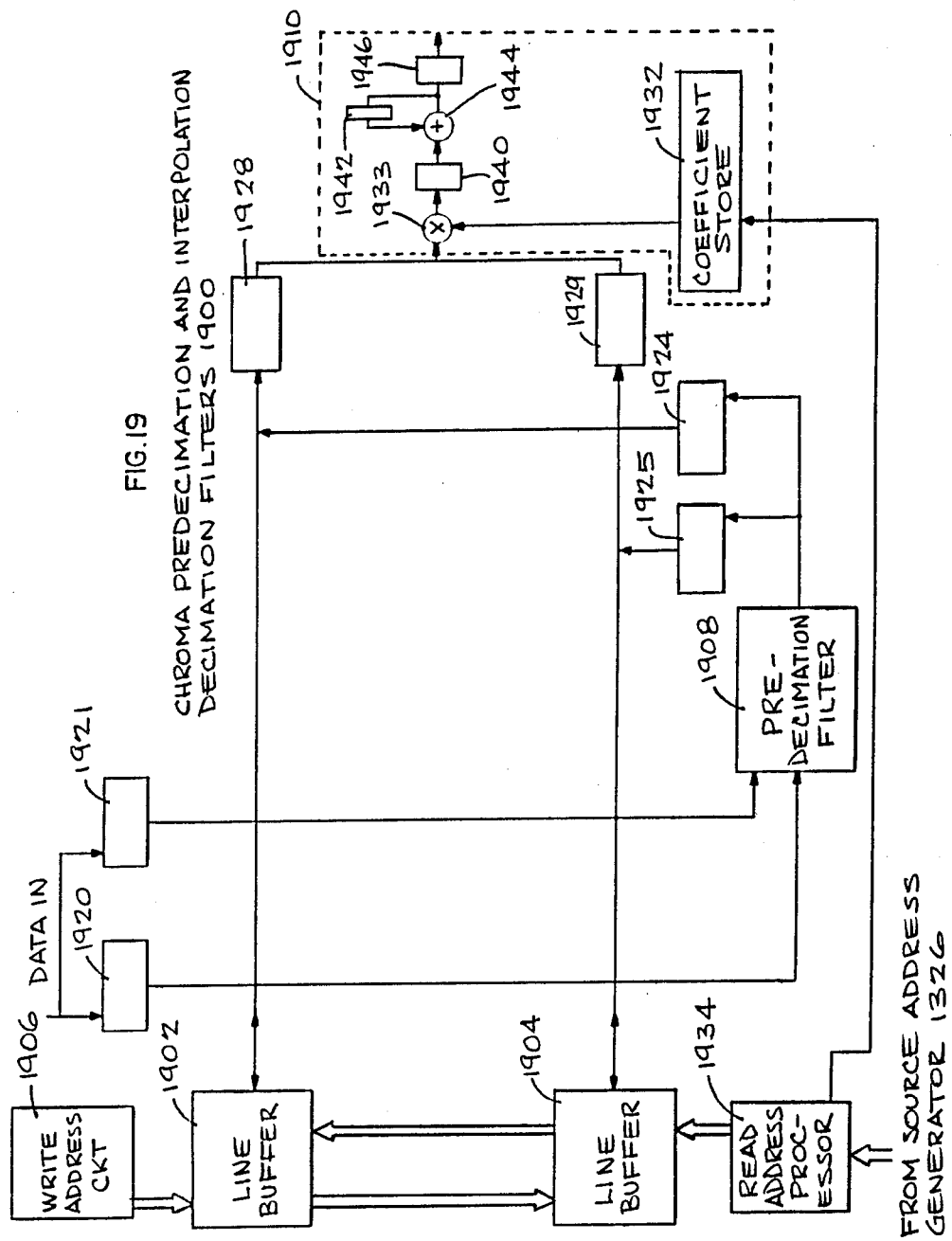
FIG. 19 is a block diagram representation of an advantageous embodiment of chroma predecimation and interpolation decimation filters for the system shown in FIG. 13.

Referring now to FIG. 19, the chroma predecimation and interpolation decimation filters 1900 are essentially the same for both the vertical and horizontal portions of the system. While the chroma system could utilize filters constructed similarly to the predecimation filters 1334, 1342 and the vertical interpolation decimation filter 1336, the bandwidth for the chroma data is only one-fourth that of the luminance data, and the arrangement of FIG. 19 takes account of the corresponding lower data speed to provide a lower cost implementation.

Chroma predecimation and interpolation decimation filters 1900 include a pair of line buffer memory segments 1902, 1904, a write address circuit 1906 which provides write addresses to the buffer segments 1902, 1904 as data are received from the preceding transposing memory corresponding to the horizontal to vertical transposing memory 1330 or the vertical to horizontal transposing memory 1338 in the luminance data path. The write address circuit 1906 also supplies addresses as data are written back into line buffer segments 1902, 1904 after having been stored and then read out and predecimated by a predecimation filter 1908. Line buffer segments 1902 and 1904 operate in parallel to double the speed of the memory 1600. Line buffer segments 1902, 1904 actually store three lines of video data with the storage for each line including both a full size copy and a predecimated partial sized copies thereof including half size, one-fourth size and one-eighth size.

The filters 1900 operate continuously on the three lines of data in an interleaved fashion. At one line storage location an incoming line of video data is stored so as to replace the oldest line of video data. At the same time the newest complete line of video data is predecimated by the predecimation filter 1908 and the second newest line of complete data, which represents the newest line of completely predecimated data, is output by an interpolation decimation filter 1910.

Memory segments 1902, 1904 operate on a 560 nanosecond cycle consisting of eight 70 nanosecond subcycles. During a given memory cycle, incoming data are received and stored in registers 1920 and 1921. During the first half of the next cycle and before the early pixel of data is received for the next cycle, the two pixels stored in registers 1920 and 1921 are written into the line buffer segments 1902, 1904. Similarly, two pixels of data processed by the predecimation filter 1908 are stored by early and late registers 1924, 1925 pending the writing of the predecimated data stored therein back into line buffer segments 1902, 1904. The eight subcycle repeating sequence for each cycle of each 560 nanosecond cycle of line buffer segments 1902, 1904 occurs as follows.

1. Interpolate. That is, read out two pixels of video data to early and late pixel interpolation decimation buffer registers 1928, 1929 for use by the interpolation filter 1910.
2. Readout two pixels of data for the predecimation filter 1908 and store a pixel of predecimated pixel data in the early predecimated data buffer register 1924.
3. Interpolate. Readout a second pair of pixels for storage in registers 1928, 1929.
4. Write the two pixels of incoming data stored in registers 1920 and 1921 into line buffer memory segments 1902, 1904 at the next sequential address location in the current incoming line section of the memory address space.
5. Interpolate, with two more pixels of video data being written into buffer registers 1928, 1929.
6. Readout a pair of pixels for the predecimation filter 1908 with a pixel of predecimated data being written into the late predecimated data buffer register 1925.
7. Interpolate by reading out two more pixels of data for storage by interpolation buffer registers 1928, 1929.
8. Write two pixels of predecimated data which have previously been stored in early and late predecimation registers 1924, 1925 into buffer memory segments 1902, 1904. It will be noted that the clocking and output enabling of the buffer registers shown in FIG. 19 have been omitted for clarity. However, such clocking and gating can be readily implemented according to the schedule indicated above.

The predecimation filter 1908 provides a 2:1 compaction for each passage of the data therethrough. It is operated on a cyclic basis much on the manner of operation of the predecimation filter 700. First, the full size copy of a line of data is passed through the filter 1908 and reduced to half size. Then the half size copy is reduced to one-fourth size followed by the reduction of the one-fourth size copy to one-eighth size. Further size reductions would of course be possible but are not implemented in the present embodiment of the invention. The predecimation filter 1908 may be advantageously implemented as a 5 point filter utilizing the sequential weighting factors of 3/32, 8/32, 10/32, 8/32, and 3/32.

Operation of the interpolation decimation filter 1910 is substantially the same as that of the interpolation decimation filter 800 as shown in FIG. 10 except that a coefficient store 1932 outputs a weighting coefficient to a multiplier 1933 which is varied according to the relative position of a pixel of data within all of the pixels which are being weighted to provide the filter function, rather than using the barrel shifter 810 to prealign the video data to match a predetermined filter function weighting. In effect, this shifting of relative pixel data positions is accommodated through the addressing of the coefficient store 1932 rather than through the actual shifting of the video data. A read address processor 1934 provides the read addresses to line buffer memory segments 1902, 1904. As data are read out for the predecimation by filter 1908, the addresses are merely sequentially advanced first through the fill size data, then through the half size data, and then through the one-fourth size data as the one-eighth size predecimated data is formed.

For interpolation, the read address processor 1934 receives source addresses from the source address generator 1326 and responds to each source address by addressing four pixels of data which flank the source address. The principle of implementation is essentially the same as that of the address circuitry for the line, buffer 809 except that a 4 point filter is utilized instead of an 8 point filter. The addresses for the line buffer segments 1902, 1904 must be selectively incremented or decremented as necessary to accommodate the actual address location of the required pixel of video data for a given source address.

The interpolation decimation filter 1910 operates on single pixels of video data being interpolated on a 70 nanosecond cycle, which matches the rate of two pixels of data received by buffer registers 1928, 1929 from line buffer segments 1902, 1904 every 140 nanoseconds. The filter 1910 is a 4 point filter and thus outputs one pixel of data every 280 nanoseconds, which is consistent with the one-fourth sampling rate and bandwidth of the chroma data.

After the storage of two pixels of video data in buffer registers 1928, 1929 at the end of the first memory subcycle, during the second memory subcycle the multiplier 1933 multiplies the value of the pixels stored in the register 1928 times a coefficient value from the coefficient store 1932 with the results being stored in a register 1940 at the end of subcycle two. Simultaneously, at the end of subcycle two, an accumulating register 1942 is cleared. During memory subcycle three, the line buffer segments 1902, 1904 output two more pixels of interpolation decimation data, and the multiplier 1933 multiplies the value of the pixel data stored by the register 1929 by a new coefficient provided by the coefficient store 1932. At the end of subcycle three, the two new pixels of data are clocked into buffer registers 1928, 1929 as the output of multiplier 1933 is clocked into the register 1940, and the output of an adder 1944, which represents the sum of the contents of the register 1940 and the accumulator 1942, are clocked into the accumulator 1942. Because the accumulator 1942 had been previously cleared, in this case the contents of the register 1940 are stored in the accumulator 1942. This represents the first pixel of a 4 point filter cycle. During memory subcycle four, the multiplier 1933 multiplies the third pixel of the cycle in register 1928 by a proper coefficient, and the adder 1944 adds the first pixel of the cycle stored in the register 1942 to the second pixel of the cycle stored in the register 1940. At the end of memory subcycle four, the third pixel is stored in the register 1940 and the sum of the first two pixels is stored in accumulator 1942. During memory subcycle five, the line buffers 1902, 1904 read out another pair of pixels as the multiplier 1933 multiplies the pixel previously stored in the register 1929 by its proper coefficient, and the adder 1944 produces the sum of the first two pixels stored in the accumulator 1942 plus the third pixel stored in the register 1940. At the end of the fifth memory cycle, the three pixel sum at the output of the adder 1944 is stored in the accumulator register 1942, the fourth weighted pixel is stored in the register 1940 and the first two pixels for the next filter cycle are stored in buffer registers 1928, 1929.

During memory subcycle six, the multiplier 1933 multiplies the pixel data in the register 1928 by an appropriate coefficient from the store 1932, while the adder 1944 adds the three pixel sum accumulated in the register 1942 to the fourth weighted pixel stored in the register 1940. At the end of memory cycle six, the four pixel sum output from the adder 1944 is loaded into an output buffer register 1946, the accumulator register 1942 is cleared, and the first weighted pixel for the second output pixel is stored in the register 1940.

The above described interpolation decimation filter cycle thus continues to repeat itself with two 280 nanosecond filter cycles occurring for each 560 nanosecond memory cycle. The weighting factors provided by the coefficient store 1932 are selected to provide a desired filter function which depends upon the particular full size or partial size predecimated copy which is being utilized as the source data, the amount of further size reduction or enlargement provided by the interpolation filter 1910, and the location of the source address point relative to the pixel.

said transformation corresponding to transformation of said picture elements of said image from a source location to a target location in a two dimensional coordinate system in which two coordinates indicate position in respective first and second directions, said system comprising a first memory coupled to receive a serial sequence of data samples corresponding to source locations serialized by scanning in said first direction, the first memory being selectively operable to output the data samples in the serial sequence in which they are received or in a serial sequence representing scanning in said second direction;

a first filter coupled to receive the data samples output from said first memory and to output a serial sequence of first filtered data samples for target locations in a filtered function of a plurality of the data samples corresponding to picture elements neighboring respective first source location coordinates, said sequence output by said first filter corresponding to scanning in the direction corresponding to the output of said first memory;

a second memory coupled to receive the serial sequence of first filtered data samples from the first filter scanned in the respective said direction and to output the first filtered data samples in scan line data sample sequence representing scanning in the other said direction;

a second filter coupled to receive the first filtered

TABLE II

ADDRESS TABLE

| ADDRESS | 01 | | 02 | | 03 | | 04 | | 02/C2 | 04/C7 |
|---|---|---|---|---|---|---|---|---|---|---|
| | Y0 | Y1 | Y2 | Y3 | Y4 | Y5 | Y6 | Y7 | | |
| 1,792 | P0,0 | P0,1 | P0,2 | P0,3 | P0,4 | P0,5 | P0,6 | P0,7 | C0,0 | C0,1 |
| 1,793 | P0,8 | P0,9 | P0,10 | P0,11 | P0,12 | P0,13 | P0,14 | P0,15 | C0,2 | C0,3 |
| 1,794 | P0,16 | P0,17 | P0,18 | P0,19 | P0,20 | P0,21 | P0,22 | P0,23 | C0,4 | C0,5 |
| 1,904 | X | P1,0 | P1,1 | P1,2 | P1,3 | P1,4 | P1,5 | P1,6 | C1,0 | C1,1 |
| 1,905 | P1,7 | P1,8 | P1,9 | P1,10 | P1,11 | P1,12 | P1,13 | P1,14 | C1,2 | C1,3 |
| 1,906 | P1,15 | P1,16 | P1,17 | P1,18 | P1,19 | P1,20 | P1,21 | P1,22 | C1,4 | C1,5 |
| 2,016 | X | X | P2,0 | P2,1 | P2,2 | P2,3 | P2,4 | P2,5 | C2,0 | C2,1 |
| 2,017 | P2,6 | P2,7 | P2,8 | P2,9 | P2,10 | P2,11 | P2,12 | P2,13 | C2,2 | C2,3 |
| 2,018 | P2,14 | P2,15 | P2,16 | P2,17 | P2,18 | P2,19 | P2,20 | P2,21 | C2,4 | C2,5 |
| 2,128 | X | X | X | P3,0 | P3,1 | P3,2 | P3,3 | P3,4 | C3,0 | C3,1 |
| 2,129 | P3,5 | P3,6 | P3,7 | P3,8 | P3,9 | P3,10 | P3,11 | P3,12 | C3,2 | C3,3 |
| 2,130 | P3,13 | P3,14 | P3,15 | P3,16 | P3,17 | P3,18 | P3,19 | P3,20 | C3,4 | C3,5 |
| 2,240 | X | X | X | X | P4,0 | P4,1 | P4,2 | P4,3 | X | C4,0 |
| 2,241 | P4,4 | P4,5 | P4,6 | P4,7 | P4,8 | P4,9 | P4,10 | P4,11 | C4,1 | C4,2 |
| 2,242 | P4,12 | P4,13 | P4,14 | P4,15 | P4,16 | P4,17 | P4,18 | P4,19 | C4,3 | C4,4 |
| 2,352 | X | X | X | X | X | P5,0 | P5,1 | P5,2 | X | C5,0 |
| 2,353 | P5,3 | P5,4 | P5,5 | P5,6 | P5,7 | P5,8 | P5,9 | P5,10 | C5,1 | C5,2 |
| 2,354 | P5,11 | P5,12 | P5,13 | P5,14 | P5,15 | P5,16 | P5,17 | P5,18 | C5,3 | C5,4 |
| 2,464 | X | X | X | X | X | X | P6,0 | P6,1 | X | C6,0 |
| 2,465 | P6,2 | P6,3 | P6,4 | P6,5 | P6,6 | P6,7 | P6,8 | P6,9 | C6,1 | C6,2 |
| 2,466 | P6,10 | P6,11 | P6,12 | P6,13 | P6,14 | P6,15 | P6,16 | P6,17 | C6,3 | C6,4 |
| 2,576 | X | X | X | X | X | X | X | P7,0 | X | C7,0 |
| 2,577 | P7,1 | P7,2 | P7,3 | P7,4 | P7,5 | P7,6 | P7,7 | P7,8 | C7,1 | C7,2 |
| 2,578 | P7,9 | P7,10 | P7,11 | P7,12 | P7,13 | P7,14 | P7,15 | P7,16 | C7,3 | C7,4 |
| 2,688 | P8,0 | P8,1 | P8,2 | P8,3 | P8,4 | P8,5 | P8,6 | P8,7 | C8,0 | C8,1 |
| 2,689 | P8,8 | P8,9 | P8,10 | P8,11 | P8,12 | P8,13 | P8,14 | P8,15 | C8,2 | C8,3 |
| 2,690 | P8,16 | P8,17 | P8,18 | P8,19 | P8,20 | P8,21 | P8,22 | P8,23 | C8,4 | C8,5 |

While there have been shown and described above, various arrangements of a digital special effects system and digital transformation systems in accordance with the invention, it will be appreciated that the invention is not limited thereto. Accordingly any modifications, variations or equivalent arrangements within the scope of the attached claims should be considered to be within the scope of the invention.

What is claimed is:

1. A system for electronically transforming input data samples corresponding to picture elements of an image, data samples output from said second memory and to output a serial sequence of second filtered data samples scanned in said other direction for target locations as a filtered function of a plurality of the first filtered data samples corresponding to picture elements neighboring second source location coordinates; and first and second source address generators coupled to provide to the first and second filters serial sequences of respective first and second source addresses corresponding to respective serial sequences of coordinates in accordance with a desired transformation between the source and target locations.

2. A system according to claim 1 wherein said data samples correspond to two-field interlaced raster scan television images, further comprising a deinterlace filter disposed between the first memory and the first filter to receive the data samples output by the first memory corresponding to interlaced two-field images and to combine said data samples to effect deinterlacing of the interlaced two-field images into respective deinterlaced single-field images.

3. A system according to claim 1 for transforming a luminance component of the images, and two chrominance components of the images, said system comprising a said first memory and a said second memory in respect to each of said component of the images, with respective memories addressed in parallel by the output of said first and second address generators.

4. A system according to claim 1 wherein said plurality of data samples corresponding to picture elements neighboring respective first source location coordinates corresponds to respective pluralities of picture elements disposed before and after the respective source location coordinates in the respective scanning direction, and said plurality of first data samples corresponding to picture elements neighboring respective second source location coordinates corresponds to respective pluralities of picture elements disposed before and after the respective source location coordinates in the respective scanning direction.

5. A system according to any one of claims 1 to 4 comprising further means for transforming data samples corresponding to at least one other image at the same time, and a switcher coupled to receive transformed data samples corresponding to respective images and to output said transformed data samples in a selected combination.

6. An interpolation filter for a transformation system for transforming an array of video data samples in a single direction, said data samples corresponding to picture elements of an image arranged in a two dimensional coordinate system in which two coordinates indicate the position of a data sample in respective coordinate directions, said transformation system transforming video data samples from a source location to a target location and thereby transforming a source image defined by said video data samples into a transformed image, said system including means for providing a source location signal indicating successive data sample locations between which lies a source location for which an interpolated data sample is to be derived from said data samples, means for providing a phase signal indicating the relative position of said source cation between said successive data sample locations, and a size signal indicative of the size of the source image relative to the transformed image, said filter comprising .
N memory modules, where N is a positive integer greater than 1;
means for storing data samples of the image in the N memory modules in such sequence that, within any span of N consecutive data samples corresponding to consecutive picture elements in said single direction, each data sample is stored in a unique memory module;
a memory address circuit coupled to receive said source location signal and in response thereto to address the memory modules to output N data samples therefrom corresponding to N locations disposed about said source location;
a coefficient store storing filter weighting coefficients defining a magnitude relationship between said N data samples and a filtered data sample corresponding to said source location, the coefficient store outputting N coefficients corresponding respectively to the N data samples in response to and dependent upon said size and phase signals; and
means for generating a filtered data sample as an interpolated data sample output in response to the N data samples and the N filter function coefficients corresponding thereto.

7. A filter for converting input video data samples corresponding to picture elements of an image into output data samples arranged in sequence with successive groups of output data samples corresponding to progressively smaller fractional-sized reproductions of the image, the picture elements being arranged in a two dimensinal coordinate system in which two coordinates indicate position of a picture element corresponding to an input data sample in respective coordinate directions, the picture elements of a reproduction of the image being arranged in rows in each respective coordinate direction, said filter comprising
a filter circuit responsive to successive filter input data samples corresponding to picture elements succeeding one another in rows in a given coordinate direction for producing respective filtered data samples corresponding to picture elements of a fractional-size reproduction of the image that is a fraction of the linear size of the image corresponding to the filter input data samples, the ratio of the number of said filtered data samples to the number of said filter input data samples being said same fraction,
means for applying input video data samples corresponding to the image as successive filter input data samples to said filter circuit in groups corresponding to picture elements in respective rows in said given direction according to predetermined succession,
means for successively and recursively applying to said filter circuit the respective filtered data samples corresponding to each said group as filter input data samples a predetermined number of times, and
output means for successively outputting data samples for each said group corresponding respectively to the image and successive fractional-size reproductions thereof.

8. A filter in accordance with claim 7 wherein said fraction is one-half.

9. A filter for converting input video data samples corresponding to picture elements of an image into output data samples arranged in sequence with successive groups of output data samples corresponding to progressively smaller reproductions of the image, the picture elements being arranged in a two dimensional coordinate system in which two coordinates indicate position of a picture element corresponding to an input data sample in respective coordinate directions, the picture elements of a reproduction of the image being arranged in rows in each respective coordinate direction, said filter comprising
a filter circuit responsive to successive video input data samples corresponding to picture elements succeeding one another in rows in a given coordinate direction for producing respective filtered data samples corresponding to picture elements of a fractional-size reproduction of the image, means for recursively applying the respective filtered data samples to said filter circuit a predetermined number of times to produce sequences of filtered data samples corresponding to respective fractional-size reproductions each related to its predecessor by a fixed reduction fraction along a given single coordinate direction, and output means for successively outputting data samples corresponding respectively to the image and successive fractional-size reproductions thereof.

10. A filter according to any one of claims 7 to 9 wherein said filter circuit includes means for operating upon two input data samples in parallel to produce said filtered data samples.

11. A memory system for sequentially storing data samples corresponding to picture elements of a video image arranged in rows in vertical and horizontal directions and for retrieving stored data samples corresponding to respective picture elements in a sequence different from that in which they were stored, said memory system comprising a plurality of data storage modules for receiving data samples, each module having an addressable array of a plurality of storage cells into which cells a respective plurality of received data samples may be written for storage and from which stored data samples may be read for retrieval when the respective modules are addressed; and an addressing system coupled to address said modules according to either of first and second sequences, said first sequence operating to store data samples in respective modules according to the sequence of respective picture elements in rows in one of said vertical and horizontal directions, in which first sequence the respective modules are addressed cyclically once only each cycle according to a first pattern for storing data samples in all respective modules each cycle with a plurality of cycles in respect to each image, said second sequence operating to retrieve data samples from respective modules according to the sequence of respective picture elements in rows in the other of said vertical and horizontal directions, in which stored sequence the respective modules are addressed cyclically once only each cycle according to a second pattern for retrieving data samples from all respective modules each cycle with a plurality of cycles in respect to each image, and said first sequence being related to said second sequence whereby the addressing of the modules according to said first pattern stores the data samples in different respective modules over a cycle of said second pattern.

12. A memory system for sequentially storing and retrieving data samples corresponding to picture elements of a two dimensional video image arranged in rows in vertical and horizontal directions where such data samples can be stored in sequential order at a data sample rate higher than the maximum access rate of individual data storage modules included in the memory system and can be retrieved in sequential order corresponding to either of said vertical and horizontal directions at a rate higher than the maximum access rate of said data storage modules, said memory system comprising N data storage modules for receiving data samples, each module having a plurality of addressable storage locations and an access time greater than the time T between consecutive received data samples, N being an integer greater than 1 and T being the inverse of the data sample rate; and means for storing the received data samples in the N modules in such sequence that, within any span of N consecutive data samples corresponding to consecutive picture elements in any row in either of the vertical and horizontal directions, each data sample is stored in an addressable storage location in a unique storage module.

* * * * *